US012664245B2

(12) United States Patent
Benkley et al.

(10) Patent No.: US 12,664,245 B2
(45) Date of Patent: Jun. 23, 2026

(54) SYSTEM AND METHOD FOR SECURE BIOMETRIC ENROLLMENT

(71) Applicant: IDEX BIOMETRICS ASA, Oslo (NO)

(72) Inventors: Fred George Benkley, Middleton, MA (US); David Joseph Geoffroy, North Andover, MA (US)

(73) Assignee: IDEX Biometrics ASA, Oslo (NO)

( * ) Notice: Subject to any disclaimer, the term of this patent is extended or adjusted under 35 U.S.C. 154(b) by 168 days.

(21) Appl. No.: 18/690,007

(22) PCT Filed: Oct. 5, 2022

(86) PCT No.: PCT/US2022/077568
§ 371 (c)(1),
(2) Date: Mar. 7, 2024

(87) PCT Pub. No.: WO2023/060101
PCT Pub. Date: Apr. 13, 2023

(65) Prior Publication Data
US 2024/0419770 A1      Dec. 19, 2024

Related U.S. Application Data

(60) Provisional application No. 63/253,372, filed on Oct. 7, 2021.

(51) Int. Cl.
*G06F 21/32* (2013.01)
*G06F 21/45* (2013.01)
*G06V 40/12* (2022.01)

(52) U.S. Cl.
CPC .............. *G06F 21/32* (2013.01); *G06F 21/45* (2013.01); *G06V 40/12* (2022.01); *G06F 2221/2117* (2013.01)

(58) Field of Classification Search
CPC .. G06F 21/32; G06F 21/45; G06F 2221/2117; G06V 40/12; G06V 40/1306;
(Continued)

(56) References Cited

U.S. PATENT DOCUMENTS 10,210,374 B1    2/2019  Lee
10,915,260 B1 *  2/2021  Lei ........................ G06F 3/0671
(Continued)

FOREIGN PATENT DOCUMENTS

EP          3985531 A1 *  4/2022  ............. G06F 21/34
KR    1020160099432 A     8/2016

OTHER PUBLICATIONS

International Search Report and Written Opinion—PCT/US2022/077568—ISA/KR—Jan. 26, 2023.

*Primary Examiner* — Mohammad W Reza
(74) *Attorney, Agent, or Firm* — Smith Tempel Blaha LLC; Michael J. Tempel

(57) ABSTRACT

A system and method for secure biometric enrollment includes externally activating a user device, obtaining an initial biometric sample of a user subsequent to externally activating the user device, storing the initial biometric sample as a trusted sample in a trusted template, obtaining at least one subsequent biometric sample, comparing the at least one subsequent biometric sample to the trusted template, and based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into the trusted template and retroactively extending trust of association with the user (Continued)

to the non-matching at least one subsequent biometric sample in the temporary buffer.

25 Claims, 30 Drawing Sheets

(58) Field of Classification Search
CPC ... H04L 9/0866; H04L 9/0877; H04L 9/3231; H04L 9/3234
See application file for complete search history.

(56) References Cited

U.S. PATENT DOCUMENTS

| | | | |
|---|---|---|---|
| 11,151,350 B2 | 10/2021 | Lee et al. | |
| 2015/0294131 A1 | 10/2015 | Neskovic et al. | |
| 2016/0364609 A1* | 12/2016 | Ivanisov | G06F 18/22 |
| 2017/0220882 A1 | 8/2017 | Russo | |
| 2018/0032789 A1 | 2/2018 | Weber et al. | |
| 2022/0004800 A1* | 1/2022 | Kazdaghli | G06F 21/32 |

* cited by examiner

250

255　SE

MEMORY
260

TEMP
BUFFER
(SECURE
STORAGE)　262

265

TRUSTED
TEMPLATE
STORAGE　264

280

274

PROCESSOR

276

EVM
(I/O)

277

BIOMETRIC SENSOR
290

291

Memory
294

296

Processor

292

MATCHER

298

Logic

Fourth touch, partial overlap and match to initial trusted sample, add all missed samples to template

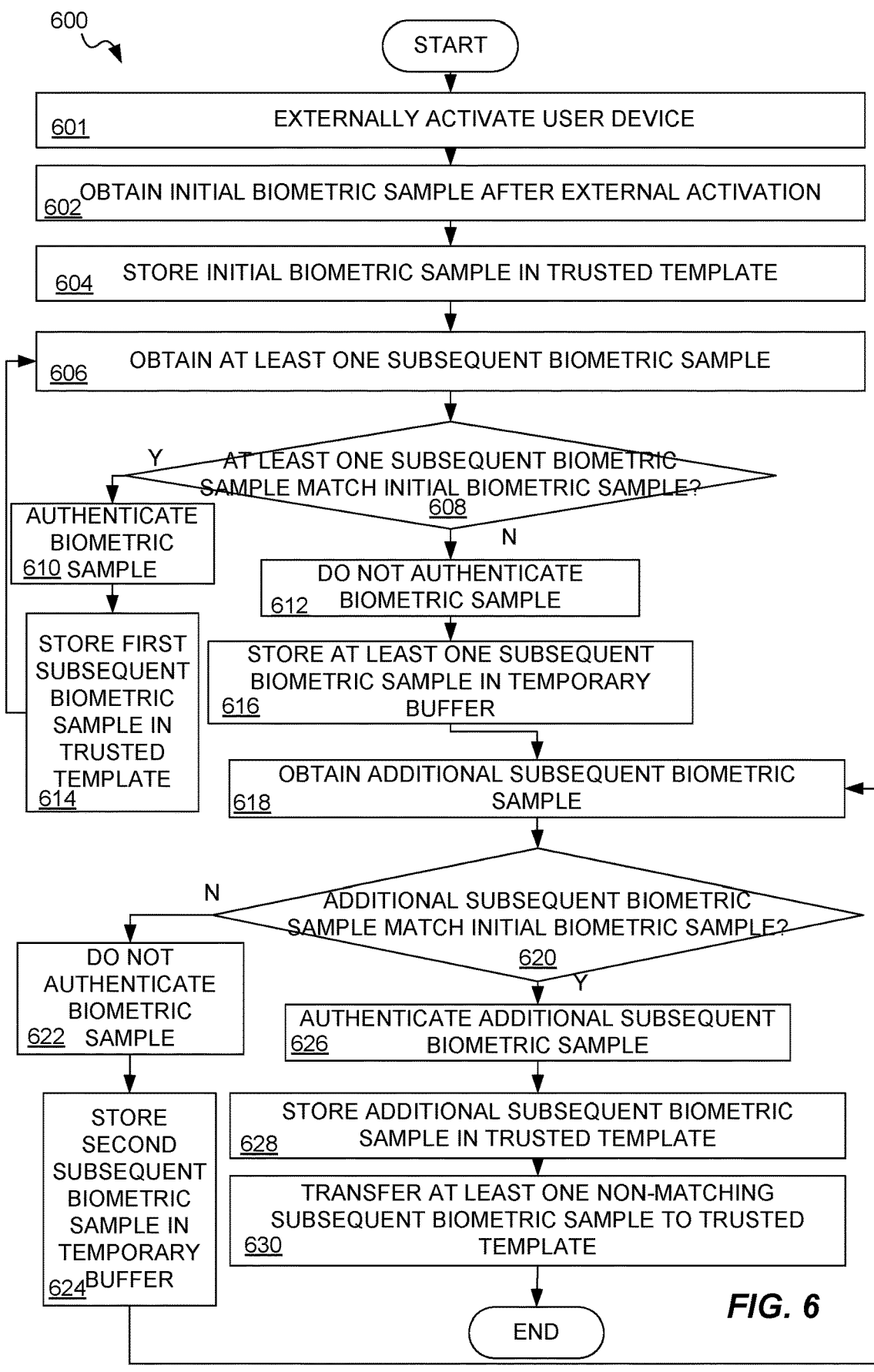

600

START

601    EXTERNALLY ACTIVATE USER DEVICE

602    OBTAIN INITIAL BIOMETRIC SAMPLE AFTER EXTERNAL ACTIVATION

604    STORE INITIAL BIOMETRIC SAMPLE IN TRUSTED TEMPLATE

606    OBTAIN AT LEAST ONE SUBSEQUENT BIOMETRIC SAMPLE

608    AT LEAST ONE SUBSEQUENT BIOMETRIC SAMPLE MATCH INITIAL BIOMETRIC SAMPLE?

Y

610    AUTHENTICATE BIOMETRIC SAMPLE

N

612    DO NOT AUTHENTICATE BIOMETRIC SAMPLE

614    STORE FIRST SUBSEQUENT BIOMETRIC SAMPLE IN TRUSTED TEMPLATE

616    STORE AT LEAST ONE SUBSEQUENT BIOMETRIC SAMPLE IN TEMPORARY BUFFER

618    OBTAIN ADDITIONAL SUBSEQUENT BIOMETRIC SAMPLE

620    ADDITIONAL SUBSEQUENT BIOMETRIC SAMPLE MATCH INITIAL BIOMETRIC SAMPLE?

N

622    DO NOT AUTHENTICATE BIOMETRIC SAMPLE

Y

626    AUTHENTICATE ADDITIONAL SUBSEQUENT BIOMETRIC SAMPLE

624    STORE SECOND SUBSEQUENT BIOMETRIC SAMPLE IN TEMPORARY BUFFER

628    STORE ADDITIONAL SUBSEQUENT BIOMETRIC SAMPLE IN TRUSTED TEMPLATE

630    TRANSFER AT LEAST ONE NON-MATCHING SUBSEQUENT BIOMETRIC SAMPLE TO TRUSTED TEMPLATE

END

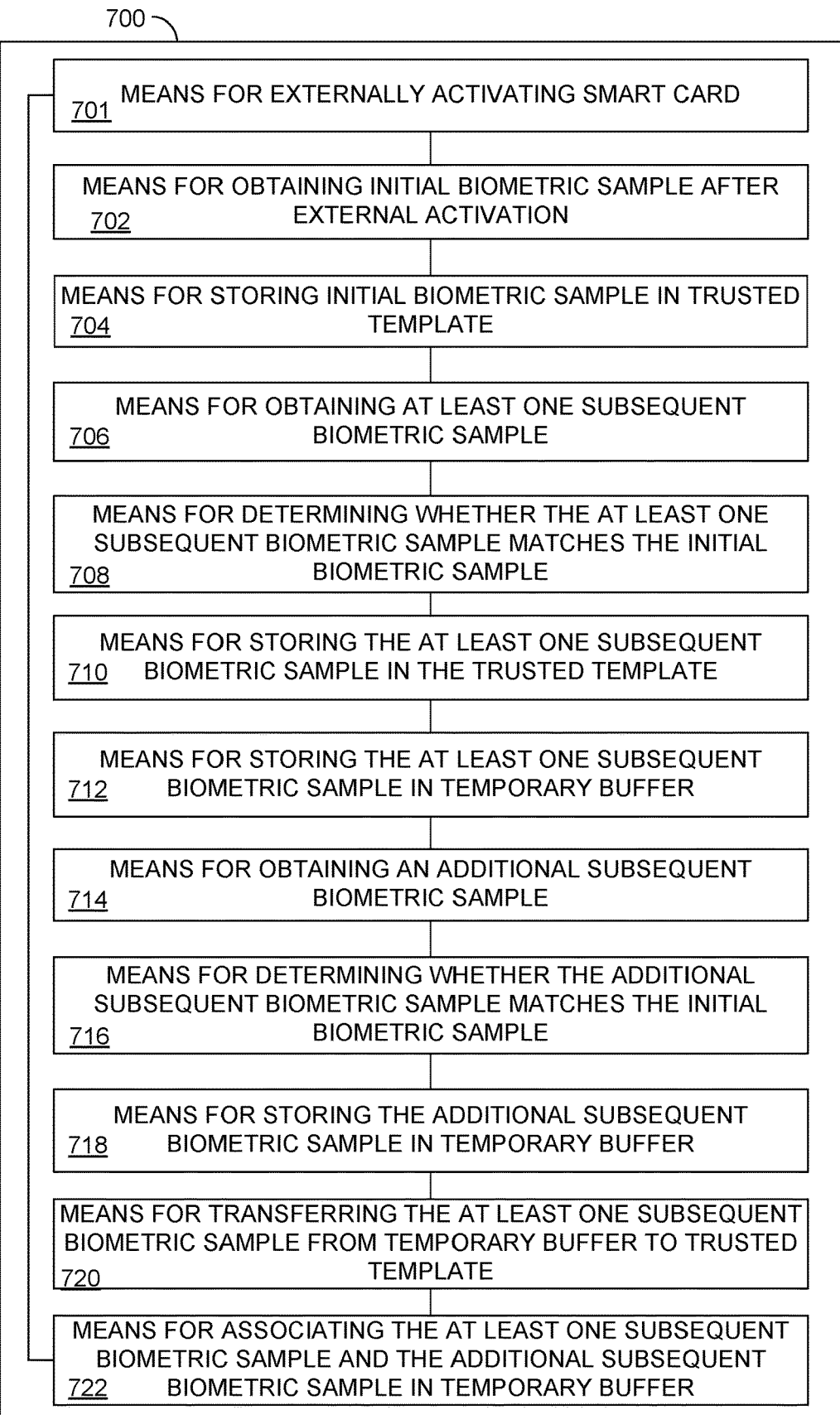

701 MEANS FOR EXTERNALLY ACTIVATING SMART CARD

702 MEANS FOR OBTAINING INITIAL BIOMETRIC SAMPLE AFTER EXTERNAL ACTIVATION

704 MEANS FOR STORING INITIAL BIOMETRIC SAMPLE IN TRUSTED TEMPLATE

706 MEANS FOR OBTAINING AT LEAST ONE SUBSEQUENT BIOMETRIC SAMPLE

708 MEANS FOR DETERMINING WHETHER THE AT LEAST ONE SUBSEQUENT BIOMETRIC SAMPLE MATCHES THE INITIAL BIOMETRIC SAMPLE

710 MEANS FOR STORING THE AT LEAST ONE SUBSEQUENT BIOMETRIC SAMPLE IN THE TRUSTED TEMPLATE

712 MEANS FOR STORING THE AT LEAST ONE SUBSEQUENT BIOMETRIC SAMPLE IN TEMPORARY BUFFER

714 MEANS FOR OBTAINING AN ADDITIONAL SUBSEQUENT BIOMETRIC SAMPLE

716 MEANS FOR DETERMINING WHETHER THE ADDITIONAL SUBSEQUENT BIOMETRIC SAMPLE MATCHES THE INITIAL BIOMETRIC SAMPLE

718 MEANS FOR STORING THE ADDITIONAL SUBSEQUENT BIOMETRIC SAMPLE IN TEMPORARY BUFFER

720 MEANS FOR TRANSFERRING THE AT LEAST ONE SUBSEQUENT BIOMETRIC SAMPLE FROM TEMPORARY BUFFER TO TRUSTED TEMPLATE

722 MEANS FOR ASSOCIATING THE AT LEAST ONE SUBSEQUENT BIOMETRIC SAMPLE AND THE ADDITIONAL SUBSEQUENT BIOMETRIC SAMPLE IN TEMPORARY BUFFER

*FIG. 7*

Initial trusted enroll sample from first use after activation

810a

205

214

TRUSTED TEMPLATE STORAGE

815b

212

TEMP BUFFER (SECURE STORAGE)

810

810

First    106

815

106

815

Second

805

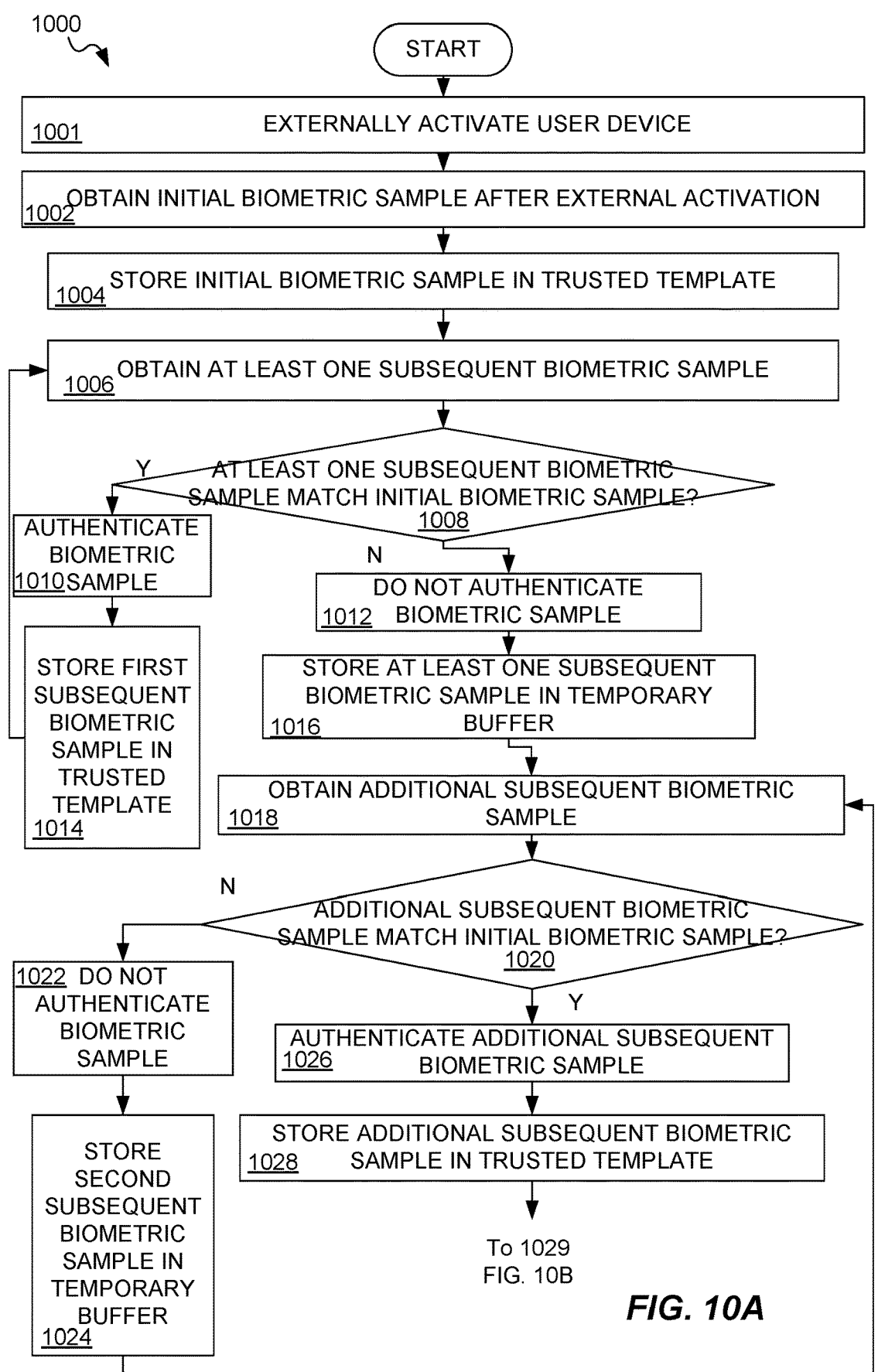

1000

START

1001    EXTERNALLY ACTIVATE USER DEVICE

1002    OBTAIN INITIAL BIOMETRIC SAMPLE AFTER EXTERNAL ACTIVATION

1004    STORE INITIAL BIOMETRIC SAMPLE IN TRUSTED TEMPLATE

1006    OBTAIN AT LEAST ONE SUBSEQUENT BIOMETRIC SAMPLE

AT LEAST ONE SUBSEQUENT BIOMETRIC SAMPLE MATCH INITIAL BIOMETRIC SAMPLE? 1008

Y

AUTHENTICATE BIOMETRIC 1010 SAMPLE

N

DO NOT AUTHENTICATE 1012    BIOMETRIC SAMPLE

STORE FIRST SUBSEQUENT BIOMETRIC SAMPLE IN TRUSTED TEMPLATE 1014

STORE AT LEAST ONE SUBSEQUENT BIOMETRIC SAMPLE IN TEMPORARY BUFFER 1016

OBTAIN ADDITIONAL SUBSEQUENT BIOMETRIC SAMPLE 1018

ADDITIONAL SUBSEQUENT BIOMETRIC SAMPLE MATCH INITIAL BIOMETRIC SAMPLE? 1020

N

1022  DO NOT AUTHENTICATE BIOMETRIC SAMPLE

Y

AUTHENTICATE ADDITIONAL SUBSEQUENT 1026    BIOMETRIC SAMPLE

STORE SECOND SUBSEQUENT BIOMETRIC SAMPLE IN TEMPORARY BUFFER 1024

STORE ADDITIONAL SUBSEQUENT BIOMETRIC 1028    SAMPLE IN TRUSTED TEMPLATE

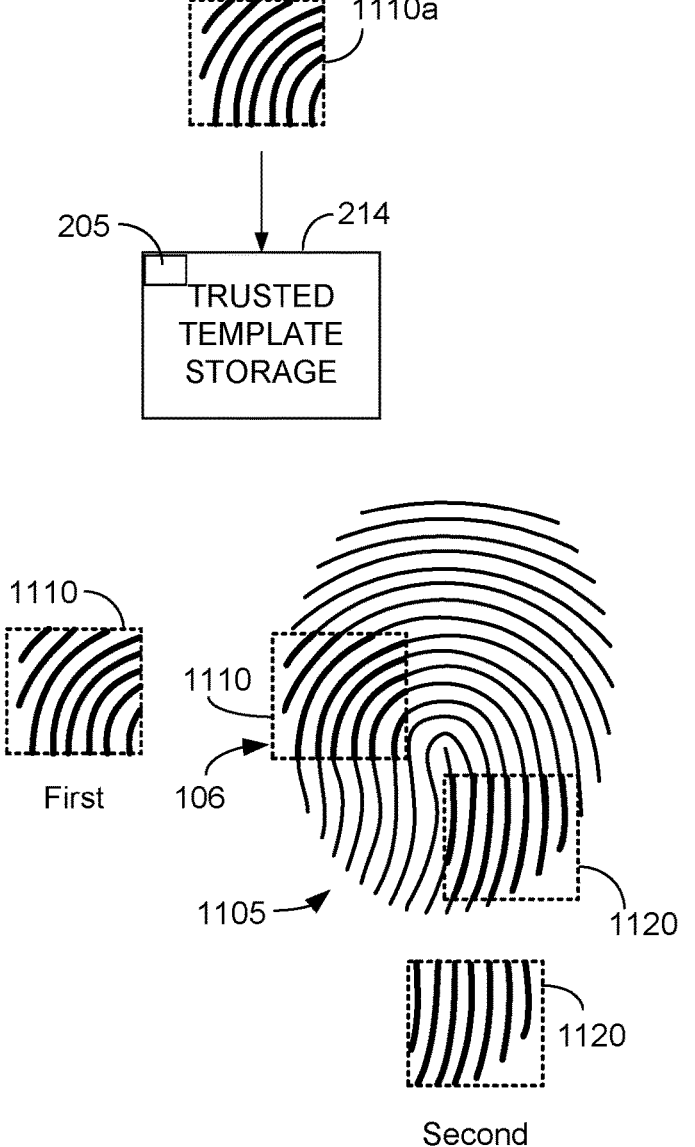
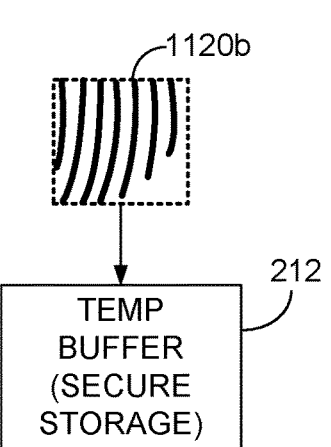
*FIG. 11B*

1300

START

1301  EXTERNALLY ACTIVATE USER DEVICE

1302 OBTAIN INITIAL BIOMETRIC SAMPLE AFTER EXTERNAL ACTIVATION

1304  STORE INITIAL BIOMETRIC SAMPLE IN TRUSTED TEMPLATE

1306  OBTAIN AT LEAST ONE SUBSEQUENT BIOMETRIC SAMPLE

AT LEAST ONE SUBSEQUENT BIOMETRIC SAMPLE MATCH INITIAL BIOMETRIC SAMPLE?
1308

Y

N

AUTHENTICATE BIOMETRIC 1310 SAMPLE

DO NOT AUTHENTICATE BIOMETRIC SAMPLE
1312

STORE FIRST SUBSEQUENT BIOMETRIC SAMPLE IN TRUSTED TEMPLATE
1314

STORE AT LEAST ONE SUBSEQUENT BIOMETRIC SAMPLE IN TEMPORARY BUFFER
1316

OBTAIN ADDITIONAL SUBSEQUENT BIOMETRIC SAMPLE
1318

ADDITIONAL SUBSEQUENT BIOMETRIC SAMPLE MATCH INITIAL BIOMETRIC SAMPLE?
1320

N

Y

1322  DO NOT AUTHENTICATE BIOMETRIC SAMPLE

AUTHENTICATE ADDITIONAL SUBSEQUENT BIOMETRIC SAMPLE
1326

STORE ADDITIONAL SUBSEQUENT BIOMETRIC SAMPLE IN TEMPORARY BUFFER
1324

STORE ADDITIONAL SUBSEQUENT BIOMETRIC SAMPLE IN TRUSTED TEMPLATE
1328

START

1601   EXTERNALLY ACTIVATE USER DEVICE

1602 OBTAIN INITIAL BIOMETRIC SAMPLE AFTER EXTERNAL ACTIVATION

1604   STORE INITIAL BIOMETRIC SAMPLE IN TRUSTED TEMPLATE

1606   OBTAIN AT LEAST ONE SUBSEQUENT BIOMETRIC SAMPLE

AT LEAST ONE SUBSEQUENT BIOMETRIC SAMPLE MATCH INITIAL BIOMETRIC SAMPLE?
1608

Y

N

AUTHENTICATE BIOMETRIC 1610 SAMPLE

DO NOT AUTHENTICATE 1612   BIOMETRIC SAMPLE

STORE FIRST SUBSEQUENT BIOMETRIC SAMPLE IN TRUSTED TEMPLATE 1614

STORE AT LEAST ONE SUBSEQUENT BIOMETRIC SAMPLE IN TEMPORARY 1616   BUFFER

OBTAIN ADDITIONAL SUBSEQUENT BIOMETRIC 1618   SAMPLE

ADDITIONAL SUBSEQUENT BIOMETRIC SAMPLE MATCH INITIAL BIOMETRIC SAMPLE ?
1620

N

Y

1622   DO NOT AUTHENTICATE BIOMETRIC SAMPLE

AUTHENTICATE ADDITIONAL SUBSEQUENT 1626   BIOMETRIC SAMPLE

STORE ADDITIONAL SUBSEQUENT BIOMETRIC SAMPLE IN TEMPORARY BUFFER 1624

STORE ADDITIONAL SUBSEQUENT BIOMETRIC 1628   SAMPLE IN TRUSTED TEMPLATE

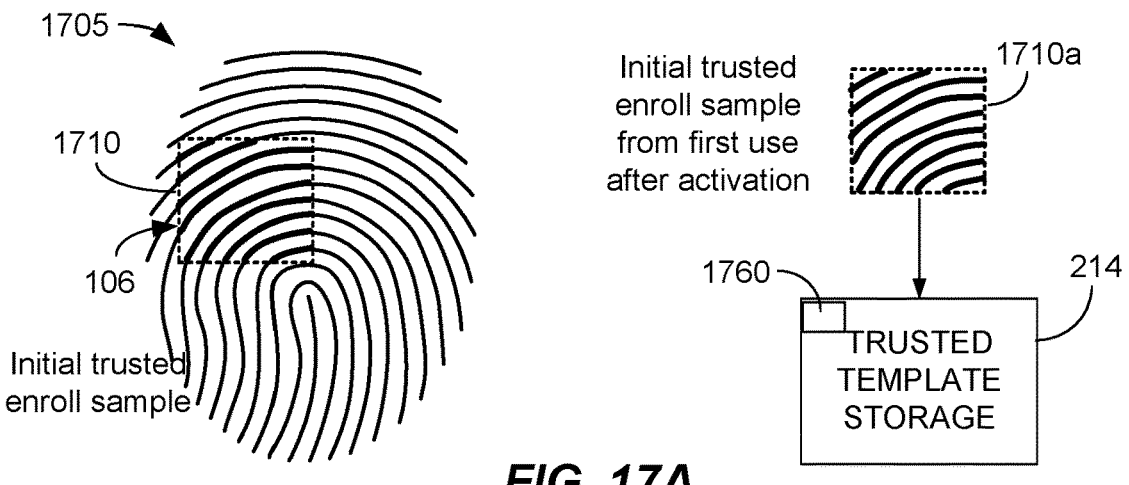
FIG. 17A
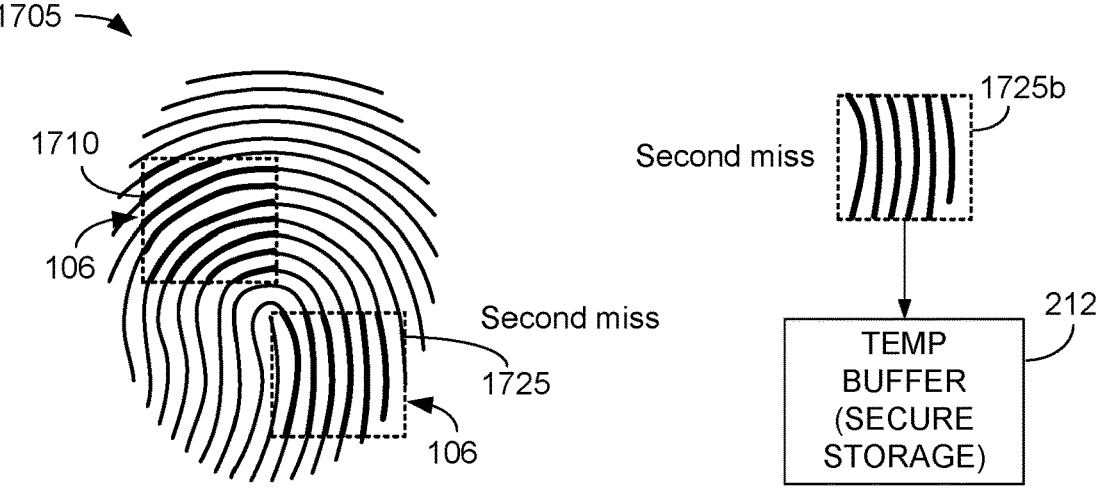
FIG. 17B
FIG. 17C

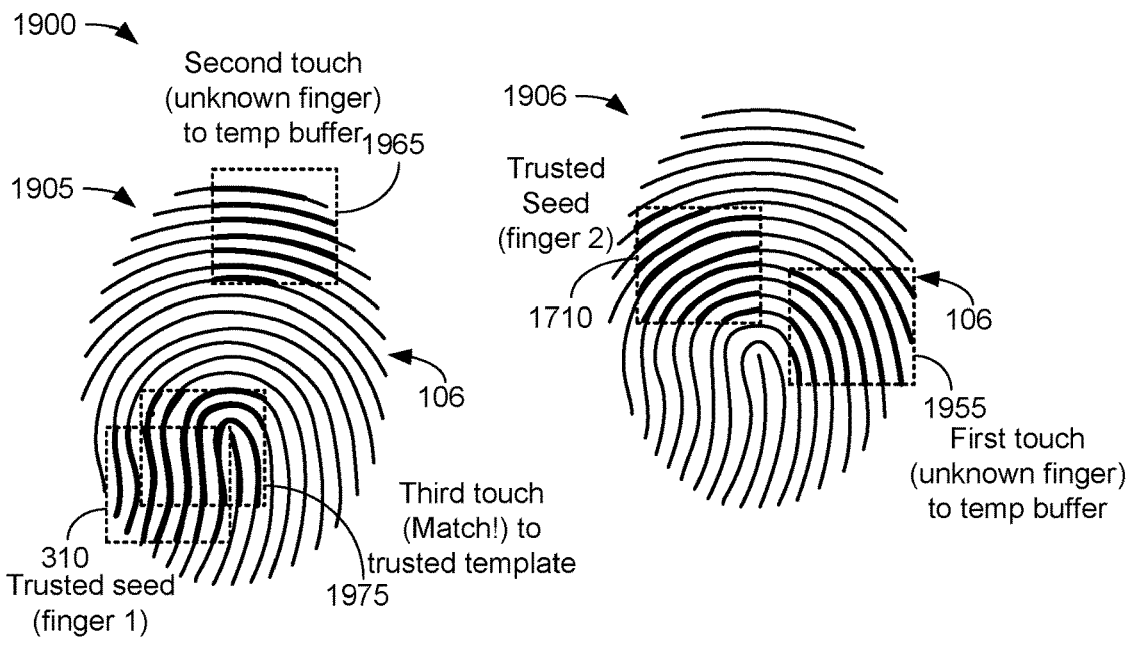

1900 →

Second touch
(unknown finger)
to temp buffer 1965

1905 →

Trusted
Seed
(finger 2) 1710

1906 →

106

1710

106

1955
First touch
(unknown finger)
to temp buffer

310
Trusted seed
(finger 1)

Third touch
(Match!) to
trusted template
1975

214    Trusted template storage

1951    Trusted template

310a
Trusted seed
(finger 1)

1710a
Trusted seed
(finger 2)

1975a
Third
touch
match

1955a

1965a

212    Temporary buffer

First miss
(unknown finger)

Second miss
(unknown finger)

1955b

1965b 1955 and 1965
added to trusted
template after
1975 matches
310a and/or
1710a
Implied Trust

*FIG. 19*

SYSTEM AND METHOD FOR SECURE BIOMETRIC ENROLLMENT

BACKGROUND

Remote biometric user authentication is becoming more and more ubiquitous as a way of verifying a user's identity and securely requesting the authorization of transactions initiated by that user. Biometric authentication for example, fingerprint matching, can be performed using an electronic device in the user's possession e.g., a smart card. In this example, a user's identity may be verified by comparing a fingerprint sample provided by the user to a trusted biometric template of that user. A trusted biometric template may be created by, for example, obtaining and storing one or more trusted samples of a user's fingerprint (or portions of a fingerprint) in a trusted template. Subsequent fingerprint samples are compared against the trusted template to authenticate the user. The trusted template may also be referred to as a trusted biometric template or a verification template.

The quality of stored biometric templates and the process of building them is critical to the requisite performance requirements of any biometric sensor that will be used repeatedly to authenticate a potential user.

A typical biometric sensor may capture only a portion of a biometric feature such as a fingerprint. For example, the surface of a large thumb may be as much as 2-3 cm wide and 3-4 cm long. Even a larger area fingerprint sensor with a 1 cm-by-1 cm imaging area may only capture 10% of the imageable finger surface during a single touch.

Any stored template of biometric information should contain as complete a map as possible of any subject biometric feature. The challenge is to capture and store a complete map of that feature before that sensing device is used as a way to authenticate a user, and to authorize a transaction. Building a biometric template typically uses an interactive and iterative process with the user, the process referred to generally as user enrollment or biometric enrollment. User enrollment typically occurs during a period of time in which the smart card cannot be used for a transaction, and typically requires that numerous biometric feature samples be obtained to create the initial trusted template. Unfortunately, this process can be time consuming and may prevent a user from using the smart card until the enrollment process is complete.

SUMMARY

In an exemplary embodiment, a method for secure biometric enrollment includes externally activating a user device, the user device having biometric capability, obtaining an initial biometric sample of a user subsequent to externally activating the user device, storing the initial biometric sample as a trusted sample in a trusted template, obtaining at least one subsequent biometric sample, comparing the at least one subsequent biometric sample as it is obtained to the trusted template, and based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into trusted template and retroactively extending trust of association with the user to the non-matching at least one subsequent biometric sample in the temporary buffer, thus incorporating the non-matching at least one subsequent biometric sample in the temporary buffer into the trusted template.

In another exemplary embodiment, a system for secure biometric enrollment includes a user device having a processor operatively coupled to a memory, the memory having at least a temporary buffer and a trusted template storage, the user device having biometric capability, the user device configured to obtain an initial biometric sample of a user subsequent to externally activating the user device, the memory configured to store the initial biometric sample as a trusted sample in the trusted template storage, the user device configured to obtain at least one subsequent biometric sample, the processor configured to compare the at least one subsequent biometric sample as it is obtained to the trusted template, and based on the comparing, when the at least one subsequent biometric sample does not match the initial biometric sample in the trusted template, the memory configured to store the at least one non-matching subsequent biometric sample into the temporary buffer until an additional subsequent biometric sample is obtained and does match the initial biometric sample in the trusted template storage, the processor configured to place the matching additional subsequent biometric sample into the trusted template storage and retroactively extend trust of association with the user to the non-matching at least one subsequent biometric sample in the temporary buffer, the processor configured to incorporate the non-matching at least one subsequent biometric sample in the temporary buffer into the trusted template storage.

In another exemplary embodiment, a method for secure biometric enrollment includes externally activating a user device, the user device having biometric capability, obtaining an initial biometric sample of a user subsequent to externally activating the user device, storing the initial biometric sample as a trusted sample in a trusted template, obtaining at least one subsequent biometric sample, comparing the at least one subsequent biometric sample as it is obtained to the trusted template, based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into the trusted template creating an expanded trusted template, and retroactively comparing the non-matching at least one subsequent biometric sample in the temporary buffer to the expanded trusted template, and when the non-matching at least one subsequent biometric sample matches the expanded trusted template, incorporating the non-matching at least one subsequent biometric sample in the temporary buffer into the expanded trusted template.

In another exemplary embodiment, a method for secure biometric enrollment includes externally activating a user device, the user device having biometric capability, obtaining an initial biometric sample of a user subsequent to externally activating the user device, storing the initial biometric sample as a trusted sample in a trusted template, obtaining at least one subsequent biometric sample, comparing the at least one subsequent biometric sample as it is obtained to the trusted template, based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into the trusted template creating an expanded trusted template, obtaining an additional subsequent biometric sample, comparing the additional subsequent biometric sample as it is obtained to the trusted template and to the at least one subsequent biometric sample, and based on the comparing, when the additional subsequent biometric sample matches the at least one subsequent biometric sample, associating the additional subsequent biometric sample and the at least one subsequent biometric sample in the temporary buffer.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

Exemplary embodiments can be better understood with reference to the following drawings. The components in the drawings are not necessarily to scale, emphasis instead being placed upon clearly illustrating the principles of the present invention.

FIG. 6 is a flow chart describing an example of the operation of a method for secure biometric enrollment.

FIG. 7 is a functional block diagram of an apparatus for secure biometric enrollment.

FIG. 10A and FIG. 10B collectively are a flow chart describing an example of the operation of a method for secure biometric enrollment.

FIGS. 11A, 11B, 11C and 11D are a series of drawings illustrating an exemplary embodiment of secure biometric enrollment.

FIG. 13A and FIG. 13B collectively are a flow chart describing an example of the operation of a method for secure biometric enrollment.

4

Figure 16B:
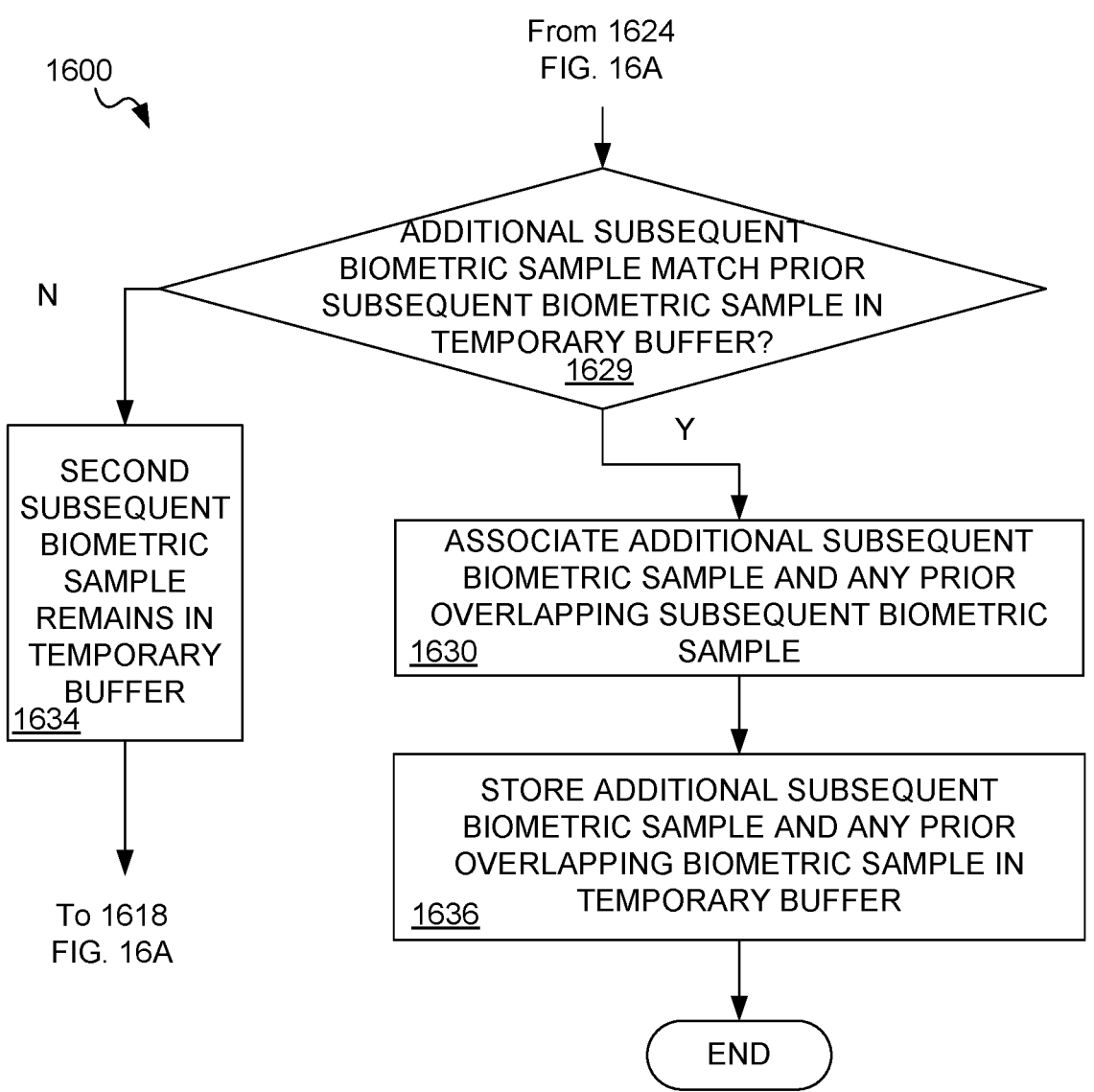

FIG. 16A and FIG. 16B collectively are a flow chart describing an example of the operation of a method for secure biometric enrollment.

FIGS. 17A, 17B, 17C, and 17D are a series of drawings illustrating an exemplary embodiment of secure biometric enrollment.

Figures 17D, 18:
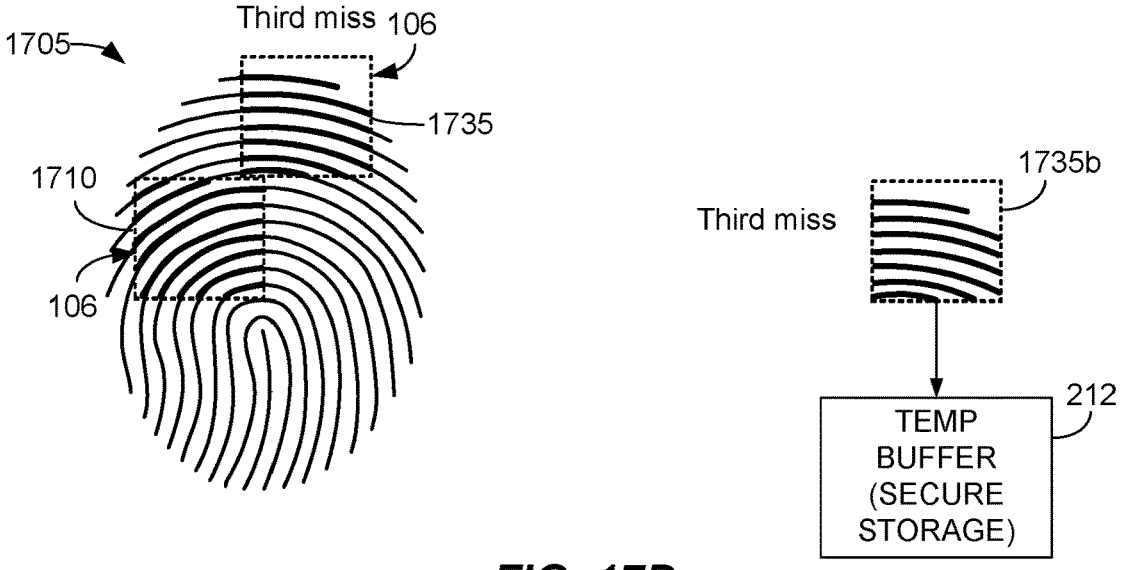

FIG. 18 is a diagram showing a series of biometric samples in a temporary buffer and in a trusted template in a trusted template storage.

FIG. 19 is a diagram showing a series of biometric samples being compared to trusted samples in a biometric template.

DETAILED DESCRIPTION

While aspects of the subject matter of the present application may be embodied in a variety of forms, the following description and accompanying drawings are merely intended to disclose some of these forms as specific examples of the subject matter. Accordingly, the subject matter of this application is not intended to be limited to the forms or embodiments so described and illustrated.

Unless defined otherwise, all terms of art, notations and other technical terms or terminology used herein have the same meaning as is commonly understood by one of ordinary skill in the art to which this application belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the application and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

Biometric Identity Authentication or Verification

There are currently a number of ways to verify that a person is who they claim to be; for example, comparing a feature that is unique to a person to a pre-existing version of that feature that may be subject to counterfeit. For example, matching a newly generated handwriting signature to a handwriting signature on file is one traditional way of verifying a person's identity, but it is subject to forgery. As another example, matching a person's face to a photograph on their official identification card is another well accepted form of biometric identity authentication. These matching techniques (identity verification and authentication techniques) are useful, but these tests can be circumvented.

A user's fingerprint is a unique biometric identifier (or feature) of that user. For example, fingerprints have been used by law enforcement and immigration authorities for some time, but the expense of collecting, archiving and matching fingerprints have traditionally been costly and impractical. Digital technologies have simplified the capture of an image of a fingerprint. For example, an image of a fingerprint can be captured, encoded and stored electronically so that key identification features of the user can be associated with this particular fingerprint image. Then a new fingerprint (image, sample) can be captured, and compared with the previously stored fingerprint image and a statistical estimate can be made corresponding to the likelihood that the new fingerprint is a sufficient match with the previously collected fingerprint sample(s).

A fingerprint is one of many modalities that may be useful for biometric authentication. Other biometric modalities exist, such as two dimensional (2D) and three dimensional (3D) facial recognition, palm recognition, iris recognition, gait recognition, voice recognition, etc. Different biometric modalities offer different experiences for the user and different metrics for confidence of a match. However, attempting to maintain the biometric identifier or feature as confidential is not practical.

Biometric Smart Card

A modern smart card may incorporate a biometric sensor capable of obtaining, processing, analyzing, and storing a biometric sample. A biometric sensor, and processing circuitry on a modern smart card may be configured to operate on power provided to the smart card by an external power source, or by a power source on the smart card. For example, a contact-enabled smart card may obtain power from a reader terminal, an enrollment sleeve, or another power source. A non-contact enabled smart card may obtain power from a reader terminal, a smart phone, or another power source using, for example, near field communication (NFC) or other wireless technology.

A device without a graphic display such as a biometrically enabled smart card presents a much greater challenge to creating a comprehensive trusted biometric template than devices with display capability such as smartphones. Such a smart card could be electronically or wirelessly connected to a host device with a native display to perform an equivalent interactive enroll process. The drawback is that this is often a complicated process that is user unfriendly and could create a security vulnerability by breaching data security during the card/host communications link.

It is common to see biometric sensors, such as, for example, fingerprint sensors, or other biometric sensors configured to capture one or more of image data, audio data, ultrasonic data, electric field data, and other data installed on human interface devices such as smartphones, laptops, tablets, or other devices. For example, a fingerprint sensor installed on a smart phone can be used to verify the identity of the user. The fingerprint sensor can also be used as a data entry or a control mechanism for the smart phone. For example, the fingerprint sensor can detect the presence of a single finger touch and be programmed to activate a smart phone function or application upon detection.

As fingerprint sensors gain in implementation and user acceptance, fingerprint sensors are now finding use in numerous other devices such as, for example, smart cards, fitness monitors or trackers, wearable devices, domestic and industrial appliances, automotive components, and internet of things (IOT) devices. Some devices, such as smart cards and IOT devices, have limited or no user interfaces or status indicators such as screens, speakers, light emitting diodes (LEDs), or audio signals with which the device may impart information to the user. Such devices may also have limited or no user input mechanisms for receiving user input due to lack of a keyboard, switches, buttons, or levers.

In order for a biometric sensor, such as, for example, a fingerprint sensor, to function as a user verification device, a sufficiently detailed template (or multiple templates) of a user's biometric data (e.g., fingerprint) must be captured and stored during an enrollment process, as known to those having ordinary skill in the art. The stored template (i.e., a trusted template, a trusted biometric template, or a verification template, of biometric data (e.g., a fingerprint image)) is used to compare with biometric image data generated by the biometric sensor (e.g., an image of a finger, or one or more portions of a finger, sensed by the fingerprint sensor, sometimes referred to as a "live sensed image", a "live fingerprint sample", a "live image sample" or a "live image") when the device is in subsequent general use, as known to those having ordinary skill in the art. In an embodiment employing a fingerprint sensor as the biometric sensor, a user is permitted to access the functionality of the device, or use the smart card for a transaction, if the live sensed image of the finger matches the stored trusted template. Accordingly, it is desirable to acquire and store a trusted template of sufficient scope and quality during a biometric enrollment process to enable verification that a subsequent biometric sample belongs to the user. If the stored trusted template is not of sufficient scope and quality, the user may experience false acceptance or rejection of the verification attempt at an unacceptable rate.

While concepts described herein are applicable to various biometric sensors and associated biometric data and verification templates of biometric data, for purposes of illustration, and not for limitation, examples are frequently described herein in the context of fingerprint sensors and fingerprint data (i.e., images).

Typically, the fingerprint sensor used for the enrollment process has a sensing area smaller than the edge-to-edge surface of an average finger, such that a viable verification template (trusted template), is built up from multiple images to fully map the entire surface of the finger. Specifically, the user is directed to repeatedly present their finger on the sensing area of the fingerprint sensor until multiple images of sufficient scope, expanse, and quality are gathered to build a complete fingerprint verification template (also referred to as a trusted template, a trusted biometric template, or a verification template). However, a fingerprint sensor installed on the smart card will encounter difficulties throughout the enrollment process. For example, the limited feedback/input capabilities make it difficult to notify the user: (i) to begin the enrollment process, (ii) to repeatedly present his or her finger during the enrollment process, (iii) that a sufficient number of contiguous images have been gathered, and (iv) that the enrollment process is complete. An enrollment process is described in commonly-owned U.S. Patent Application Publication No. 2020/0311509, entitled "Secure, Remote Biometric Enrollment", the entire content of which is hereby incorporated into this document by reference in its entirety as if set forth fully herein.

Another enrollment alternative is to enroll several touches onto the card using a powered sleeve or host device through near field communication (NFC) technology. However, using such a sleeve or a host device adds complexity and increases cost.

Accordingly, it would be desirable to overcome some of the biometric enrollment challenges mentioned above.

In the context of the present application, a "sensor element" comprises an arrangement of one or more components configured to produce a signal based on a measurable parameter (e.g., capacitance, light/optics, heat/thermal, pressure, etc.), characteristics of which will vary based on the presence or absence of an object that is in local proximity to the sensor element. For example, a capacitive fingerprint sensor will comprise an array of such sensor elements configured to produce an electrical signal proportional to the impedance of the surface of a finger placed on or near the fingerprint sensor. The sensitivity of each of the sensor elements of the fingerprint sensor is such that characteristics of the signal produced at each sensor element will vary based on surface characteristics, such as ridge patterns of the portion of a finger placed on or near the array, and the varying characteristics of signals produced at each sensor element may be combined or otherwise processed to form a data file that is a biometric representation of the finger surface placed on or near the array. Specific examples of such sensor elements may include, but are not restricted to, capacitive, ultrasonic, optical, thermal, and pressure sensor elements.

In addition, sensor elements contemplated herein include both silicon-based sensors in which sensor elements are formed directly on a silicon semiconductor substrate and may form a 2-dimensional array of sensing pixels and off-silicon sensors in which sensor elements are not disposed directly on a silicon semiconductor substrate (e.g., so-called off-chip sensors) but formed on a non-silicon substrate and are conductively connected to a remotely-located control element, which may be a silicon-based semiconductor chip, such as an application specific integrated circuit (ASIC).

While aspects of this application are presented in the context of specific types of sensor elements and fingerprint sensor configurations, it should be appreciated that implementations of those aspects are not necessarily limited to a specific type of sensor element of the fingerprint sensors described herein.

As used herein, the terms "authentication" and "identity authentication" refer to the function of confirming the identity of a user requesting the initiation of a transaction. Identity authentication generally refers to verifying in real time that a user is who they claim to be for the purposes of initiating a transaction and generating a signal corresponding with matching a presented biometric to a reference.

As used herein, the term "verification" refers to at least part of an authentication process involving comparing a new biometric sample to a trusted biometric sample that may be part of a trusted template, which may also be referred to as a verification template, using a matching algorithm. Verification may result in determining a positive correlation of features in the compared samples resulting from the comparison of the trusted template (having one or more previously obtained biometric features), created during an enrollment process, with a live image (having one or more current biometric features) biometric sample. A trusted template typically identifies many distinctive features that can be used for correlation with a biometric sample, while the live biometric sample may only have a few distinctive features. When a particular correlation threshold between the trusted template and the live biometric sample is achieved, the observation is considered a positive verification and an authorization signal is generated indicating that the user's identity is authenticated.

As used herein, the term "validation" refers to offering proof (e.g., signed/encrypted) during a transaction request that a biometric authentication was successful.

In an exemplary embodiment, a system and method for secure biometric enrollment is disclosed. Embodiments of the system and method for secure biometric enrollment may include a way to build a trusted template without compromising security. In an exemplary embodiment, the system and method may include temporarily saving any missed or non-overlapping (non-correlated and/or non-matching) biometric samples (e.g., finger touches on a sensor) that would normally be discarded, into a secure on-card memory buffer, or temporary buffer, for future use. Those non-overlapping touches do not have sufficient features that correlate with features in an initial trusted biometric sample in a trusted template, and therefore do not match the initial trusted biometric sample and remain in the temporary buffer until a sample having a verifiable image (i.e., a subsequent biometric sample) that matches (or partially matches) with or that at least partially overlaps (partially matches) with the stored initial biometric sample (also referred to as a stored template seed) is captured by the sensor. This is a secure process since the images that are in the temporary buffer can only be added to the trusted template once a validating image (another subsequent live captured image) that overlaps with the stored template seed is presented to the sensor and verified as matching with the stored template seed.

Exemplary embodiments of the system and method described herein allow a user to securely enroll their biometric information into a smart card, or other biometric-capable device, and build a trusted template securely and significantly faster and with higher quality than previous methods.

Exemplary embodiments of the system and method described herein are directed to an enrollment system and method that uses a trusted template that is seeded with an initial biometric sample. The initial biometric sample may be an image of or an electronic representation of a portion of a fingerprint. The initial biometric sample may be obtained and stored during or subsequent to an external activation process, or during a limited window of trust and may also be referred to as a "trusted capture" or a "trusted biometric capture."

As used herein, the term "limited window of trust" may comprise a period of time that may begin with card activation or a card activation process. The limited window of trust may comprise a time period during which the smart card is enabled for one or more transactions and during which an implied or imputed level of trust may be assigned to or associated with the initial biometric sample. The initial biometric sample may be sampled, obtained and stored in a secure memory as part of a trusted template after an external activation process and during an enrollment period during which a limited window of trust may be established. The limited window of trust may be a time period that may range from the time immediately after card activation to hours, days, weeks, or longer.

In an exemplary embodiment, the limited window of trust comprises a time period during which trust in the initial biometric sample (and the trusted template) is implied or imputed.

In an exemplary embodiment, the limited window of trust establishes the beginning of an enrollment period that may also be referred to as a transactional enrollment or transactional enrollment period.

As used herein, the term "match" refers to a condition where a sufficient number of features of a subsequent biometric sample correlate sufficiently with features of an initial biometric sample (seed) (or another biometric sample) so that the subsequent biometric sample may be considered to belong to the same individual (or finger) as does the initial biometric sample. A match may be a complete match or a partial match. The sufficiency of the number of features of a subsequent biometric sample that correlate with features of an initial biometric sample (seed) (or another biometric sample) may be dependent on the implementation of a matcher and/or a matching algorithm. A "match" may also be defined by a statistical probability that may determine that subsequent biometric sample may be considered to belong to the same individual (or finger) as does the initial biometric sample (or another biometric sample).

In an exemplary embodiment, the term "partial match" refers to a condition where a sufficient number of features of a subsequent biometric sample overlap sufficiently with features of an initial biometric sample (seed) (or another biometric sample) so that the subsequent biometric sample may be considered to belong to the same individual (or finger) as does the initial biometric sample (seed).

As used herein, the term "correlated" refers to a condition where at least some features of a current or live biometric sample compare to at least some features of a previously captured and stored biometric sample (e.g., a trusted biometric sample, or a trusted template) with sufficient statistical significance so as to allow a biometric matcher, or biometric matching algorithm, to provide evidence that the user associated with the current or live biometric sample is the same as the user associated with the previously captured and stored biometric sample (e.g., a trusted biometric sample, or a trusted template). Examples of features that may correlate may include, for example, ridges, valleys and other topographical features of a fingerprint.

As used herein, the term "non-matching" refers to a condition where an insufficient number of features of a current or live biometric sample correlate with a sufficient number of features of a previously captured and stored biometric sample (e.g., a trusted biometric sample, or a trusted template) with sufficient statistical significance so as to allow a biometric matcher, or biometric matching algorithm, to have sufficient evidence to reach a conclusion that the user associated with the current or live biometric sample is the same as the user associated with the previously captured and stored biometric sample (e.g., a trusted biometric sample, or a trusted template). In such case, the biometric matcher, or biometric matching algorithm may reach an inconclusive determination as to whether the user associated with the current or live biometric sample is the same as the user associated with the previously captured and stored biometric sample (e.g., a trusted biometric sample, or a trusted template).

As used herein, the term "trusted template" may refer to a secure electronically stored data collection that may comprise a collection of biometric samples, or electronic representations of the biometric samples, that have been authenticated as belonging to a particular user. A trusted template may evolve or expand with the addition of subsequent biometric samples that may not initially form part of the trusted template, but that may form part of an expanded trusted template after certain conditions are satisfied. An expanded trusted template may continue to evolve with the addition of subsequently obtained trusted biometric samples.

As used herein, the term "initial biometric sample" may include a biometric sample acquired after external activation of the biometric capable device and that is implicitly trusted and placed in a trusted template. The "initial biometric sample" may also include a biometric sample from more than one finger. An electronic representation of the initial biometric sample or samples may be saved and stored to the trusted template.

As used herein, the term "externally activating" or "external activation" may comprise activating a biometric capable device (such as a smart card, a portable communication device, etc.) for use prior to generating a trusted template.

As used herein, the term "trust of association with the user" refers to a biometric sample (or subsequent biometric sample) that is assumed to be that of the authorized, valid, or rightful user of the device.

As used herein, the terms "implicit trust" and "implicit trust of association with the user" refer to a biometric sample that may not match with a biometric sample in a trusted template, but is assumed to be that of the authorized, valid, or rightful user of the device, and is therefore "implicitly" trusted.

As used herein, the terms "explicit trust" and "explicit trust of association with the user" refer to a biometric sample that at least partially matches with a biometric sample in a trusted template, and is assumed to be that of the authorized, valid, or rightful user of the device, and is therefore "explicitly" trusted.

As used herein, the term "overlap" refers to a condition where a biometric sample may have at least some, and sufficient commonality with another biometric sample so as to permit at least a partial match between the biometric samples. An "overlap" may be a complete overlap, where substantially all features of a biometric sample are common (or match) all features of another biometric sample; or a partial overlap, where fewer than all features of a biometric sample are common (or match) with features of another biometric sample. A partial overlap may result in a match between overlapping biometric samples if it is determined that a sufficient number of features are common to both biometric samples.

As used herein, the terms "associate" and "association" may refer to a condition where a first biometric sample may share at least some common features with a second biometric sample such that the two biometric samples are considered to be related to the same user. For example, when two biometric samples are associated, the two biometric samples may be grouped together.

In an exemplary embodiment, a first transaction performed by a user after external card activation may result in the obtaining of the initial biometric sample, and the saving of the initial biometric sample, or an electronic representation of the initial trusted sample, as an initial trusted sample in the trusted template.

In an exemplary embodiment, any subsequent successful biometric authentication against the trusted template provides explicit trust that the valid user is currently in possession of the card.

In an exemplary embodiment, a subsequent biometric sample that does not match the initial biometric sample (in the trusted template) may be placed in a separate storage location, such as in a secure memory (buffer) associated with the smart card, or other device.

In an exemplary embodiment, buffered samples (assumed that custody of the device containing the buffered samples is maintained) are implicitly trusted (trust extended to non-matching samples) based on an assumption that user has maintained custody of the smart card prior to subsequent successful authentication against the initial biometric sample in the trusted template.

In an exemplary embodiment, non-matching biometric samples that in existing applications are typically discarded after a failed authentication attempt are instead temporarily stored in a temporary buffer pending establishment of trust of association with the user to the non-matching biometric sample. Such establishment of trust of association with the user may occur retroactively, such that non-matching biometric samples may be stored in the temporary buffer until a subsequent verifiable biometric sample that matches (or has sufficient features that correlate with) the initial biometric sample is obtained, after which the non-matching, biometric sample(s) may be considered trustworthy and transferred from the temporary buffer to the trusted template.

In an exemplary embodiment, trust in a non-matching sample is subsequently established upon successful biometric authentication of a subsequent biometric sample against the existing trusted template.

In an exemplary embodiment, subsequently establishing trust of association with the user grants trust to the current sample, extends trust to buffered samples, and incorporates current and buffered samples into the trusted template.

In an exemplary embodiment, a non-matching (i.e., having an insufficient number of correlated features) subsequent biometric sample is granted trust, while the non-matching additional subsequent biometric sample is placed into a temporary memory (buffer).

In an exemplary embodiment, trust may be retroactively extended or applied to a non-matching subsequent biometric sample that is stored in a temporary buffer.

In an exemplary embodiment, trust of association with the user may be retroactively extended or applied to a non-matching subsequent biometric sample that is stored in a temporary buffer.

In an exemplary embodiment, trust of association with the user is implicitly extended to buffered samples.

In an exemplary embodiment, explicit trust of association with the user may be retroactively extended or applied to previously non-matching samples stored in the temporary buffer by comparing the non-matching sample(s) to the trusted template each time a new matching sample is added to the trusted template. In the case of a match, granting trust and adding the now trusted biometric sample into the trusted template, forming an expanded trusted template. In an exemplary embodiment, a trusted template may be seeded with an initial trusted sample, and may then be expanded with additional trusted samples, so that additional subsequent biometric samples may be compared against the trusted template, which may include the initial trusted sample and any additional trusted samples that may have been added to the expanded trusted template based on a subsequent biometric sample matching the initial trusted sample and any additional trusted samples.

In an exemplary embodiment, an initial trusted sample is placed into a trusted template and at least one subsequent biometric sample may be obtained. In an exemplary embodiment, the at least one subsequent biometric sample may not match the initial trusted sample and the at least one subsequent biometric sample may be placed in a temporary buffer. In an exemplary embodiment, an additional subsequent biometric sample may then be obtained. If the additional subsequent biometric sample matches the trusted sample in the trusted template and matches the at least one subsequent biometric sample in the temporary buffer, the additional subsequent biometric sample and the at least one subsequent biometric sample may be placed into the trusted template, creating an expanded trusted template. In an exemplary embodiment, the additional subsequent biometric sample may overlap at least partially with the initial trusted sample and the at least one subsequent biometric sample such that the additional subsequent biometric sample forms an association between the initial trusted sample and the at least one subsequent biometric sample.

In an exemplary embodiment, there may be more than one subsequent biometric sample in the temporary buffer and the additional subsequent biometric sample may overlap, or partially overlap (and partially match), with fewer than all of the subsequent biometric sample in the temporary buffer. In such an exemplary embodiment, when the additional subsequent biometric sample at least partially matches the initial trusted sample (or any other trusted sample in the trusted template), only the subsequent biometric samples in the temporary buffer that at least partially match with the additional subsequent biometric sample are transferred to the trusted template.

In an exemplary embodiment, after an initial card activation and prior to first use, a point of sale (POS) terminal may be used to activate the smart card and begin the enrollment process described herein. In an exemplary embodiment, the user may enroll one or more fingers as described herein, or the smart card or the POS terminal may prompt the user to enroll one or more fingers as described herein.

In an exemplary embodiment, the term "match" refers to a condition where a sufficient number of features of a subsequent biometric sample correlate sufficiently with features of an initial biometric sample (seed) so that the subsequent biometric sample may be considered to belong to the same individual (or finger) as does the initial biometric sample. A match may be a complete match or a partial match. The sufficiency of the number of features of a subsequent biometric sample that correlate with features of an initial biometric sample (seed) may be dependent on the implementation of a matcher and/or a matching algorithm.

In an exemplary embodiment, the term "partial match" refers to a condition where a sufficient number of features of a subsequent biometric sample overlap sufficiently with features of an initial biometric sample (seed) so that the subsequent biometric sample may be considered to belong to the same individual (or finger) as does the initial biometric sample.

Figure 1:
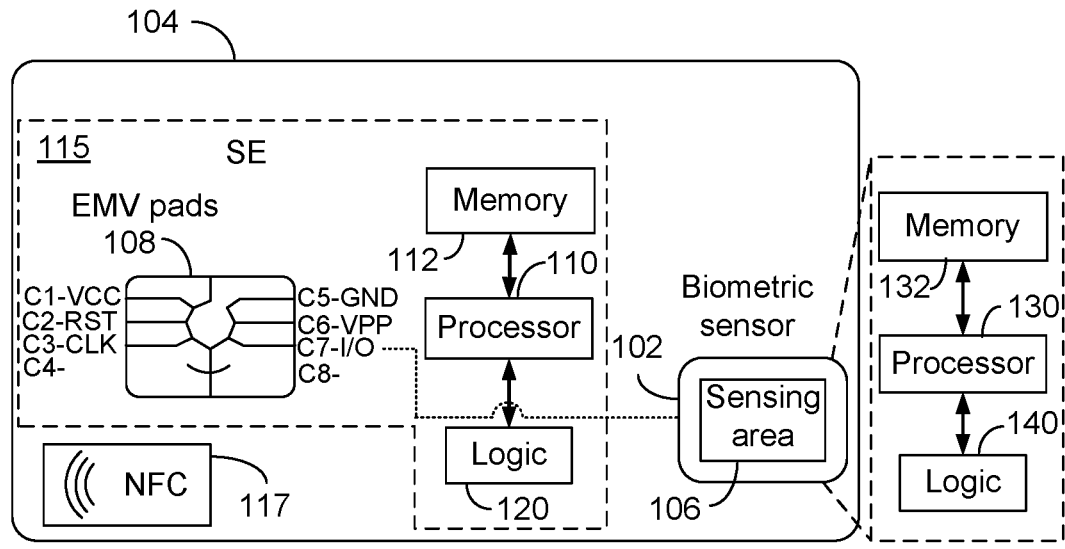
FIG. 1 illustrates a biometric sensor assembly or a biometric sensor, such as fingerprint sensor, instantiated on a smart card according to some embodiments.

FIG. 1 illustrates a biometric sensor assembly or a biometric sensor, such as biometric sensor 102, installed on a user device. In an exemplary embodiment, the user device may be a smart card 104 according to some embodiments and the biometric sensor 102 may be a fingerprint sensor. In other embodiments, a user device may be a device other than a smart card, such as, for example, a wearable device, a communication device, a personal computing device, a tablet, or another user device. In the illustrated embodiment shown in FIG. 1, the smart card 104 is a limited device, as described above, and the smart card 104 comprises the biometric sensor 102. In some embodiments, the smart card 104 comprises a fingerprint, or other biometric sensor 102, processor or processing circuitry 110, memory 112, logic 120 and contact pads 108 providing contacts for an external power source. In an exemplary embodiment, the biometric sensor 102 may also comprise processor or processing circuitry 130, memory 132 and logic 140. The contact pads 108 may be any type of input/output (I/O) interface, and as an example, may be referred to as EMV (Europay, Master-Card, Visa) pads and may be used to provide a physical connection to a POS terminal, or other host device. The processing circuitry 110 and 130 may be a microprocessor, microcontroller, microcontroller unit (MCU), application-specific integrated circuit (ASIC), field-programmable gate array (FPGA), or any combination of components config-ured to perform and/or control the functions of the smart card 104. The memory 112 and 132 may be a read-only memory (ROM) such as EPROM or EEPROM, flash, or any other storage component capable of storing executory pro-grams and information for use by the processing circuitry 110 and 130. The biometric sensor 102 may comprise sensor controlling circuitry and a sensor memory. The sensor controlling circuitry may be a microprocessor, microcon-troller, application-specific integrated circuit (ASIC), field-programmable gate array (FPGA), or any combination of components configured to perform and/or control the func-tions of the biometric sensor 102. The sensor memory may be a read-only memory (ROM) such as EPROM or EEPROM, flash, or any other storage component capable of storing executory programs and information for use by the processing circuitry 110 and 130. The sensor controlling circuitry is configured to execute fingerprint sensor appli-cation programming (i.e., firmware) stored in the sensor memory. The memory 112 and the sensor memory 132 may be the same component. The sensor controlling circuitry is coupled to or may be part of the processing circuitry 110 and 130. The various components of the smart card 104 are appropriately coupled and the components may be used separately or in combination to perform the embodiments disclosed herein.

In an exemplary embodiment, the memory 112 may comprise logic 120 and the memory 132 may comprise logic 140. The logic 120 and 140 may comprise software, firm-ware, instructions, circuitry, or other devices, configured to be executed by the processing circuitry 110 and 130, respec-tively, to control one or more functions of the smart card 104, as described herein.

In an exemplary embodiment, the biometric sensor 102, the processor 110 and/or 130, the memory 112 and/or 132, and the logic 120 and/or the logic 140 may be configured to capture one or more submitted current biometric features corresponding to a biometric sample that may comprise one or more biometric features that form a current user identity sample provided by a user, compare the one or more current biometric sample to a previously obtained biometric sample corresponding to a previously obtained user identity sample, and if the one or more current biometric features in the biometric sample match the previously obtained biometric sample, generate an authorization signal that identifies the current user identity sample as belonging to an authorized user, the authorization signal corresponding to a user initi-ated successful biometric user authentication.

In an exemplary embodiment, the user specific informa-tion that was previously captured and non-volatilely stored on the smart card 104 by an authorized user during a card initialization and user enrollment process comprises at least one biometric identifier of the authorized user.

The contact pads 108 comprise one or more power transmission contacts, which may connect electrical com-ponents of the smart card 104, such as an LED, the pro-cessing circuitry 110, memory 112, sensor elements (e.g., the biometric sensor 102) etc., to an external power source. In some embodiments, the contact pads 108 further com-prise one or more data transmission contacts that are distinct from the power transmission contacts which connect the smart card 104 to an external device configured to receive data from and/or transmit data to the smart card 104. In this context, the data transmission contacts of the smart card 104 are the contacts that convey data transmitted to or transmit-ted from the smart card 104.

The processing circuitry 110, the memory 112 and the logic 120 may comprise a secure element 115. The contact pads 108 may be part of the secure element 115 which includes the processing circuitry 110, memory 112, and logic 120, all of which are in electrical communication with the contact pads 108. In an exemplary embodiment, the secure element 115 may conform to an EMVCo. power manage-ment protocol commonly used on smart cards, and the contact pads 108 provide electric contacts between the smart card 104 and a host device, such as for example, a smart phone, an enrollment sleeve, a tablet computer, an external card reader, or other host device, to provide power to the processing circuitry 110 of the card and to read data from and/or write data to the memory 112. In an exemplary embodiment, a host device may provide temporary power to the smart card 104 using, for example, NFC technology, Qi power technology, a combination of NFC and Qi power technology, in which case the smart card 104 includes NFC element 117 or another power element (not shown).

In some embodiments, NFC capability may be imple-mented on the smart card 104 using NFC communication element 117 to communicate with a host device, and in some embodiments to allow a host device to provide power, or temporary power, to the smart card 104. NFC is a standards-based wireless communication technology that allows data to be exchanged between devices that are a few centimeters apart. NFC operates at 13.56 MHz and transfers data at up to 424 Kbits/seconds. In some embodiment, the NFC ele-ment 117 may be completely or partially part of, or con-tained within, the secure element 115.

When used for contactless transactions, NFC-enabled smart phones incorporate smart chips (called secure ele-ments, similar to the secure element 115 on the smart card 104) that allow the smart phone to securely store and use the transaction application and consumer account information. Contactless transactions between an NFC-enabled mobile phone and a POS terminal use the standard ISO/IEC 14443 communication protocol currently used by EMV contactless credit and debit chip cards. NFC-enabled smart phones and other devices can also be used for a wide variety of other applications including chip-enabled mobile marketing (e.g., coupons, loyalty programs and other marketing offers), identity and access, ticketing and gaming. NFC is available as standard functionality in many mobile phones and allows consumers to perform safe contactless transactions, access digital content, and connect electronic devices simply. An NFC chip in a mobile device can act as a card or a reader or both, enabling consumer devices to share information and to make secure payments quickly.

In FIG. 1, contact pads 108 embody an exemplary smart card contact arrangement, known as a pinout. In an exemplary embodiment, contact C1, VCC, connects to a power supply. contact C2, RST, connects to a device to receive a reset signal, used to reset the card's communications. Contact C3, CLK, connects to a device to receive a clock signal, from which data communications timing is derived. Contact C5, GND, connects to a ground (reference voltage). In various embodiments, contact C6, VPP, may, according to ISO/IEC 7816-3:1997, be designated as a programming voltage, such as an input for a higher voltage to program persistent memory (e.g., EEPROM). In other embodiments, contact C6, VPP, may, according to ISO/IEC 7816-3:2006, be designated as SPU, for either standard or proprietary use, as input and/or output. Contact C7, I/O, provides Serial input and output (half-duplex). Contacts C4 and C8, the two remaining contacts, are AUX1 and AUX2 respectively and used for USB interfaces and other uses. In an exemplary embodiment, the biometric sensor 102 may communicate with the SE 115 using serial input and output capabilities of the SE 115. In some embodiments the biometric sensor 102 may be directly connected to contact C7.

In some embodiments described herein, the contact pads 108 are only used for providing connection points via the one or more power transmission contacts, such as C1 VCC and C5 GND, to an external power source, and no data is transmitted to or from the smart card 104 during an activation or enrollment process. The smart card 104 may comprise one or more power transmission contacts for connecting the smart card 104 to a power source, without any further data transmission capability as in a secure element. In other embodiments, the location of the biometric sensor 102 may be embedded into any position on the smart card 104 such that the position of the biometric sensor 102 is substantially separated from the contact pads 108 and allows a user to place a finger on the biometric sensor 102.

A user can carry out various functions on the smart card 104 by placing a finger in various positions over a sensing area 106 of the biometric sensor 102. The sensing area 106 comprises a two-dimensional array of sensor elements. Each sensor element is a discrete sensing component which may be enabled depending on the function of the biometric sensor 102. Any combination of sensor elements in the two-dimensional array may be enabled depending on the function of the biometric sensor. While the illustrated embodiment shown in FIG. 1 describes the biometric sensor 102 in relation to the smart card 104, this is not required and the biometric sensor 102, or other biometric sensor, may be incorporated in a different limited device in other embodiments. For example, other limited devices in which aspects of the technology describe herein may be incorporated include fitness monitors, wearable devices, domestic and industrial appliances, automotive components, and "internet of things" (IOT) devices.

In some embodiments, the sensing area 106 can have different shapes including, but not limited to, a rectangle, a circle, an oval, a diamond, a rhombus, or a lozenge.

The biometric sensor 102 may comprise an array of sensor elements comprising a plurality of conductive drive lines and overlapped conductive pickup lines that are separated from the drive lines by a dielectric layer. Each drive line may thus be capacitively coupled to an overlapping pickup line through a dielectric layer. In such embodiments, the pickup lines can form one axis (e.g., X-axis) of the array, while the drive lines form another axis (e.g., Y-axis) of the array. Each location where a drive line and a pickup line overlap may form an impedance-sensitive electrode pair whereby the overlapping portions of the drive and pickup lines form opposed plates of a capacitor separated by a dielectric layer or layers. This impedance-sensitive electrode pair may be treated as a pixel (e.g., an X-Y coordinate) at which a surface feature of the proximally located object is detected. The array or grid forms a plurality of pixels that can collectively create a map of the surface features of the proximally located object. For instance, the sensor elements forming the pixels of the grid produce signals having variations corresponding to features of a fingerprint disposed over the particular sensor element and thus the pixels along with circuitry controlling the sensor elements and processing signals produced by the sensor elements that includes a processor and signal conditioning elements (i.e., "sensor controlling circuitry") that may be incorporated into an integrated circuit can map locations where there are ridge and valley features of the finger surface touching the sensor array.

Additional details of a fingerprint sensor with overlapping drive lines and pickup lines as well as the drive, sense, and scanning electronics, are discussed in U.S. Pat. No. 8,421,890, entitled "Electronic imager using an impedance sensor grid array and method of making," U.S. Pat. No. 8,866,347, entitled "Biometric sensing", and U.S. Pat. No. 9,779,280, entitled "Fingerprint Sensor Employing an Integrated Noise Rejection Structure," the respective applications of which are hereby incorporated into this document by reference in their entirety as if set forth fully herein. Further improvements and enhancements to the devices, methods, and circuitry used to improve the sensitivity of the measurement principal employing a sensor grid comprised of overlapping drive lines and pickup lines separated by a dielectric including the drive, sense, scanning, and noise reduction electronics, are described in U.S. Pat. No. 9,779,280.

An exemplary installation of a fingerprint sensor in a smart card is described in U.S. Pat. No. 9,122,901, the application of which is hereby incorporated into this document by reference in its entirety as if set forth fully herein.

The sensing area 106 of the biometric sensor, (e.g., biometric sensor 102) installed on the smart card 104 may be selectively configured to operate in five modes: (1) enrollment mode; (2) verification mode; (3) data input mode; (4) control mode; and (5) unlock mode. The user may select the different modes by different interactions with the sensor, such as a double tap, hold, up/down drag, and left/right drag on the sensor area 106. In other embodiments, the biometric sensor 102 may be selectively configured in different modes by placing a data input device over the sensing area 106. Data input devices configured for different sensor operation modes may include unique detectable features that, when detected by the sensor, will configure the sensor in a mode corresponding to the data input device.

In the context of this application, a "data input device" is any device that may be attached or otherwise coupled to a host device and is thereby coupled to a biometric sensor of the host device to enable a user to provide inputs to the host device through the biometric sensor via features of the data input device that allow the user to interface with the biometric sensor to provide control inputs or inputs of data in addition to the particular biometric data that the biometric sensor is configured to detect. For instance, in examples described herein, the data input device includes keys or buttons that are each uniquely coupled to a fingerprint sensor of the host device so that a user contacting any such key or button generates a unique control input or a unique data input corresponding to that key or button. In addition, in other examples described herein, the attachment or coupling of the data input device to the host device, or its removal, may itself provide data input to the host device, for example, communicating that the data input device has been attached or coupled to, or removed from, the host device, that the data input device has or has not been properly positioned with respect to the biometric sensor to enable proper control or data input by the user, or, as described above, to place the biometric sensor in one of a number of operating modes.

In some embodiments, when the biometric sensor 102 is in enrollment mode, all of the sensor elements in the two dimensional array of the sensing area 106 are activated in a fingerprint sensing mode to produce signals—such as capacitance—having detectible variations corresponding to fingerprint features—grooves and ridges—in detective proximity to the sensor array (i.e., in physical contact with the sensor elements or in sufficient proximity to the sensor elements to produce signals corresponding to fingerprint features) which together form an "image" of the fingerprint, and the sensor controlling circuitry is configured so that multiple images of a user's fingerprint may be gathered, and, possibly, manipulated, to acquire a sufficient fingerprint template that may be subsequently stored in memory. An exemplary enrollment process is described in commonly owned U.S. Pat. No. 9,684,813, entitled "System and Method of Biometric Enrollment and Verification," the application of which is hereby incorporated into this document by reference in its entirety as if set forth fully herein. The stored fingerprint template may be continuously updated based on the user's use of the fingerprint sensor over time.

In some embodiments, when the biometric sensor 102 is in verification mode (also known as authentication mode), all of the sensor elements in the sensing area 106 are activated in fingerprint sensing mode and the sensor controlling circuitry is configured so that an image of the user's fingerprint may be acquired and compared with the fingerprint template stored in memory to verify that the acquired fingerprint image sufficiently matches the fingerprint template. An exemplary verification process is also described in U.S. Pat. No. 9,684,813. An exemplary verification process is also described in commonly owned U.S. patent application Publication No. U.S. 2018/0144173, now U.S. Pat. No. 10,551,931 entitled "Combination of Fingerprint and Device Orientation to Enhance Security," the application of which is hereby incorporated into this document by reference in their entirety as if set forth fully herein. Ideally, in both the enrollment mode and the verification mode, a finger should be placed centrally on the sensing area 106 of the biometric sensor 102 in order to obtain the best image of the finger.

In some embodiments, when the biometric sensor 102 is in control mode and data input mode, the sensor elements in the sensing area 106 are activated in contact sensing mode, data input keys are operatively coupled to associated spatially distinct regions or control areas of the sensing area to enable direct or indirect contact by a user's finger with each associated spatially distinct area, and the sensor controlling circuitry is configured so that the user may input data through the sensing area 106 by directly or indirectly placing a finger on selected, associated spatially distinct control areas within the sensing area 106 of the biometric sensor 102. That is, as opposed to the enrollment and verification modes in which the sensor elements and the processor of the sensor controlling circuitry are configured to detect and map different biometric features of the finger surface in contact sensing mode for the control and data input modes, the sensor elements and the sensor controlling circuitry may be configured to merely detect whether or not the sensor element is directly or indirectly contacted by a finger surface and to distinguish a spatially distinct region of the sensor array in which the contacted element(s) reside.

In both the control mode and the data input mode, the sensing area 106 may be divided into spatially distinct control areas dedicated to a specific command or data input. The number and location of the spatially distinct control areas within the sensing area 106 may be configured depending on the desired use of the biometric sensor 102, the size of the sensing area 106, and the ability of the biometric sensor 102 to accurately distinguish contact by the finger with the different spatially distinct regions on the sensor. In unlock mode, the smart card 104 may remain in data input mode until the user inputs a correct unlock code, wherein the input of the correct code unlocks the smart card 104.

In some embodiments described herein, when the biometric sensor 102 is in control mode and data input mode, a first portion of the sensor elements in the sensing area 106 are activated in contact sensing mode, data input keys are operatively coupled to associated spatially distinct regions or control areas of the first portion of the sensing area to enable direct or indirect contact by a user's finger with each associated spatially distinct area, and the sensor controlling circuitry is configured so that the user may input data through the sensing area 106 by directly or indirectly placing a finger on selected, associated spatially distinct control areas within the first portion of the sensing area 106 of the biometric sensor 102. In such embodiments, when the biometric sensor 102 is in enrollment mode, only the sensor elements located within a second portion of the two-dimensional array of the sensing area 106 different from the first portion and accessible to a user's finger may be activated in the fingerprint sensing mode and the sensor controlling circuitry is configured so that multiple images of a user's fingerprint may be gathered to acquire a sufficient fingerprint template that is stored in memory.

Figure 2A:
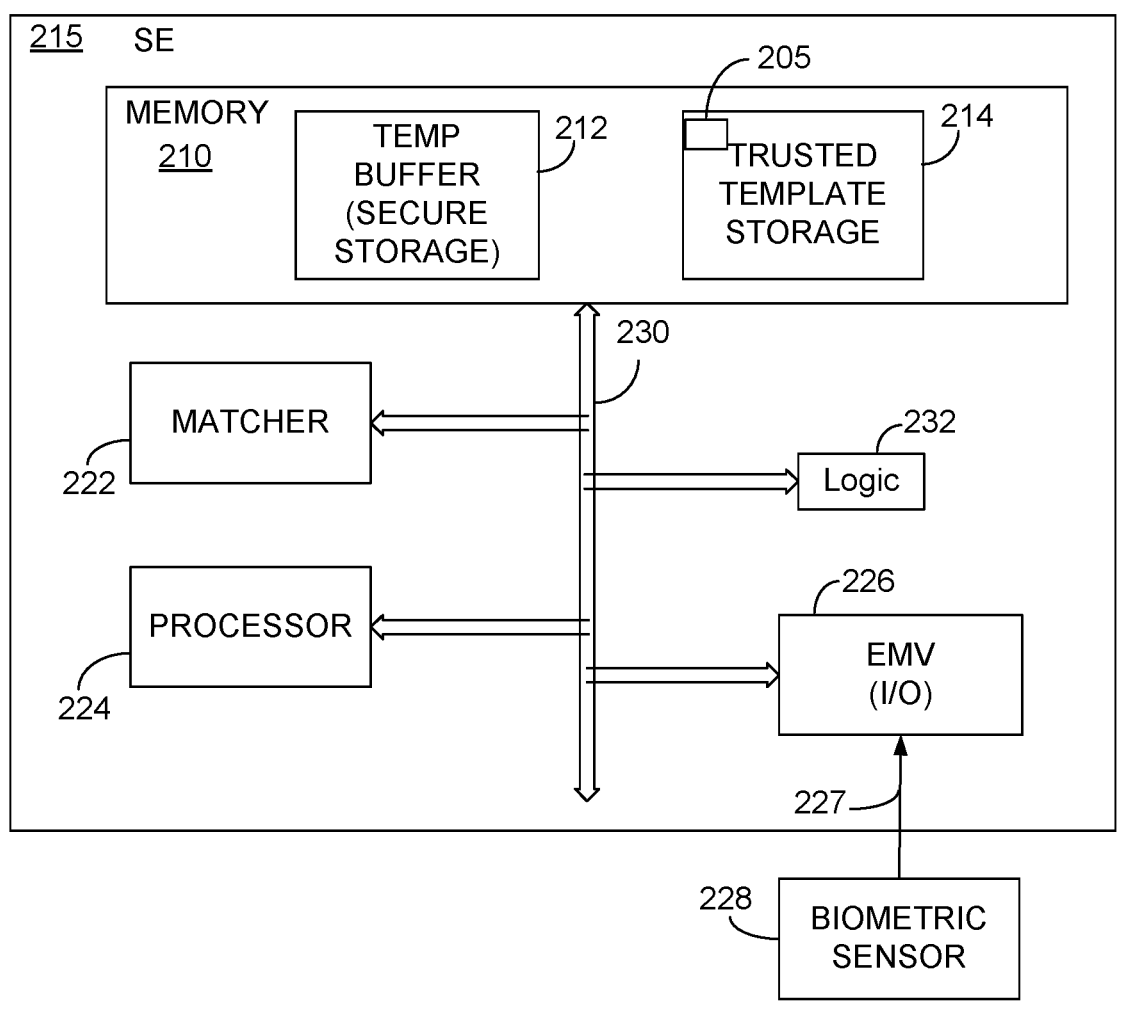
FIG. 2A illustrates a block diagram of a portion of the smart card of FIG. 1.

FIG. 2A is a block diagram 200 of a portion of the smart card of FIG. 1. In an exemplary embodiment, the portion of the smart card may comprise a secure element 215. The secure element 215 may be similar to the secure element 115 of FIG. 1. In an exemplary embodiment, the secure element 215 may comprise a processor 224, a memory 210, a matcher 222, logic 232 and an I/O (EMV) element 226 operatively coupled together over a communication bus 230. A biometric sensor 228 may provide data to the I/O (EMV) element 226 over connection 227. In an exemplary embodiment, the biometric sensor 228 may be a fingerprint sensor, similar to the biometric sensor 102 of FIG. 1.

In an exemplary embodiment, the memory 210 may be similar to the memory 112 or the memory 132 of FIG. 1. In an exemplary embodiment, the memory 210 may comprise a temporary buffer 212 and a trusted template storage 214. The temporary buffer 212 and the trusted template storage 214 may be located in what is referred to as secure storage in that the portions of the memory 210 that include the temporary buffer 212 and the trusted template storage 214 may be protected by access control. In an exemplary embodiment, the trusted template storage 214 may include a trusted template 205. In an exemplary embodiment, the trusted template 205 may include one or more trusted samples. In an exemplary embodiment, the trusted template 205 may expand or evolve to include additional biometric samples that become trusted biometric samples after verification. The trusted template 205, extensions thereof, and/or buffered samples could also be stored in secure encrypted memory in an application specific integrated circuit (ASIS) associated with the sensor 228 as well as in the secure element, or with elements distributed between both an ASIC and an SE. In some embodiments, an SE may be integrated into an ASIC.

In an exemplary embodiment, the matcher 222 may be hardware, software, firmware, or a combination thereof, and may be configured to process samples from the biometric sensor 228 to determine whether a biometric sample provided by the biometric sensor 228 has a sufficient number of correlated features with (and/or matches or partially matches) a biometric sample that may be stored in the trusted template storage 214 to allow the determination that the new or live biometric sample provided by the biometric sensor 228 belongs to the same user as does a trusted biometric sample in the trusted template 205. In some embodiments, the matching function may reside completely in the SE or parts of the matching function may reside in both an ASIC and the SE, which in some embodiments may be combined into a single element. Biometric sample matching technology is known to those having ordinary skill in the art and will not be described in detail herein.

Figure 2B:
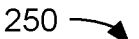
FIG. 2B illustrates an alternative exemplary embodiment of a block diagram of a portion of the smart card of FIG. 1.

FIG. 2B is block diagram 250 of an alternative exemplary embodiment of a portion of the smart card of FIG. 1. In an exemplary embodiment, the portion of the smart card may comprise a secure element 255. The secure element 255 may be similar to the secure element 115 of FIG. 1. In an exemplary embodiment, the secure element 255 may comprise a processor 274 and an I/O (EMV) element 276 operatively coupled together over a communication bus 280. In an exemplary embodiment, a biometric sensor 290 may include a memory 294, a processor 296, logic 298 and a matcher 292. In an exemplary embodiment, the biometric sensor 290 may provide data to the I/O (EMV) element 276 over connection 277. In an exemplary embodiment, the biometric sensor 290 may be a fingerprint sensor, similar to the biometric sensor 102 of FIG. 1.

In an exemplary embodiment, the memory 260 may be similar to the memory 112 or the memory 132 of FIG. 1. In an exemplary embodiment, the memory 260 may comprise a temporary buffer 262 and a trusted template storage 264. The temporary buffer 262 and the trusted template storage 264 may be located in what is referred to as secure storage in that the portions of the memory 260 that include the temporary buffer 262 and the trusted template storage 264 may be protected by access control. In an exemplary embodiment, the trusted template storage 264 may include a trusted template 265. In an exemplary embodiment, the trusted template 265 may include one or more trusted samples. In an exemplary embodiment, the trusted template 265 may expand or evolve to include additional biometric samples that become trusted biometric samples after verification.

In an exemplary embodiment, the matcher 292 may be hardware, software, firmware, or a combination thereof, and may be configured to process samples from the biometric sensor 290 to determine whether a biometric sample provided by the biometric sensor 290 has a sufficient number of correlated features with (and/or matches or partially matches) a biometric sample that may be stored in the trusted template storage 264 to allow the determination that the new or live biometric sample provided by the biometric sensor 290 belongs to the same user as does a trusted biometric sample in the trusted template 265.

FIGS. 3A, 3B, 3C, and 3D are a series of drawings illustrating an exemplary embodiment of secure biometric enrollment.

Figure 3A:
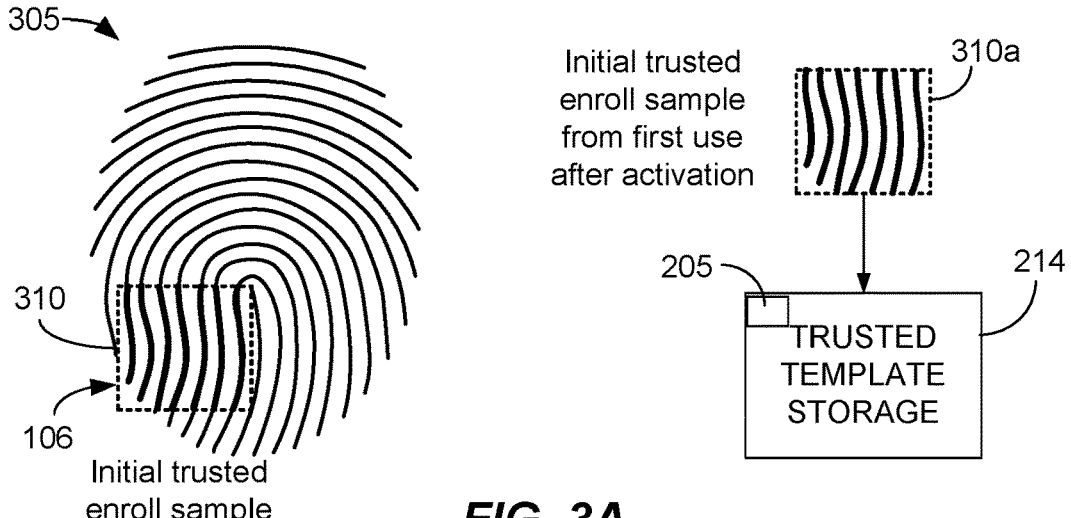
FIGS. 3A, 3B, 3C, and 3D are a series of diagrams showing an exemplary embodiment of secure biometric enrollment.

FIG. 3A shows a finger print image 305, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a portion of a fingerprint as an initial biometric sample 310 and store it as an initial trusted biometric sample 310a in the trusted template 205 in the trusted template storage 214. In an exemplary embodiment, the initial trusted biometric sample 310a may be an electronic representation of a first biometric sample, (for example, the initial biometric sample 310), captured subsequent to externally activating a user device on which the biometric sensor 102 may be located. In an exemplary embodiment, the initial trusted biometric sample 310a may be an entry in the trusted template 205. In an exemplary embodiment, the user device may be a smart card, such as the smart card 104 (FIG. 1) and the initial trusted biometric sample 310a may be a representation of an image of a portion of the finger of an authorized user of the user device. As used herein, the term "externally activating" may refer to a user receiving a smart card and initially activating the card prior to first use. In an exemplary embodiment, the initial trusted biometric sample 310a may also be referred to as an initial trusted enroll sample. In an exemplary embodiment, the initial biometric sample 310 and the initial trusted biometric sample 310a contain the same biometric information. The initial biometric sample 310 and the initial trusted biometric sample 310a (and all biometric samples mentioned herein) are referred to using the nomenclature "NNN", "NNNa" and "NNNb" to indicate the same biometric information in different locations and in different states of trust. For example, a biometric sample NNN may be a biometric sample captured by a biometric sensor. A biometric sample NNNa may be a biometric sample captured by a biometric sensor and determined to be a trusted biometric sample. A biometric sample NNNb may be a biometric sample captured by a biometric sensor and not determined to be a trusted biometric sample. A biometric sample NNNa may be placed in a trusted template and a biometric sample NNNb may be placed in a temporary buffer.

While a single initial trusted biometric sample 310a may be described as initiating the formation of a single trusted template 205, in other embodiments more than one initial trusted sample may be implemented in a single trusted template 205, or more than one initial trusted sample may be implemented in more than one trusted template 205.

Figure 3B:
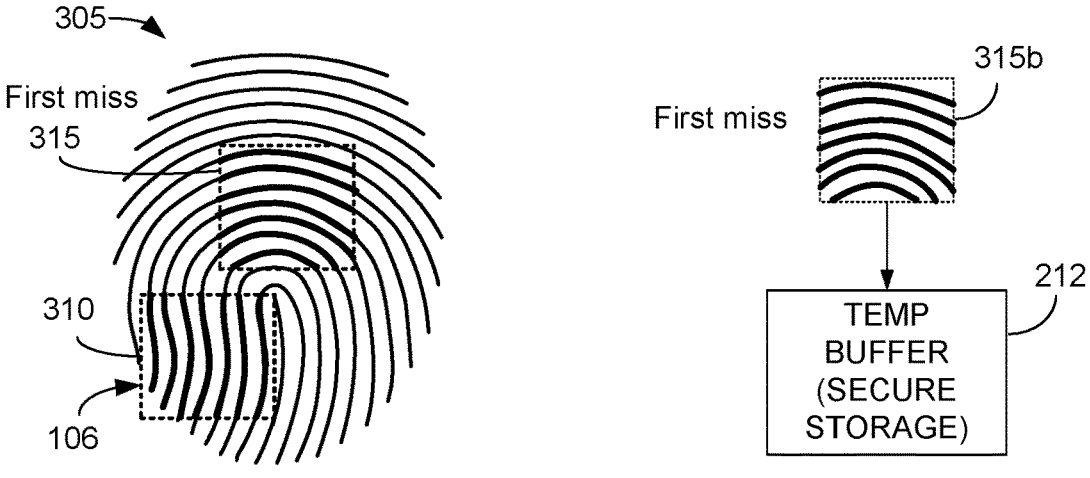

FIG. 3B shows the finger print image 305, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a subsequent biometric sample 315. In an exemplary embodiment, the subsequent biometric sample 315 may be a biometric sample obtained by the biometric sensor 102 after the capture of the initial biometric sample 310 described above. In an exemplary embodiment, the subsequent biometric sample 315 may comprise an image of a portion of the fingerprint 305 of the user in an area of the fingerprint 305 that does not overlap with the area of the fingerprint 305 from which the initial biometric sample 310 was captured.

In an exemplary embodiment, the matcher 222 (FIG. 2A), or matcher 292 (FIG. 2B) compares the subsequent biometric sample 315 as it is obtained with the initial trusted biometric sample 310a in the trusted template 205 to determine if a match exists between the initial trusted biometric sample 310a and the subsequent biometric sample 315.

In an exemplary embodiment, if the subsequent biometric sample 315 does not match the initial trusted biometric sample 310a in the trusted template 205, then the non-matching subsequent biometric sample 315 is stored as a non-matching subsequent biometric sample 315b, or as an electronic representation of the non-matching subsequent biometric sample 315b, in the temporary buffer 212. However, if the subsequent biometric sample 315 does match the initial trusted biometric sample 310a in the trusted template 205, then the matching subsequent biometric sample would be stored as a subsequent trusted biometric sample 315a in the trusted template 205 in the trusted template storage 214, as will be described below.

Figure 3C:
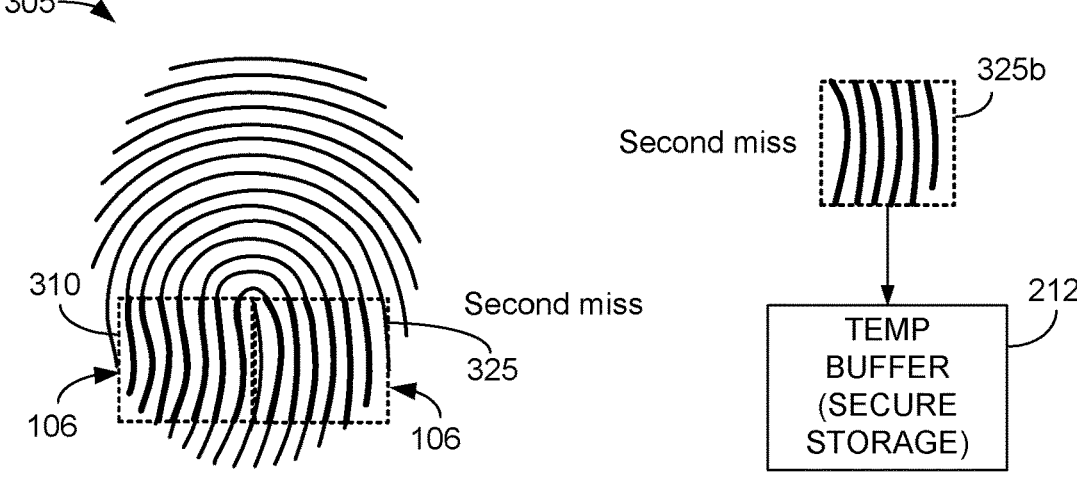

FIG. 3C shows the finger print image 305, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 325. In an exemplary embodiment, the subsequent biometric sample 325 may be a biometric sample obtained by the biometric sensor 102 after the capture of the initial biometric sample 310 described above, i.e., a second subsequent biometric sample. In an exemplary embodiment, the subsequent biometric sample 325 may comprise an image of a portion of the fingerprint 305 of the user in an area of the fingerprint 305 that does not overlap with the area of the fingerprint 305 from which the initial biometric sample 310 was captured.

In an exemplary embodiment, the matcher 222 (FIG. 2A), or matcher 292 (FIG. 2B) compares the subsequent biometric sample 325 as it is obtained with the initial trusted biometric sample 310a in the trusted template 205 to determine if a match exists between the initial trusted biometric sample 310a and the subsequent biometric sample 325.

In an exemplary embodiment, if the subsequent biometric sample 325 does not match the initial trusted biometric sample 310a in the trusted template 205, then the non-matching subsequent biometric sample 325 is stored as a non-matching subsequent biometric sample 325b, or as an electronic representation of the non-matching subsequent biometric sample 325b, in the temporary buffer 212. However, if the subsequent biometric sample 325 does match the initial trusted biometric sample 310a in the trusted template 205, then the matching subsequent biometric sample would be stored as a subsequent trusted biometric sample 325a in the trusted template 205 in the trusted template storage 214, as will be described below.

Figures 3D, 4:
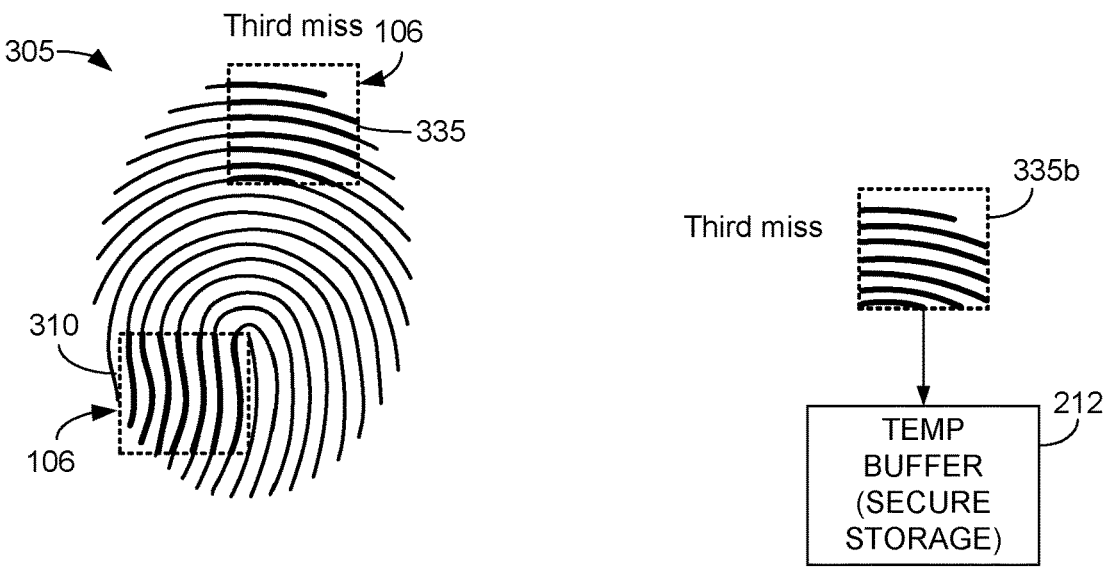
FIG. 4 is a diagram showing a series of biometric samples in a temporary buffer and in a trusted template storage.

FIG. 3D shows the finger print image 305, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 335. In an exemplary embodiment, the subsequent biometric sample 335 may be a biometric sample obtained by the biometric sensor 102 after the capture of the initial biometric sample 310 described above, i.e., a third subsequent biometric sample. In an exemplary embodiment, the subsequent biometric sample 335 may comprise an image of a portion of the fingerprint 305 of the user in an area of the fingerprint 305 that does not overlap with the area of the fingerprint 305 from which the initial biometric sample 310 was captured.

In an exemplary embodiment, the matcher 222 (FIG. 2A), or matcher 292 (FIG. 2B) compares the subsequent biometric sample 335 as it is obtained with the initial trusted biometric sample 310a to determine if a match exists between the initial trusted biometric sample 310a and the subsequent biometric sample 335.

In an exemplary embodiment, if the subsequent biometric sample 335 does not match the initial trusted biometric sample 310a in the trusted template 205, then the non-matching subsequent biometric sample 335 is stored as a non-matching subsequent biometric sample 335b, or as an electronic representation of the non-matching subsequent biometric sample 335b, in the temporary buffer 212. However, if the subsequent biometric sample 335 does match the initial trusted biometric sample 310a in the trusted template 205, then the matching subsequent biometric sample would be stored as a subsequent trusted biometric sample 335a in the trusted template 205 in the trusted template storage 214, as will be described below.

FIG. 4 is a diagram 400 showing a series of biometric samples in a temporary buffer and in a trusted template in a trusted template storage. In FIG. 4, the finger print image 305, at least a portion of which may be captured by a sensing area 106 (FIG. 1) of a biometric sensor 102 (FIG. 1, or 228 of FIG. 2A or 290 of FIG. 2B) is shown along with a number of biometric samples. In an exemplary embodiment, the sensing area 106 may capture another subsequent biometric sample 350, i.e., a fourth subsequent biometric sample. In an exemplary embodiment, the subsequent biometric sample 350 may be a biometric sample obtained by the biometric sensor 102 after the capture of the initial biometric sample 310 described above. In an exemplary embodiment, the subsequent biometric sample 350 may comprise an image of a portion of the fingerprint 305 of the user in an area of the fingerprint 305 that does overlap with the area of the fingerprint 305 from which the initial biometric sample 310 was captured.

In an exemplary embodiment, the matcher 222 (FIG. 2A), or matcher 292 (FIG. 2B) compares the subsequent biometric sample 350 as it is obtained with the initial trusted biometric sample 310a to determine if a match exists between the initial trusted biometric sample 310a and the subsequent biometric sample 350.

In an exemplary embodiment, the subsequent biometric sample 350 does match the initial trusted biometric sample 310a in the trusted template 205, such that the matching subsequent biometric sample 350 is stored as a subsequent trusted biometric sample 350a in the trusted template 205 in the trusted template storage 214.

In an exemplary embodiment, matching the additional subsequent biometric sample 350 with the initial trusted biometric sample 310a also retroactively extends trust of association with the user to the non-matching biometric samples 315b, 325b and 335b in the temporary buffer 212, thus incorporating the non-matching biometric samples 315b, 325b and 335b in the temporary buffer 212 into the trusted template 205 in the trusted template storage 214, where they are stored as matching biometric samples 315a, 325a and 335a. In this manner the non-matching biometric samples 315b, 325b and 335b in the temporary buffer 212 become subsequent trusted biometric samples and become part of the trusted template 205. In an exemplary embodiment, the trusted template 205 in the trusted template storage 214 may be iteratively and continually expanded and updated with additional subsequent trusted biometric samples.

Although the description of FIGS. 3A, 3B, 3C and 3D use an example of three non-matching biometric samples 315b, 325b and 335b being captured after the initial biometric sample 310 is stored as an initial trusted biometric sample 310a in the trusted template 205 in the trusted template storage 214, more or fewer subsequent biometric samples may be captured and compared against the initial trusted biometric sample 310*a* in the trusted template storage 214. Further, although the description of FIGS. 3A, 3B, 3C, 3D, and FIG. 4 refers to the trusted template 205 and the trusted template storage 214 of FIG. 2A, the description is equally applicable to the trusted template 265 and the trusted template storage 264 of FIG. 2B.

Figure 5:
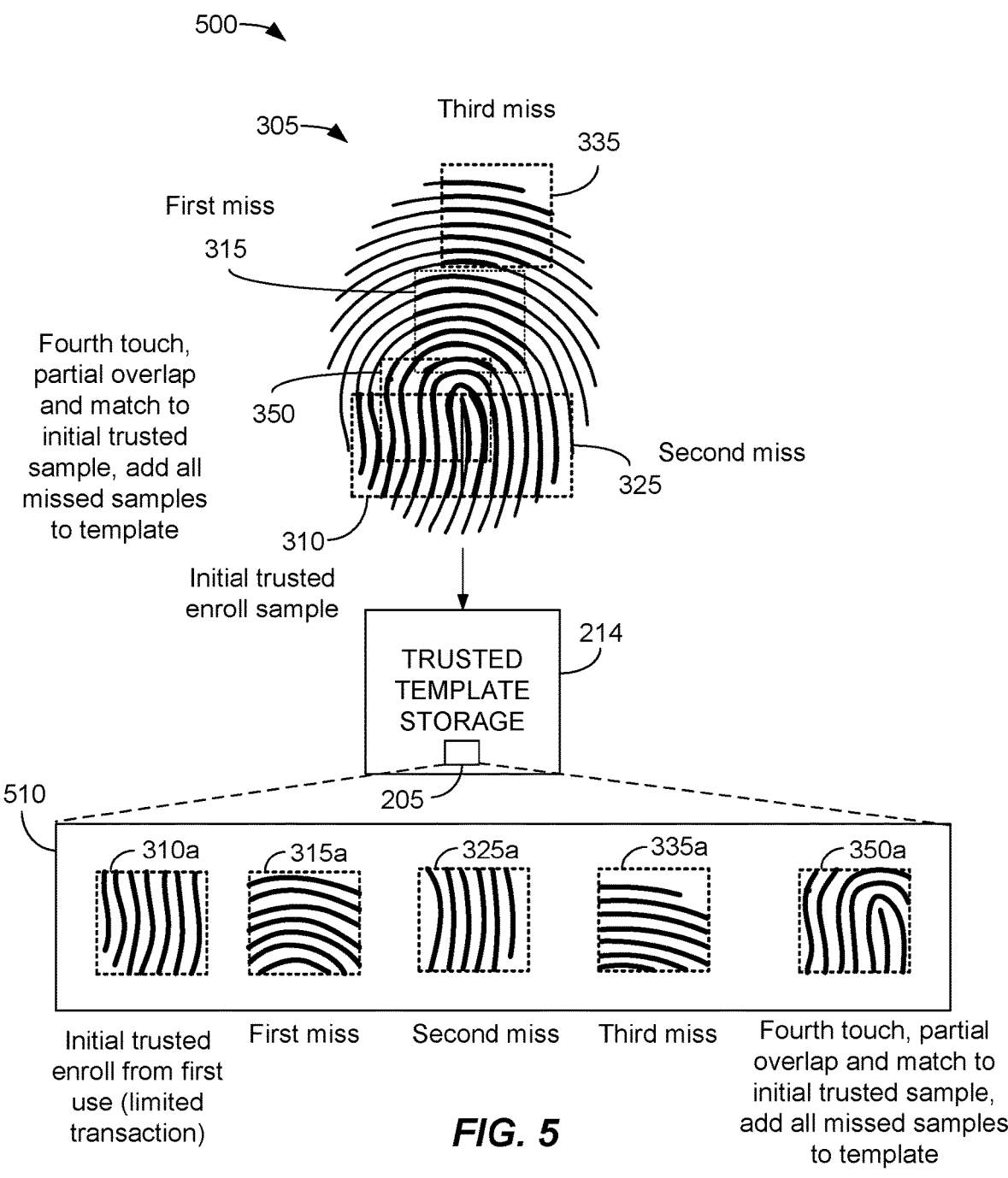
FIG. 5 is a diagram showing the finger print and biometric samples that are part of a trusted template.

FIG. 5 is a diagram 500 showing the finger print 305 and biometric samples that are part of a trusted template 510. The trusted template 510 may be an example of the trusted template 205 of FIG. 2A or the trusted template 265 of FIG. 4B, expanded with the addition of biometric samples in addition to the initial trusted biometric sample 310*a*. In an exemplary embodiment, after the subsequent biometric sample 350 was determined to match the initial trusted biometric sample 310*a*, the non-matching subsequent biometric samples 315*a*, 325*a* and 335*a* are transferred from the temporary buffer 212 to the trusted template 510 in the trusted template storage 214, so that the trusted template 510 in the trusted sample storage 214 includes the initial trusted biometric sample 310*a*, the non-matching subsequent biometric samples 315*a*, 325*a* and 335*a*, which are now trusted, and the matching subsequent trusted biometric sample 350*a*.

FIG. 6 is a flow chart describing an example of the operation of a method 600 for secure biometric enrollment. The blocks in the method 600 can be performed in or out of the order shown, and in some embodiments, can be performed at least in part in parallel.

In block 601, a user device is externally activated. An example of external activation of a user device may be an initial activation of a smart card by a user. For example, a user may receive a smart card in the mail and then call a telephone number, or visit a website, to initially activate the smart card. In an exemplary embodiment, externally activating the user device establishes an initial trusted state during which trust of association with the user is established in the user device (smart card). In an exemplary embodiment, the initial trusted state may comprise a time period. In an exemplary embodiment, the initial trusted state may comprise a time period beginning with the step of externally activating the user device and extending for a predetermined amount of time, or for a predetermined number of biometric sample collections. In an exemplary embodiment, the initial trusted state may comprise a time period sufficient to enroll one or more fingerprint samples.

In block 602, after external activation of the smart card, an initial biometric sample may be obtained. For example, as user of a smart card may apply a finger to the biometric sensor on the smart card and capture a fingerprint image. This initial biometric sample may be saved in the trusted template 205 in the trusted template storage 214 as an initial trusted biometric sample 310*a*. In an exemplary embodiment, the initial trusted biometric sample 310*a* may be an initial biometric sample that begins the building of a trusted template. In other words, the trusted template may be seeded with the initial trusted biometric sample 310*a* and then continually updated or expanded with subsequent trusted biometric samples that match the initial trusted biometric sample 310*a* and correspond to the same user. In some embodiments, two or more initial trusted biometric samples may be collected that may correspond to two or more fingers of the user.

In block 604, the initial trusted biometric sample 310*a* is stored in the trusted template 205 in the trusted template storage 214.

In block 606, at least one subsequent biometric sample is obtained. In an exemplary embodiment, the sensing area 106 may capture a subsequent biometric sample 315. In an exemplary embodiment, the subsequent biometric sample 315 may be a biometric sample obtained by the biometric sensor 102 after the capture of the initial biometric sample 310 described above.

In block 608, it is determined whether the at least one subsequent biometric sample obtained in block 606 matches the initial trusted biometric sample 310*a* in the trusted template 205.

If it is determined in block 608 that the at least one subsequent biometric sample 315 obtained in block 606 does not match the initial trusted biometric sample 310*a* in the trusted template 205, then in block 612, the at least one subsequent biometric sample 315 is not authenticated and in block 616, the at least one subsequent biometric sample 315 is stored in the temporary buffer 212 as non-matching subsequent biometric sample 315*b*. In an exemplary embodiment, any number of subsequent biometric samples may be stored in the temporary buffer 212.

If it is determined in block 608 that the at least one subsequent biometric sample 315 obtained in block 606 does match the initial trusted biometric sample 310*a* in the trusted template 205, then in block 610, the at least one subsequent biometric sample 315 is authenticated and in block 614, and the at least one subsequent biometric sample 315 is stored in the trusted template 205 as a matching subsequent biometric sample 315*a*.

In bock 618, an additional subsequent biometric sample is obtained. In an exemplary embodiment, the sensing area 106 may capture an additional subsequent biometric sample 350. In an exemplary embodiment, the subsequent biometric sample 350 may be a biometric sample obtained by the biometric sensor 102 after the capture of the initial biometric sample 310 described above.

In block 620, it is determined whether the at least one subsequent biometric sample obtained in block 618 matches the initial trusted biometric sample 310*a* in the trusted template 205.

If it is determined in block 620 that the at additional subsequent biometric sample 350 obtained in block 618 does not match the initial trusted biometric sample 310*a* in the trusted template 205, then in block 622, the at least one subsequent biometric sample 350 is not authenticated and in block 624, the at least one subsequent biometric sample 350 is stored in the temporary buffer 212 as non-matching subsequent biometric sample 350*b*.

If it is determined in block 620 that the additional subsequent biometric sample 350 obtained in block 618 does match the initial trusted biometric sample 310*a* in the trusted template 205, then in block 626, the additional subsequent biometric sample 350 is authenticated and in block 628, the additional subsequent biometric sample 350 is stored in the trusted template 205 as a matching subsequent biometric sample 350*a*. Transferring the additional subsequent non-matching biometric samples into the trusted template generates what can be referred to as an iterative trusted template.

In block 630, because the additional subsequent biometric sample 350 matches the initial trusted biometric sample 310*a*, the at least one subsequent biometric sample 315*b* is transferred from the temporary buffer 212 to the trusted template 205 in the trusted template storage 214 and stored as a trusted biometric sample 315*a*. In an exemplary embodiment, there may be any number of subsequent biometric samples in the temporary buffer 212 that may be transferred to the trusted template 205 in the trusted template storage 214 after the additional subsequent biometric sample 350 is determined to match the initial trusted biometric sample 310a in the trusted template 205. In this example, non-matching subsequent biometric samples 315b, 325b and 335b may be transferred from the temporary buffer 212 to the trusted template 205 in the trusted template storage 214 and stored as matching biometric samples 315a, 325a and 335a when the additional subsequent biometric sample 350 matches the initial trusted biometric sample 310a. In this manner trust of association with the user to the non-matching at least one subsequent biometric sample 315b in the temporary buffer is retroactively extended, thus incorporating the non-matching at least one subsequent biometric sample 315b (or any number of subsequent biometric samples) in the temporary buffer 212 into the trusted template 205 in the trusted template storage 214. In an exemplary embodiment, the trusted template 205 may be iteratively and continually updated or expanded with subsequent biometric samples.

FIG. 7 is a functional block diagram of an apparatus 700 for secure biometric enrollment.

The apparatus 700 comprises means 701 for externally activating a smart card. In certain embodiments, the means 701 for externally activating a smart card can be configured to perform one or more of the functions described in operation block 601 of method 600 (FIG. 6). In an exemplary embodiment, the means 701 for externally activating a smart card may comprise a user initially activating a smart card.

The apparatus 700 comprises means 702 for obtaining an initial biometric sample after external activation. In certain embodiments, the means 702 for obtaining an initial biometric sample after external activation can be configured to perform one or more of the functions described in operation block 602 of method 600 (FIG. 6). In an exemplary embodiment, the means 702 for obtaining an initial biometric sample after external activation may comprise the biometric sensor 102, 228, obtaining an initial biometric sample 310.

The apparatus 700 also comprises means 704 for storing the initial biometric sample in a trusted template. In certain embodiments, the means 704 for storing the initial biometric sample in a trusted template can be configured to perform one or more of the functions described in operation block 604 of method 600 (FIG. 6). In an exemplary embodiment, the means 704 for storing the initial biometric sample in a trusted template may comprise saving the initial biometric sample 310 in the trusted template 205 in the trusted template storage 214 as an initial trusted biometric sample 310a.

The apparatus 700 also comprises means 706 for obtaining at least one subsequent biometric sample. In certain embodiments, the means 706 for obtaining at least one subsequent biometric sample can be configured to perform one or more of the functions described in operation block 606 of method 600 (FIG. 6). In an exemplary embodiment, the means 706 for obtaining at least one subsequent biometric sample may comprise the biometric sensor 102, 228, obtaining at least one subsequent biometric sample 315.

The apparatus 700 also comprises means 708 for determining whether the at least one subsequent biometric sample matches the initial biometric sample. In certain embodiments, the means 708 for determining whether the at least one subsequent biometric sample matches the initial biometric sample can be configured to perform one or more of the functions described in operation block 608 of method 600 (FIG. 6). In an exemplary embodiment, the means 708 for determining whether the at least one subsequent biometric sample matches the initial biometric sample may comprise the matcher 222, 292 determining whether the at least one subsequent biometric sample 315 matches the initial biometric sample 310.

The apparatus 700 also comprises means 710 for storing the at least one subsequent biometric sample in the trusted template. In certain embodiments, the means 710 for storing the at least one subsequent biometric sample in a temporary the trusted template can be configured to perform one or more of the functions described in operation block 614 of method 600 (FIG. 6). In an exemplary embodiment, the means 710 for storing the at least one subsequent biometric sample in the trusted template may comprise the trusted template 205, 265 and the trusted template storage 214, 264.

The apparatus 700 also comprises means 712 for storing the at least one subsequent biometric sample in a temporary buffer. In certain embodiments, the means 712 for storing the at least one subsequent biometric sample in a temporary buffer can be configured to perform one or more of the functions described in operation block 616 of method 600 (FIG. 6). In an exemplary embodiment, the means 712 for storing the at least one subsequent biometric sample in a temporary buffer may comprise the temporary buffer 212, 262.

The apparatus 700 also comprises means 714 for obtaining an additional subsequent biometric sample. In certain embodiments, the means 714 for obtaining an additional subsequent biometric sample can be configured to perform one or more of the functions described in operation block 618 of method 600 (FIG. 6). In an exemplary embodiment, the means 714 for obtaining an additional subsequent biometric sample may comprise the biometric sensor 102, 228, obtaining at least one additional subsequent biometric sample 350.

The apparatus 700 also comprises means 716 for determining whether the additional subsequent biometric sample matches the initial biometric sample. In certain embodiments, the means 716 for determining whether the at additional biometric sample matches the initial biometric sample can be configured to perform one or more of the functions described in operation block 620 of method 600 (FIG. 6). In an exemplary embodiment, the means 717 for determining whether the additional subsequent biometric sample matches the initial biometric sample may comprise the matcher 222, 292 determining whether the additional subsequent biometric sample 350 matches the initial biometric sample 310.

The apparatus 700 also comprises means 718 for storing the additional subsequent biometric sample in a temporary buffer. In certain embodiments, the means 718 for storing the additional subsequent biometric sample in a temporary buffer can be configured to perform one or more of the functions described in operation block 624 of method 600 (FIG. 6). In an exemplary embodiment, the means 718 for storing the additional subsequent biometric sample in a temporary buffer may comprise the temporary buffer 212, 262.

The apparatus 700 also comprises means 720 for transferring the at least one subsequent biometric sample from the temporary buffer to the trusted template. In certain embodiments, the means 720 for transferring the at least one subsequent biometric sample from the temporary buffer to the trusted template can be configured to perform one or more of the functions described in operation block 630 of method 600 (FIG. 6). In an exemplary embodiment, the means 720 for transferring the at least one subsequent biometric sample from the temporary buffer to the trusted template may comprise transferring the at least one subsequent biometric sample 315 from the temporary buffer 212, 262 to the trusted template 205, 265.

The apparatus 700 also comprises means 722 for associating the at least one subsequent biometric sample and the additional biometric sample in the temporary buffer. In certain embodiments, the means 722 for associating the at least one subsequent biometric sample and the additional biometric sample in the temporary buffer can be configured to perform one or more of the functions described in operation block 1630 of method 1600 (FIG. 16B). In an exemplary embodiment, the means 722 for associating the at least one subsequent biometric sample and the additional biometric sample in the temporary buffer may comprise associating the biometric samples 1420b and 1430b in the group 1465.

Figure 8A:
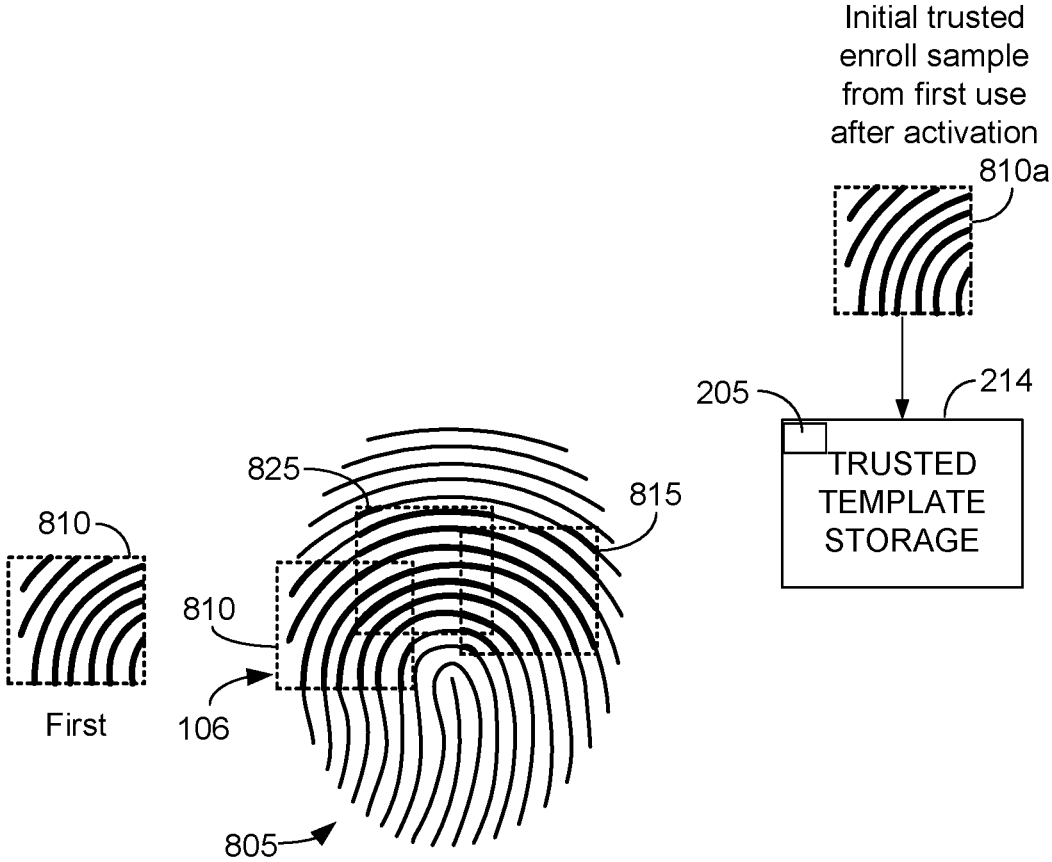
FIGS. 8A, 8B, and 8C are a series of drawings illustrating an exemplary embodiment of secure biometric enrollment.
Figure 8B:
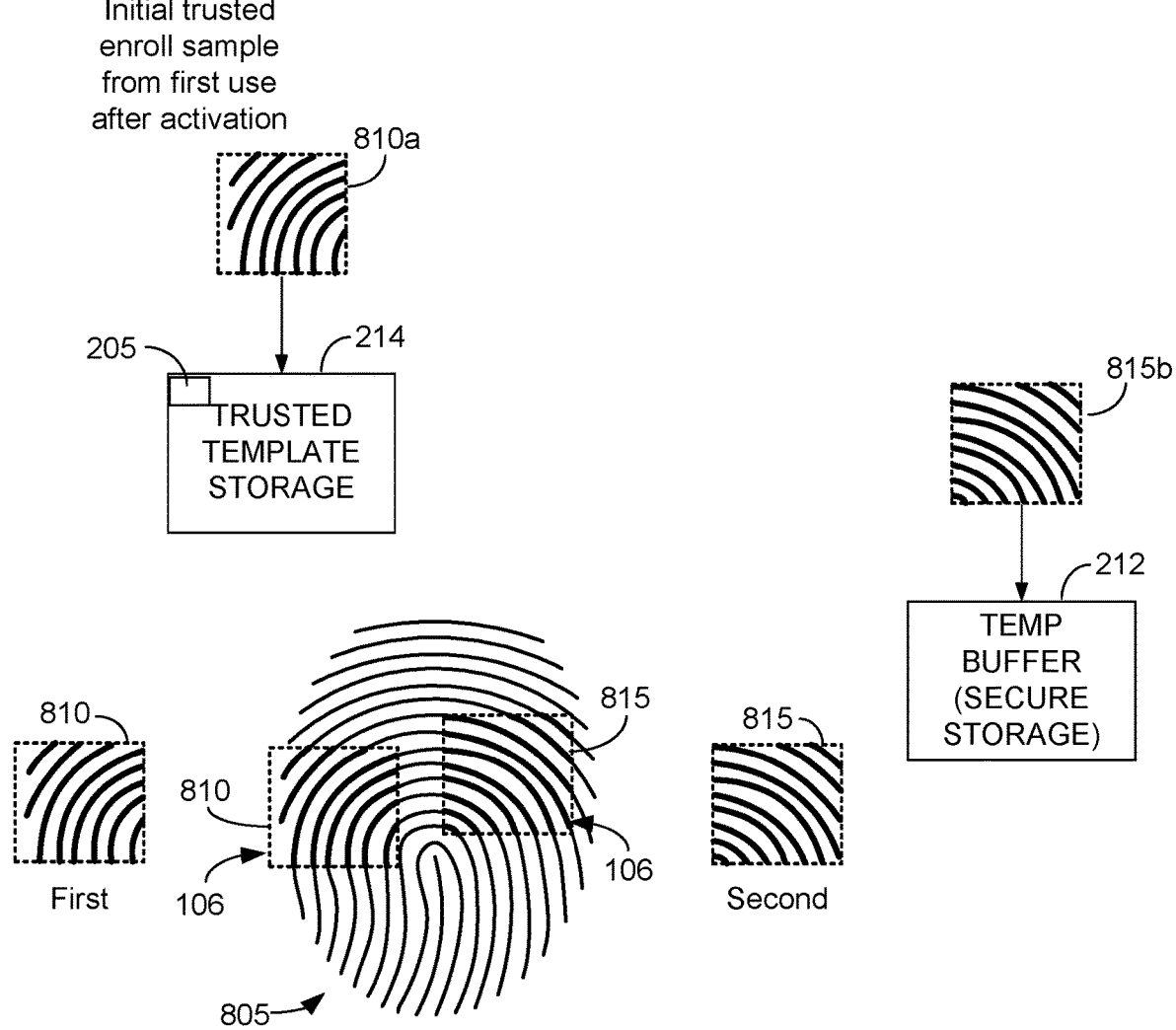
Figure 8C:
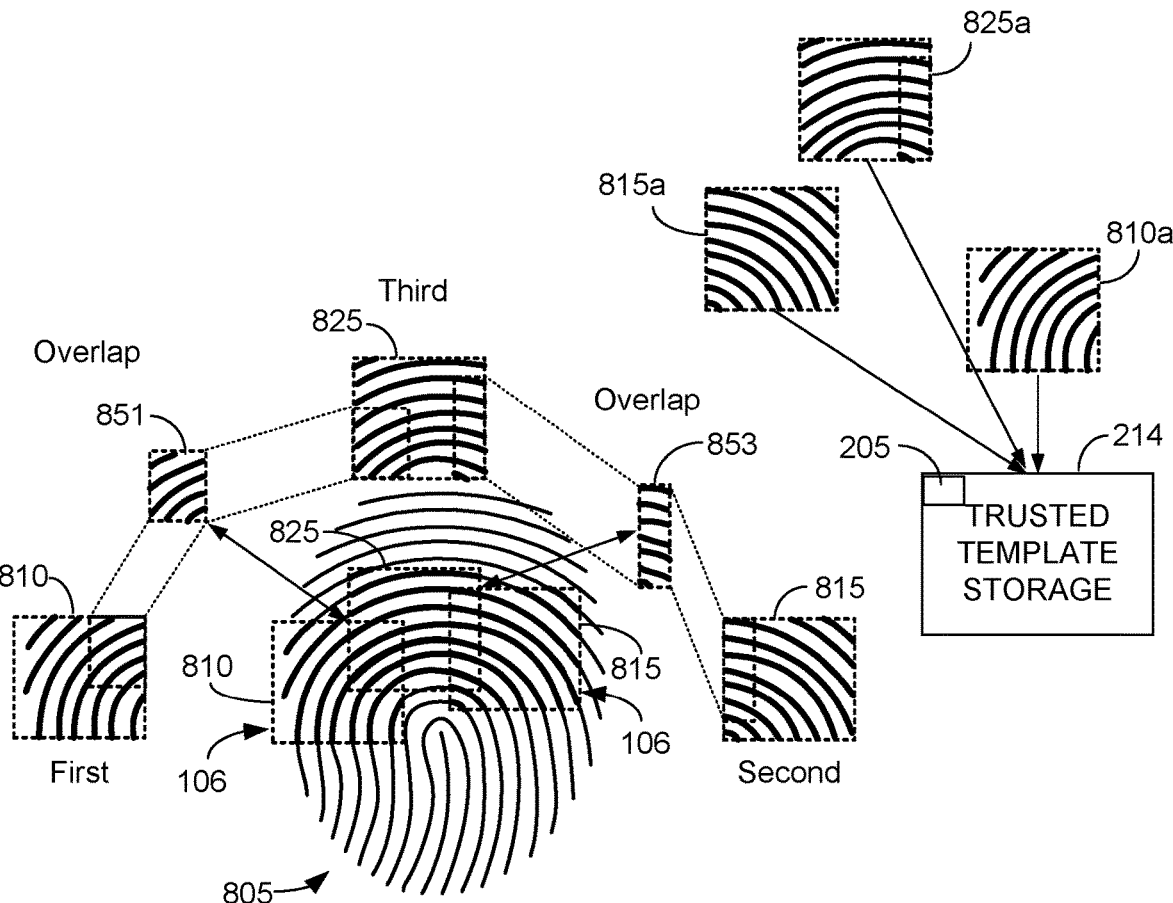

FIGS. 8A, 8B, and 8C are a series of drawings illustrating an exemplary embodiment of secure biometric enrollment using explicit trust.

In an alternative exemplary embodiment for situations where implicit trust may be insufficient, exemplary embodiments of the system and method described herein may use concepts that assign explicit trust of association with a user to build a trusted template. Such explicit trust of association with a user to build a trusted template may generate a trusted template slower than one generated using implicit trust of association with the user, but may generate a more secure trusted template.

FIG. 8A shows a finger print image 805, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a portion of a fingerprint as an initial biometric sample 810 and store it as an initial trusted biometric sample 810a in the trusted template 205 in the trusted template storage 214. In an exemplary embodiment, the initial trusted biometric sample 810a may be an electronic representation of a first biometric sample, (for example, the initial biometric sample 810), captured subsequent to externally activating a user device on which the biometric sensor 102 may be located. In an exemplary embodiment, the initial trusted biometric sample 810a may be an entry in the trusted template 205. In an exemplary embodiment, the user device may be a smart card, such as the smart card 104 (FIG. 1) and the initial trusted biometric sample 810a may be a representation of an image of a portion of the finger of an authorized user of the user device. In an exemplary embodiment, the initial trusted biometric sample 810a may also be referred to as an initial trusted enroll sample.

FIG. 8B shows the finger print image 805, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a subsequent biometric sample 815. In an exemplary embodiment, the subsequent biometric sample 815 may be a biometric sample obtained by the biometric sensor 102 after the capture of the initial biometric sample 810 described above. In an exemplary embodiment, the subsequent biometric sample 815 may comprise an image of a portion of the fingerprint 805 of the user in an area of the fingerprint 805 that does not overlap with the area of the fingerprint 805 from which the initial biometric sample 810 was captured.

In an exemplary embodiment, the matcher 222 (FIG. 2A), or matcher 292 (FIG. 2B) compares the subsequent biometric sample 815 as it is obtained with the initial trusted biometric sample 810a in the trusted template 205 to determine if a match exists between the initial trusted biometric sample 810a and the subsequent biometric sample 815.

In an exemplary embodiment, if the subsequent biometric sample 815 does not match the initial trusted biometric sample 810a in the trusted template 205, then the non-matching subsequent biometric sample 815 is stored as a non-matching subsequent biometric sample 815b, or as an electronic representation of the non-matching subsequent biometric sample 815b, in the temporary buffer 212. However, if the subsequent biometric sample 815 does match the initial trusted biometric sample 810a in the trusted template 205, then the matching subsequent biometric sample 815 would be stored as a subsequent trusted biometric sample in the trusted template 205 in the trusted template storage 214 as a trusted biometric sample 815a, as will be described below.

FIG. 8C shows the finger print image 805, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 825, i.e., a second subsequent biometric sample. In an exemplary embodiment, the subsequent biometric sample 825 may be a biometric sample obtained by the biometric sensor 102 after the capture of the initial biometric sample 810 and the subsequent biometric sample 815 described above. In an exemplary embodiment, the subsequent biometric sample 825 may comprise an image of a portion of the fingerprint 805 of the user in an area of the fingerprint 805 that overlaps with the area of the fingerprint 805 from which the initial biometric sample 810 was captured and that overlaps with the area of the fingerprint 805 from which the subsequent biometric sample 815 was captured. In an exemplary embodiment, the subsequent biometric sample 825 connects, or bridges the initial biometric sample 810 and the subsequent biometric sample 815.

In an exemplary embodiment, the matcher 222 (FIG. 2A), or matcher 292 (FIG. 2B) compares the subsequent biometric sample 825 as it is obtained with the initial trusted biometric sample 810a in the trusted template 205 and with the non-matching subsequent biometric sample 815b in the temporary buffer 212 to determine if a match exists between the subsequent biometric sample 825 and the initial trusted biometric sample 810a, and between the subsequent biometric sample 825 and the non-matching subsequent biometric sample 815b.

In an exemplary embodiment, if the subsequent biometric sample 825 does not match the initial trusted biometric sample 810a in the trusted template 205 or the non-matching subsequent biometric sample 815b in the temporary buffer 212, then the non-matching subsequent biometric sample 825 is stored as a non-matching subsequent biometric sample 825b, or as an electronic representation of the non-matching subsequent biometric sample 825b, in the temporary buffer 212.

If the subsequent biometric sample 825 does match at least the initial trusted biometric sample 810a in the trusted template 205, then the matching subsequent biometric sample 825a would be stored as a subsequent trusted biometric sample in the trusted template 205 in the trusted template storage 214, as will be described below.

However, if the subsequent biometric sample 825 does match the initial trusted biometric sample 810a in the trusted template 205 and the non-matching subsequent biometric sample 815b in the temporary buffer 212, then the matching subsequent biometric sample 825a would be stored as a subsequent trusted biometric sample in the trusted template 205 in the trusted template storage 214. In addition, because the subsequent biometric sample 825a also overlaps the non-matching subsequent biometric sample 815b, the non-matching subsequent biometric sample 815b is also transferred from the temporary buffer 212 to the trusted template 205 in the trusted template storage 214 and stored as a trusted biometric sample 815a. In this manner, the trusted template 205 is expanded with the addition of the subsequent biometric sample 815a.

In an exemplary embodiment, an overlap portion 851 corresponds to a region that includes at least some matching features in both the initial trusted biometric sample 810a and the subsequent biometric sample 825. Similarly, an overlap portion 853 corresponds to a region that includes at least some matching features in both the subsequent biometric sample 815 and the subsequent biometric sample 825. In this manner, the subsequent biometric sample 825 associates both the initial trusted biometric sample 810a and the subsequent biometric sample 815, thereby explicitly (and retroactively) extending (or applying) trust of association with the user to the subsequent biometric sample 815.

In an exemplary embodiment, placing the subsequent trusted biometric sample 825a into the trusted template 205 creates an expanded trusted template and causes the matcher 222 (290) to retroactively compare the non-matching subsequent biometric sample 815b in the temporary buffer 212 (FIG. 8B) to the expanded trusted template 205, and when the non-matching subsequent biometric sample 815b matches the expanded trusted template (i.e., the subsequent trusted biometric sample 825a in this example) the non-matching subsequent biometric sample 815b in the temporary buffer 212 is added to the expanded trusted template 205 in the trusted template storage 214.

Figure 9:
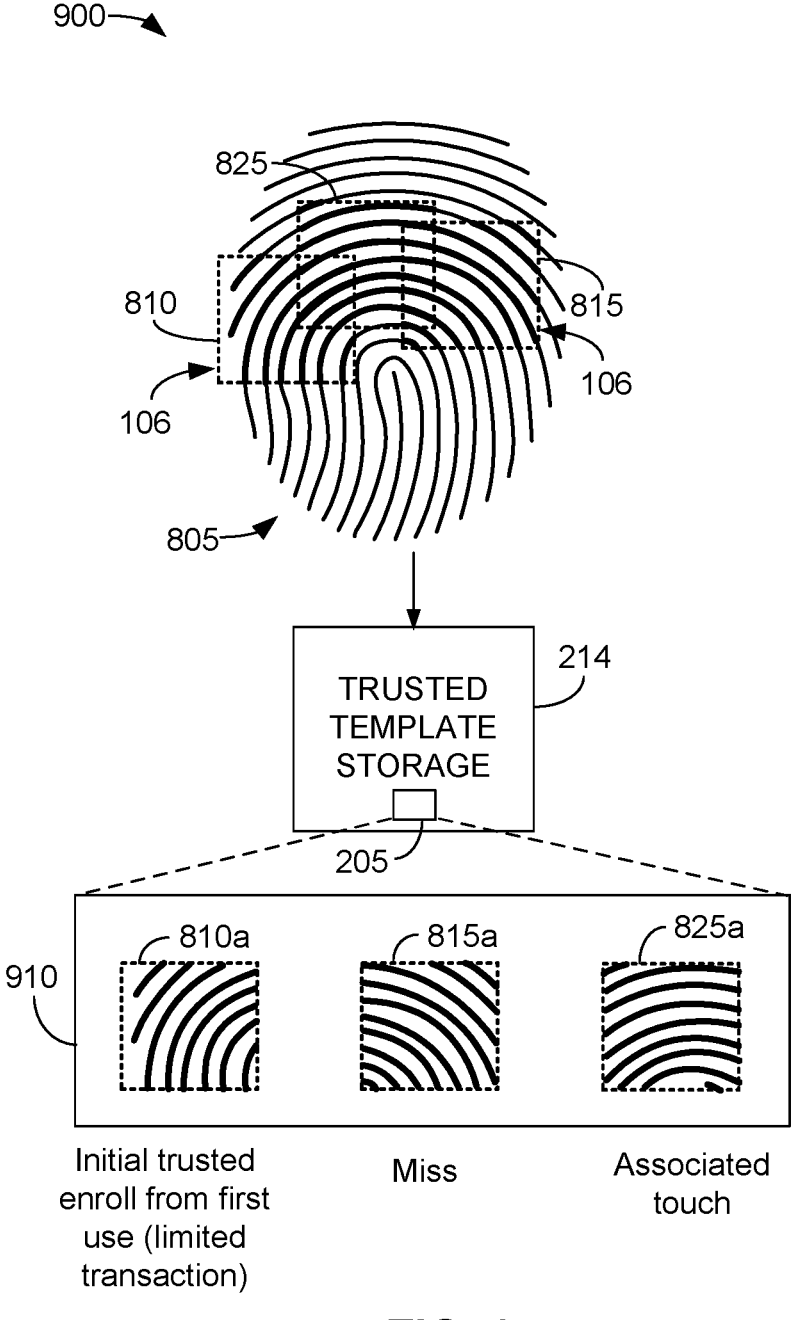
FIG. 9 is a diagram showing the finger print and biometric samples that are part of a trusted template.

FIG. 9 is a diagram 900 showing the finger print 805 and biometric samples that are part of a trusted template 910. The trusted template 910 may be an example of the trusted template 205 of FIG. 2A or the trusted template 265 of FIG. 4B, expanded with the addition of biometric samples in addition to the initial trusted biometric sample 810a. In an exemplary embodiment, after the additional subsequent biometric sample 825 was determined to match the initial trusted biometric sample 810a and the subsequent biometric sample 815, the non-matching subsequent biometric sample 815b is transferred from the temporary buffer 212 to the trusted template 910 in the trusted template storage 214, so that the trusted template 910 in the trusted sample storage 214 includes the initial trusted biometric sample 810a, the non-matching subsequent biometric sample 815a, which is now trusted, along with the matching subsequent trusted biometric sample 825a. In this example, the matching subsequent trusted biometric sample 825a may be considered to associate the initial trusted biometric sample 810a and the non-matching subsequent biometric sample 815b.

Figure 10B:
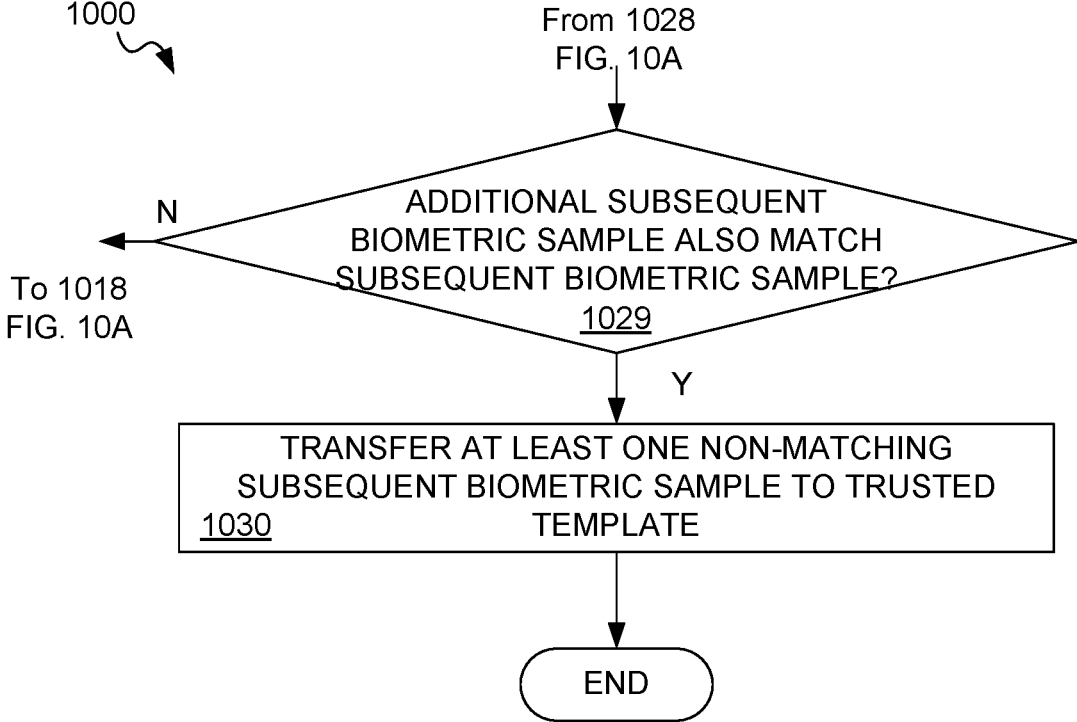

FIG. 10A and FIG. 10B collectively are a flow chart describing an example of the operation of a method 1000 for secure biometric enrollment. The blocks in the method 1000 can be performed in or out of the order shown, and in some embodiments, can be performed at least in part in parallel.

In block 1001, a user device is externally activated. An example of external activation of a user device may be an initial activation of a smart card by a user. For example, a user may receive a smart card in the mail and then call a telephone number, or visit a website, to initially activate the smart card.

In block 1002, after external activation of the smart card, an initial biometric sample may be obtained. For example, as user of a smart card may apply a finger to the biometric sensor on the smart card and capture a fingerprint image. This initial biometric sample may be saved in the trusted template 205 in the trusted template storage 214 as an initial trusted biometric sample 810a. In an exemplary embodiment, the initial trusted biometric sample 810a may be an initial biometric sample that begins the building of a trusted template. In other words, the trusted template may be seeded with the initial trusted biometric sample 810a and then continually updated or expanded with subsequent trusted biometric samples that match the initial trusted biometric sample 810a, or another trusted biometric sample in the trusted template, and that corresponds to the same user.

In block 1004, the initial trusted biometric sample 810a is stored in the trusted template 205 in the trusted template storage 214.

In block 1006, at least one subsequent biometric sample is obtained. In an exemplary embodiment, the sensing area 106 may capture a subsequent biometric sample 815. In an exemplary embodiment, the subsequent biometric sample 815 may be a biometric sample obtained by the biometric sensor 102 after the capture of the initial biometric sample 810 described above.

In block 1008, it is determined whether the at least one subsequent biometric sample 815 obtained in block 1006 matches the initial trusted biometric sample 810a (or any other trusted biometric sample) in the trusted template 205.

If it is determined in block 1008 that the at least one subsequent biometric sample 815 obtained in block 1006 does not match the initial trusted biometric sample 810a in the trusted template 205, then in block 1012, the at least one subsequent biometric sample 815 is not authenticated and in block 1016, the at least one subsequent biometric sample 815 is stored in the temporary buffer 212 as non-matching subsequent biometric sample 815b. In an exemplary embodiment, any number of subsequent biometric samples may be stored in the temporary buffer 212.

If it is determined in block 1008 that the at least one subsequent biometric sample 815 obtained in block 1006 does match the initial trusted biometric sample 810a in the trusted template 205, then in block 1010, the at least one subsequent biometric sample 815 is authenticated and in block 1014, and the at least one subsequent biometric sample 815 is stored in the trusted template 205 as a matching subsequent biometric sample 815a.

In bock 1018, an additional subsequent biometric sample is obtained. In an exemplary embodiment, the sensing area 106 may capture an additional subsequent biometric sample 825. In an exemplary embodiment, the subsequent biometric sample 825 may be a biometric sample obtained by the biometric sensor 102 after the capture of the initial biometric sample 810 and the subsequent biometric sample 815 described above.

In block 1020, it is determined whether the additional subsequent biometric sample obtained in block 1018 matches the initial trusted biometric sample 810a in the trusted template 205.

If it is determined in block 1020 that the at additional subsequent biometric sample 825 obtained in block 1018 does not match the initial trusted biometric sample 810a in the trusted template 205, then in block 1022, the additional subsequent biometric sample 825 is not authenticated and in block 1024, the additional subsequent biometric sample 825 is stored in the temporary buffer 212 as non-matching subsequent biometric sample 825b.

If it is determined in block 1020 that the additional subsequent biometric sample 825 obtained in block 1018 does match the initial trusted biometric sample 810a in the trusted template 205, then in block 1026, the additional subsequent biometric sample 825 is authenticated and in block 1028, the additional subsequent biometric sample 825 is stored in the trusted template 205 as a matching subsequent biometric sample 825a.

In block 1029, it is determined whether the additional subsequent biometric sample obtained in block 1018 also matches any other prior trusted biometric samples in the trusted template 205 or any non-matching biometric samples in the temporary buffer 212.

If it is determined in block 1029 that the additional subsequent biometric sample 825 obtained in block 1018 does not match any biometric sample other than the initial trusted sample 810a, then the process returns to block 1018 in FIG. 10A.

If it is determined in block 1029 that the additional subsequent biometric sample 825 obtained in block 1018 does match another previously obtained biometric sample, such as the non-matching biometric sample 815b in the temporary buffer 212, then in block 1030, the at least one subsequent biometric sample 815 is also stored in the trusted template 205 as a matching subsequent biometric sample 815a.

In block 1030, because the additional subsequent biometric sample 825 also matches the at least one subsequent biometric sample 815, the at least one subsequent biometric sample 815b is transferred from the temporary buffer 212 to the trusted template 205 in the trusted template storage 214 and stored as a trusted biometric sample 815a. In an exemplary embodiment, there may be any number of subsequent biometric samples in the temporary buffer 212 that may be transferred to the trusted template 205 in the trusted template storage 214 after an additional subsequent biometric sample 825 is determined to match the initial trusted biometric sample 810a in the trusted template 205 and the at least one subsequent biometric sample 815.

In this example, a non-matching subsequent biometric sample 815b may be transferred from the temporary buffer 212 to the trusted template 205 in the trusted template storage 214 when the additional subsequent biometric sample 825 at least partially overlaps with and/or is determined to match (or partially match) the initial trusted biometric sample 810a and the non-matching subsequent biometric sample 815b. In this manner trust of association with the user to the non-matching at least one subsequent biometric sample 815b in the temporary buffer is explicitly and retroactively extended, thus incorporating the non-matching at least one subsequent biometric sample 815b in the temporary buffer 212 into the trusted template 205 in the trusted template storage 214 as a trusted biometric sample 815a. In an exemplary embodiment, the trusted template 205 may be iteratively and continually updated or expanded with subsequent biometric samples.

FIGS. 11A, 11B, 11C and 11D are a series of drawings illustrating an exemplary embodiment of secure biometric enrollment using explicit trust.

Figure 11A:
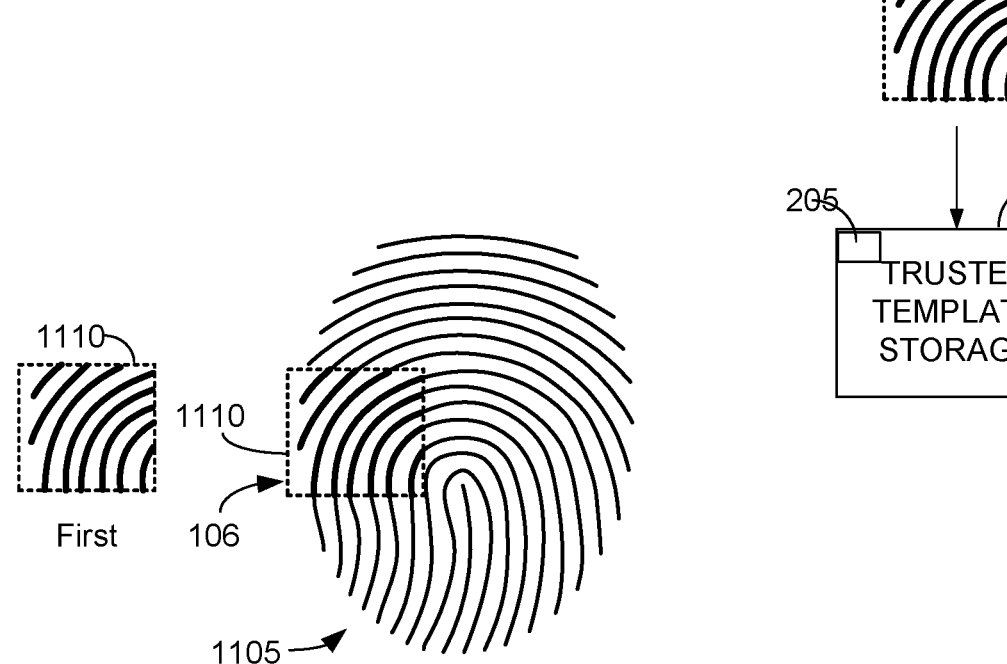

FIG. 11A shows a finger print image 1105, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a portion of a fingerprint as an initial biometric sample 1110 and store it as an initial trusted biometric sample 1110a in the trusted template 205 in the trusted template storage 214. In an exemplary embodiment, the initial trusted biometric sample 1110a may be an electronic representation of a first biometric sample, (for example, the initial biometric sample 1110), captured subsequent to externally activating a user device on which the biometric sensor 102 may be located. In an exemplary embodiment, the initial trusted biometric sample 1110a may be an entry in the trusted template 205. In an exemplary embodiment, the user device may be a smart card, such as the smart card 104 (FIG. 1) and the initial trusted biometric sample 1110a may be a representation of an image of a portion of the finger of an authorized user of the user device. In an exemplary embodiment, the initial trusted biometric sample 1110a may also be referred to as an initial trusted enroll sample.

FIG. 11B shows the finger print image 1105, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a subsequent biometric sample 1120. In an exemplary embodiment, the subsequent biometric sample 1120 may be a biometric sample obtained by the biometric sensor 102 after the capture of the initial biometric sample 1110 described above. In an exemplary embodiment, the subsequent biometric sample 1120 may comprise an image of a portion of the fingerprint 1105 of the user in an area of the fingerprint 1105 that does not at least partially overlap with the area of the fingerprint 1105 from which the initial biometric sample 1110 was captured.

In an exemplary embodiment, the matcher 222 (FIG. 2A), or matcher 292 (FIG. 2B) compares the subsequent biometric sample 1120 as it is obtained with the initial trusted biometric sample 1110a in the trusted template 205 to determine if a match exists between the initial trusted biometric sample 1110a and the subsequent biometric sample 1120.

In an exemplary embodiment, if the subsequent biometric sample 1120 does not match the initial trusted biometric sample 1110a in the trusted template 205, then the non-matching subsequent biometric sample 1120 is stored as a non-matching subsequent biometric sample 1120b, or as an electronic representation of the non-matching subsequent biometric sample 1120b, in the temporary buffer 212. However, if the subsequent biometric sample 1120 does match the initial trusted biometric sample 1110a in the trusted template 205, then the matching subsequent biometric sample would be stored as a subsequent trusted biometric sample 1120a in the trusted template 205 in the trusted template storage 214, as will be described below.

Figure 11C:
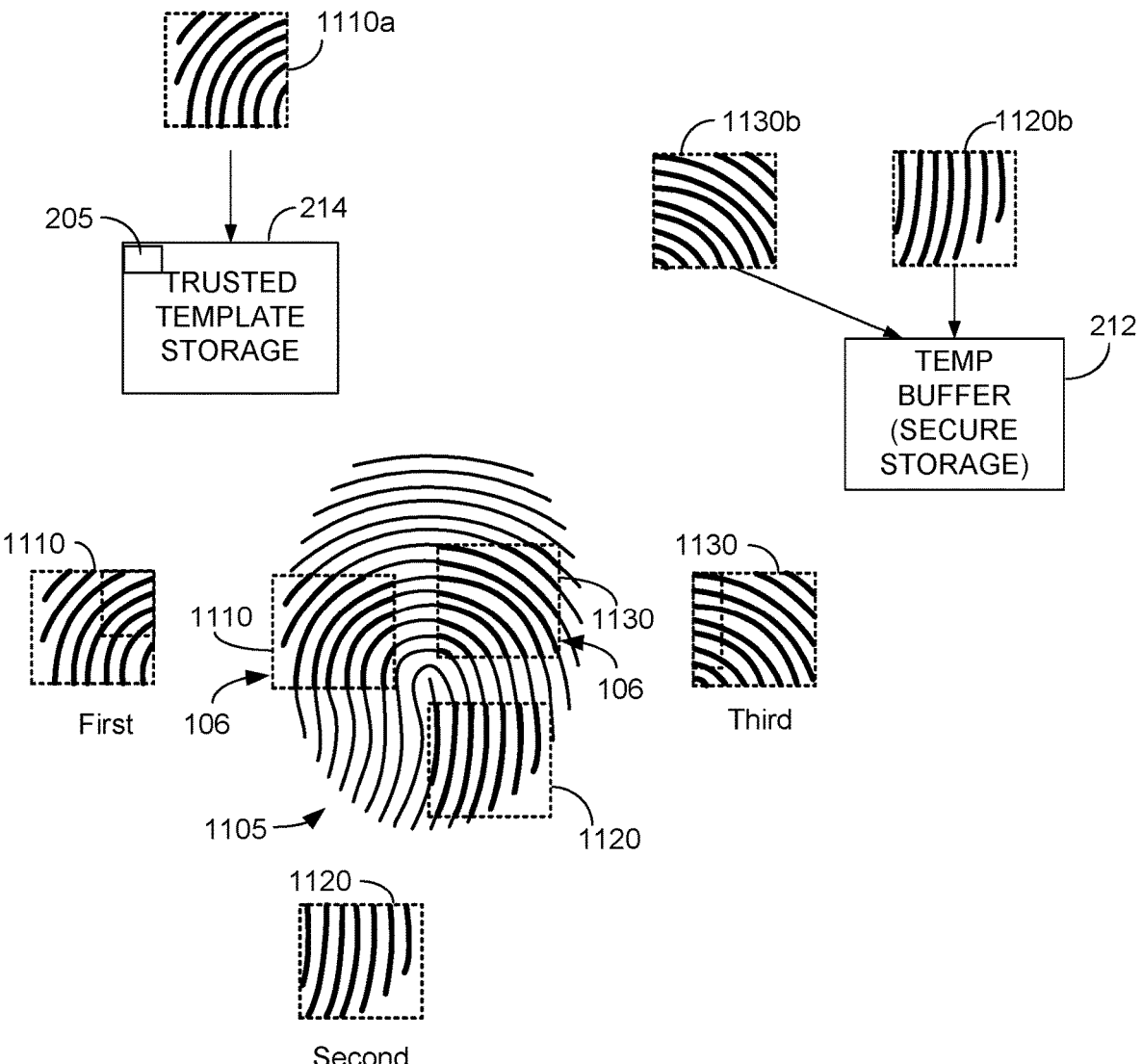

FIG. 11C shows the finger print image 1105, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 1130. In an exemplary embodiment, the subsequent biometric sample 1130 may be a biometric sample obtained by the biometric sensor 102 after the capture of the initial biometric sample 1110 and the subsequent biometric sample 1120 described above, i.e., a second subsequent biometric sample. In an exemplary embodiment, the subsequent biometric sample 1130 may comprise an image of a portion of the fingerprint 1105 of the user in an area of the fingerprint 1105 that does not overlap with the area of the fingerprint 1105 from which the initial biometric sample 1110 was captured and that does not overlap with the area of the fingerprint 1105 from which the subsequent biometric sample 1120 was captured.

In an exemplary embodiment, the matcher 222 (FIG. 2A), or matcher 292 (FIG. 2B) compares the subsequent biometric sample 1130 as it is obtained with the initial trusted biometric sample 1110a in the trusted template 205 and with the non-matching subsequent biometric sample 1120*b* in the temporary buffer 212 to determine if a match exists between the subsequent biometric sample 1130 and the initial trusted biometric sample 1110*a*, and between the subsequent biometric sample 1130 and the non-matching subsequent biometric sample 1120*b*.

In this exemplary embodiment, the subsequent biometric sample 1130 does not match the initial trusted biometric sample 1110*a* in the trusted template 205 or the non-matching subsequent biometric sample 1120*b* in the temporary buffer 212, so the non-matching subsequent biometric sample 1130 is stored as a non-matching subsequent biometric sample 1130*b*, or as an electronic representation of the non-matching subsequent biometric sample 1130*b*, in the temporary buffer 212.

Figure 11D:
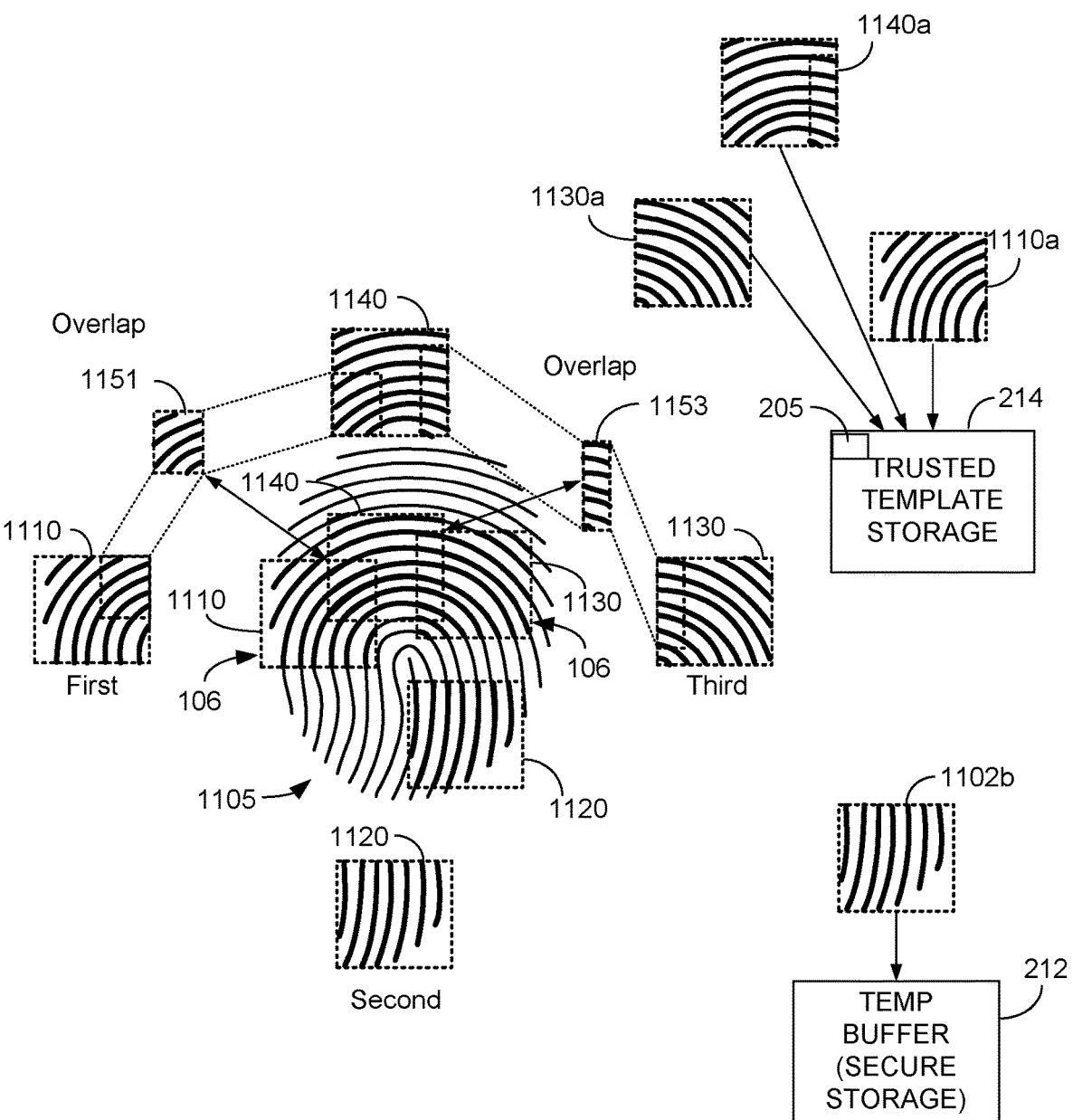

FIG. 11D shows the finger print image 1105, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 1140. In an exemplary embodiment, the subsequent biometric sample 1140 may be a biometric sample obtained by the biometric sensor 102 after the capture of the initial biometric sample 1110, the subsequent biometric sample 1120 and the subsequent biometric sample 1130 described above, i.e., a third subsequent biometric sample. In an exemplary embodiment, the subsequent biometric sample 1140 may comprise an image of a portion of the fingerprint 1105 of the user in an area of the fingerprint 1105 that at least partially overlaps with the area of the fingerprint 1105 from which at least one previous biometric sample was captured. In an exemplary embodiment, the subsequent biometric sample 1140 may comprise an image of a portion of the fingerprint 1105 of the user in an area of the fingerprint 1105 that at least partially overlaps with the area of the fingerprint 1105 from which the initial biometric sample 1110 was captured and that at least partially overlaps with the area of the fingerprint 1105 from which the subsequent biometric sample 1130 was captured. In an exemplary embodiment, the subsequent biometric sample 1140 may be associated with the initial biometric sample 1110 and the subsequent biometric sample 1130 so that the subsequent biometric sample 1140 may be considered to have at least some features common to both the initial biometric sample 1110 and the subsequent biometric sample 1130. However, in this exemplary embodiment, the subsequent biometric sample 1140 does not match or at least partially overlap with the subsequent biometric sample 1120.

In an exemplary embodiment, the matcher 222 (FIG. 2A), or matcher 292 (FIG. 2B) compares the subsequent biometric sample 1140 as it is obtained with the initial trusted biometric sample 1110*a* in the trusted template 205 and with the non-matching subsequent biometric samples 1120*b* and 1130*b* in the temporary buffer 212 to determine if a match exists between the subsequent biometric sample 1140 and the initial trusted biometric sample 1110*a*, and between subsequent biometric sample 1140 and the non-matching subsequent biometric samples 1120*b* and 1130*b*.

In this exemplary embodiment, the subsequent biometric sample 1140 at least partially matches (overlaps) the initial trusted biometric sample 1110*a* in the trusted template 205 (as shown by overlap area 1151) and at least partially matches (overlaps) the subsequent non-matching biometric sample 1130*b* in the temporary buffer 212 (as shown by overlap area 1153) so that the matching subsequent biometric sample 1140 would be stored as a subsequent trusted biometric sample 1140*a* in the trusted template 205 in the trusted template storage 214, and the non-matching biometric sample 1130*b* in the temporary buffer 212 will also be transferred to the trusted template 205 in the trusted template storage 214 as a trusted biometric sample 1130*a* through the extending of explicit trust to the subsequent biometric sample 1140*a* and the subsequent biometric sample 1130*a*.

However, because none of the subsequent biometric samples 1110*a*, 1130*a* or 1140*a* at least partially match or overlap with the subsequent biometric sample 1120*b*, the subsequent biometric sample 1120*b* remains in the temporary buffer 212 until another biometric sample is obtained that at least partially overlaps (and/or matches) the subsequent biometric sample 1120*b* and any other biometric sample in the trusted template 205.

In an exemplary embodiment, when the trusted template 205 changes with the addition of another trusted biometric sample, such as the addition of the biometric samples 1130*a* and 1140*a* in this example, a retroactive review of all samples in the temporary buffer 212 is triggered to review all samples in the temporary buffer 212 (such as non-matching biometric sample 1120*b*) to determine if any biometric sample in the trusted template 205 matches any non-matching biometric sample, such as the non-matching biometric sample 1120*b*. In some embodiments, a sample may remain indefinitely in the temporary buffer 212.

Figure 12:
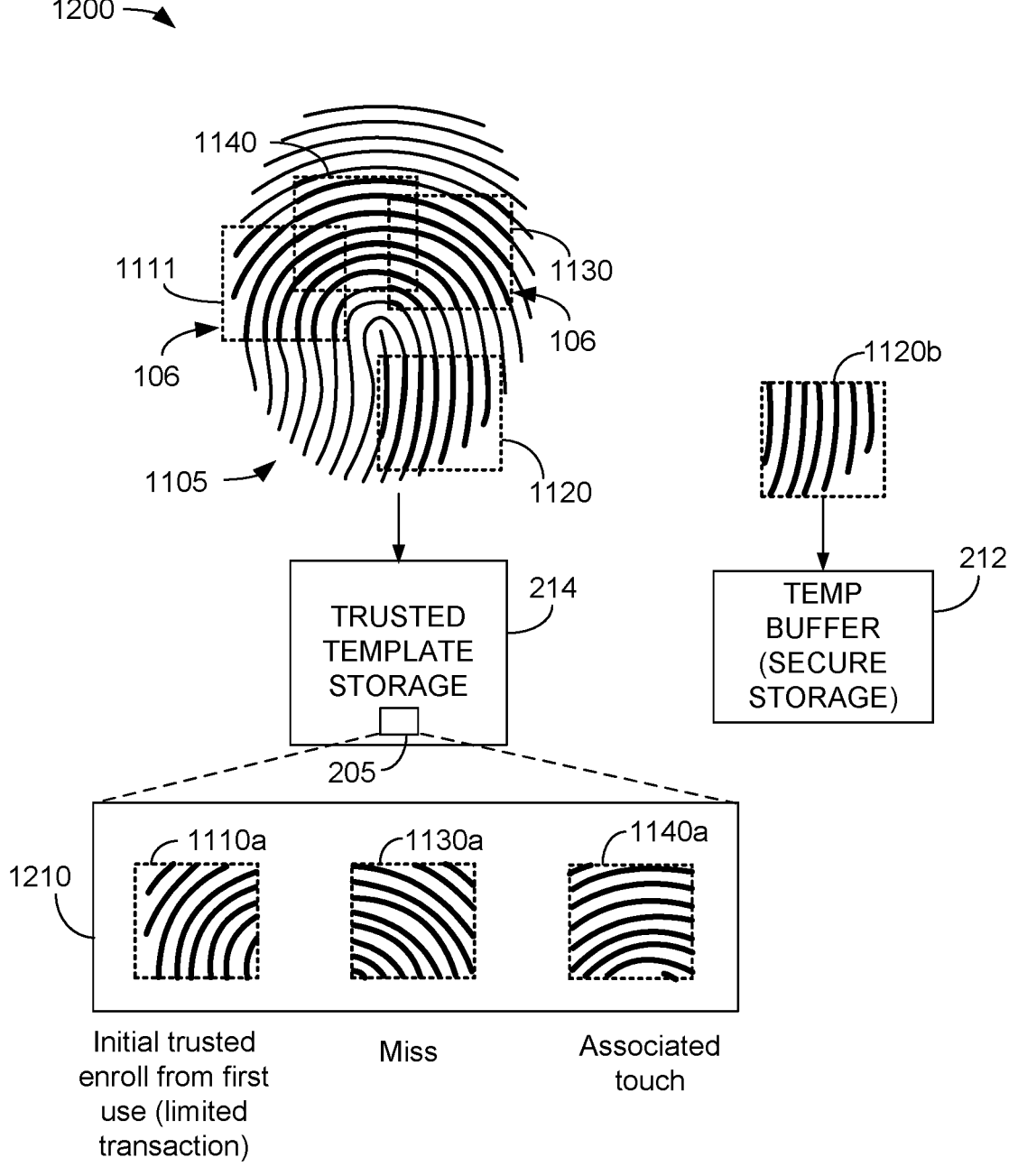
FIG. 12 is a diagram showing a finger print and biometric samples that are part of a trusted template and biometric samples that remain in the temporary buffer.

FIG. 12 is a diagram 1200 showing the finger print 1105 and biometric samples that are part of a trusted template 1210 and biometric samples that remain in the temporary buffer 212. The trusted template 1210 may be an example of the trusted template 205 of FIG. 2A or the trusted template 265 of FIG. 4B, expanded with the addition of biometric samples in addition to the initial trusted biometric sample 1110*a*. In an exemplary embodiment, after the additional subsequent biometric sample 1140 was determined to match the initial trusted biometric sample 1110*a* and to also match the subsequent biometric sample 1130, the non-matching subsequent biometric sample 1130*b* is transferred from the temporary buffer 212 to the trusted template 1210 in the trusted template storage 214, so that the trusted template 1210 in the trusted sample storage 214 includes the initial trusted biometric sample 1110*a*, the non-matching subsequent biometric sample 1130*a*, which is now trusted, along with the matching subsequent trusted biometric sample 1140*a*. Each newly acquired biometric sample, such as the additional subsequent biometric sample 1140 in this example, is always compared to each biometric sample in the temporary buffer and any biometric samples that match the newly acquired biometric sample will be transferred to the trusted template 205. In this example, the matching subsequent trusted biometric sample 1140*a* may be considered to associate the initial trusted biometric sample 1110*a* and the non-matching subsequent biometric sample 1130*b*. However, in this example, because the non-matching biometric sample 1120*b* does not overlap with any biometric sample that also overlaps a biometric sample in the trusted template 1210, the non-matching biometric sample 1120*b* remains in the temporary buffer 212 until another subsequent biometric sample is captured that triggers a retroactive comparison with the non-matching biometric sample 1120*b*.

Figure 13B:
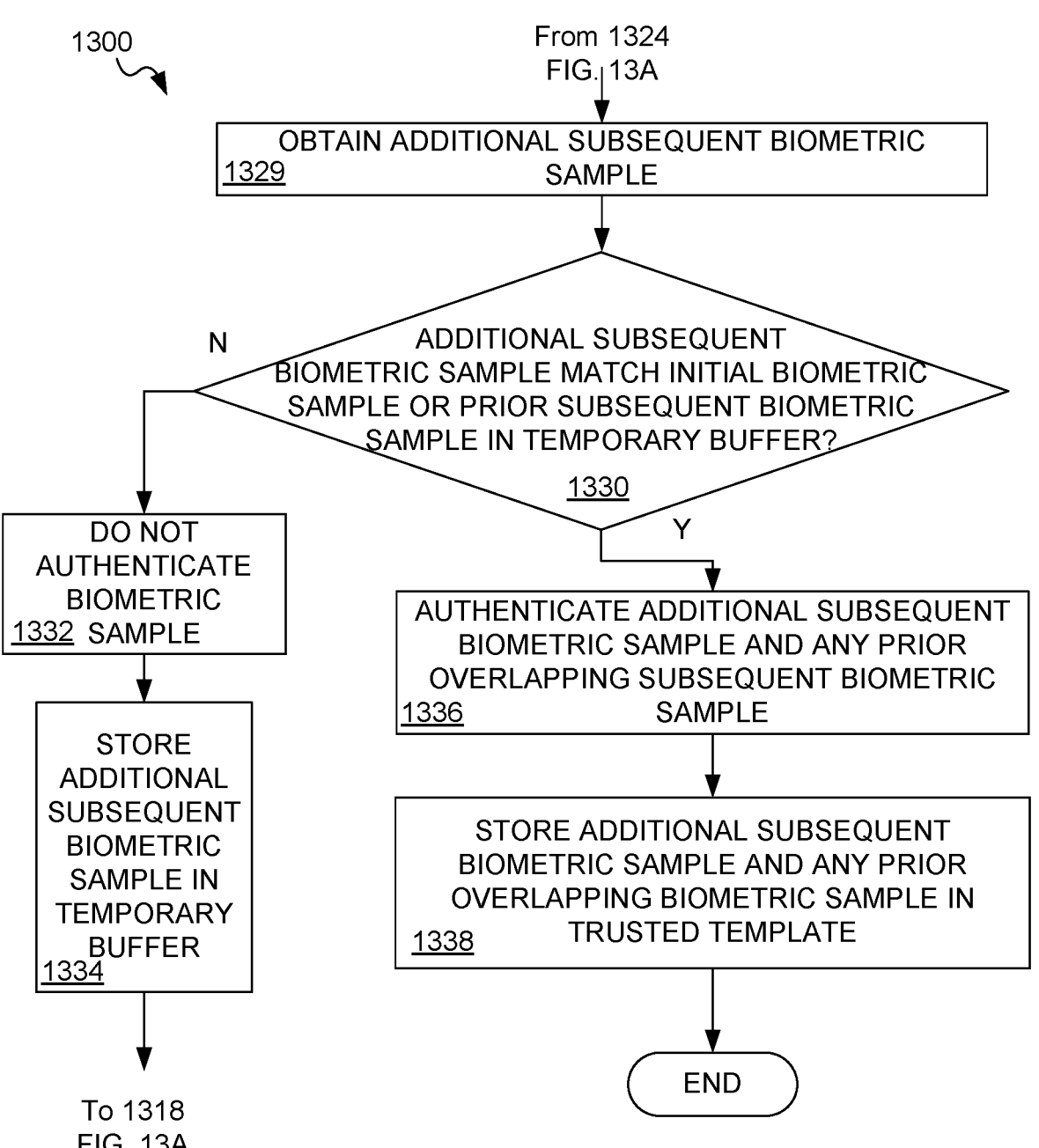

FIG. 13A and FIG. 13B collectively are a flow chart describing an example of the operation of a method 1300 for secure biometric enrollment. The blocks in the method 1300 can be performed in or out of the order shown, and in some embodiments, can be performed at least in part in parallel.

In block 1301, a user device is externally activated. An example of external activation of a user device may be an initial activation of a smart card by a user. For example, a user may receive a smart card in the mail and then call a telephone number, or visit a website, to initially activate the smart card.

In block 1302, after external activation of the smart card, an initial biometric sample may be obtained. For example, as user of a smart card may apply a finger to the biometric sensor on the smart card and capture a fingerprint image. This initial biometric sample may be saved in the trusted template 205 in the trusted template storage 214 as an initial trusted biometric sample 1110*a*. In an exemplary embodiment, the initial trusted biometric sample 1110*a* may be an initial biometric sample that begins the building of a trusted template. In other words, the trusted template may be seeded with the initial trusted biometric sample 1110*a* and then continually updated or expanded with subsequent trusted biometric samples that match the initial trusted biometric sample 1110*a*, or another trusted biometric sample in the trusted template, and that corresponds to the same user.

In block 1304, the initial trusted biometric sample 1110*a* is stored in the trusted template 205 in the trusted template storage 214.

In block 1306, at least one subsequent biometric sample is obtained. In an exemplary embodiment, the sensing area 106 may capture a subsequent biometric sample 1120. In an exemplary embodiment, the subsequent biometric sample 1120 may be a biometric sample obtained by the biometric sensor 102 after the capture of the initial biometric sample 1110 described above.

In block 1308, it is determined whether the at least one subsequent biometric sample 1120 obtained in block 1306 matches the initial trusted biometric sample 1110*a* or matches any other trusted biometric sample in the trusted template 205.

If it is determined in block 1308 that the at least one subsequent biometric sample 1120 obtained in block 1306 does not match the initial trusted biometric sample 1110*a* in the trusted template 205, then in block 1312, the at least one subsequent biometric sample 1120 is not authenticated and in block 1316, the at least one subsequent biometric sample 1120 is stored in the temporary buffer 212 as non-matching subsequent biometric sample 1120*b*. In an exemplary embodiment, any number of subsequent biometric samples may be stored in the temporary buffer 212.

If it is determined in block 1308 that the at least one subsequent biometric sample 1120 obtained in block 1306 does match the initial trusted biometric sample 1110*a* in the trusted template 205, then in block 1310, the at least one subsequent biometric sample 1120 is authenticated and in block 1314 the at least one subsequent biometric sample 1120 is stored in the trusted template 205 as a matching subsequent biometric sample 1120*a*.

In bock 1318, an additional subsequent biometric sample is obtained. In an exemplary embodiment, the sensing area 106 may capture an additional subsequent biometric sample 1130. In an exemplary embodiment, the additional subsequent biometric sample 1130 may be a biometric sample obtained by the biometric sensor 102 after the capture of the initial biometric sample 1110 and the at least one subsequent biometric sample 1120 described above.

In block 1320, it is determined whether the additional subsequent biometric sample 1130 obtained in block 1318 matches the initial trusted biometric sample 1110*a* in the trusted template 205.

If it is determined in block 1320 that the at additional subsequent biometric sample 1130 obtained in block 1318 does not match the initial trusted biometric sample 1110*a* in the trusted template 205, then in block 1322, the at least one subsequent biometric sample 1130 is not authenticated and in block 1324, the additional subsequent biometric sample 1130 is stored in the temporary buffer 212 as non-matching subsequent biometric sample 1130*b*.

If it is determined in block 1320 that the additional subsequent biometric sample 1130 obtained in block 1318 does match the initial trusted biometric sample 1110*a* in the trusted template 205, then in block 1326 the additional subsequent biometric sample 1130 is authenticated and in block 1328, the additional subsequent biometric sample 1130 is stored in the trusted template 205 as a matching subsequent biometric sample 1130*a*.

In bock 1329, an additional subsequent biometric sample is obtained. In an exemplary embodiment, the sensing area 106 may capture an additional subsequent biometric sample 1140. In an exemplary embodiment, the additional subsequent biometric sample 1140 may be a biometric sample obtained by the biometric sensor 102 after the capture of the initial biometric sample 1110 and the subsequent biometric samples 1120 and 1130 described above.

In block 1330, it is determined whether the additional subsequent biometric sample obtained in block 1329 matches the initial biometric sample 1110*a* in the trusted template 205, or matches any other prior trusted biometric samples in the trusted template 205, or matches any non-matching biometric samples in the temporary buffer 212.

If it is determined in block 1330 that the additional subsequent biometric sample 1140 obtained in block 1329 does not match the initial biometric sample 1110*a* in the trusted template 205 and does not match any biometric sample in the temporary buffer, then in block 1332 the additional subsequent biometric sample 1140 is not authenticated and in block 1324, the additional subsequent biometric sample 1140 is stored in the temporary buffer 212 as non-matching subsequent biometric sample 1140*b*.

If it is determined in block 1330 that the additional subsequent biometric sample 1140 obtained in block 1329 does match the initial biometric sample 1110*a* in the trusted template 205 and does match any biometric sample in the temporary buffer, then in block 1336 the at least one additional subsequent biometric sample 1140 is authenticated and stored as a trusted biometric sample 1140*a* in the trusted template 205 in block 1338.

In block 1330, because the additional subsequent biometric sample 1140 also matches the additional subsequent biometric sample 1130, the additional subsequent biometric sample 1130*b* is transferred from the temporary buffer 212 to the trusted template 205 in the trusted template storage 214 and stored as a trusted biometric sample 1130*a* in the trusted template 205 in block 1338. However, in this example, because the non-matching biometric sample 1120*b* does not overlap with any biometric sample that also overlaps a biometric sample in the trusted template 205, the non-matching biometric sample 1120*b* remains in the temporary buffer 212 until another subsequent biometric sample is captured that triggers a retroactive comparison with the non-matching biometric sample 1120*b*.

Figure 14A:
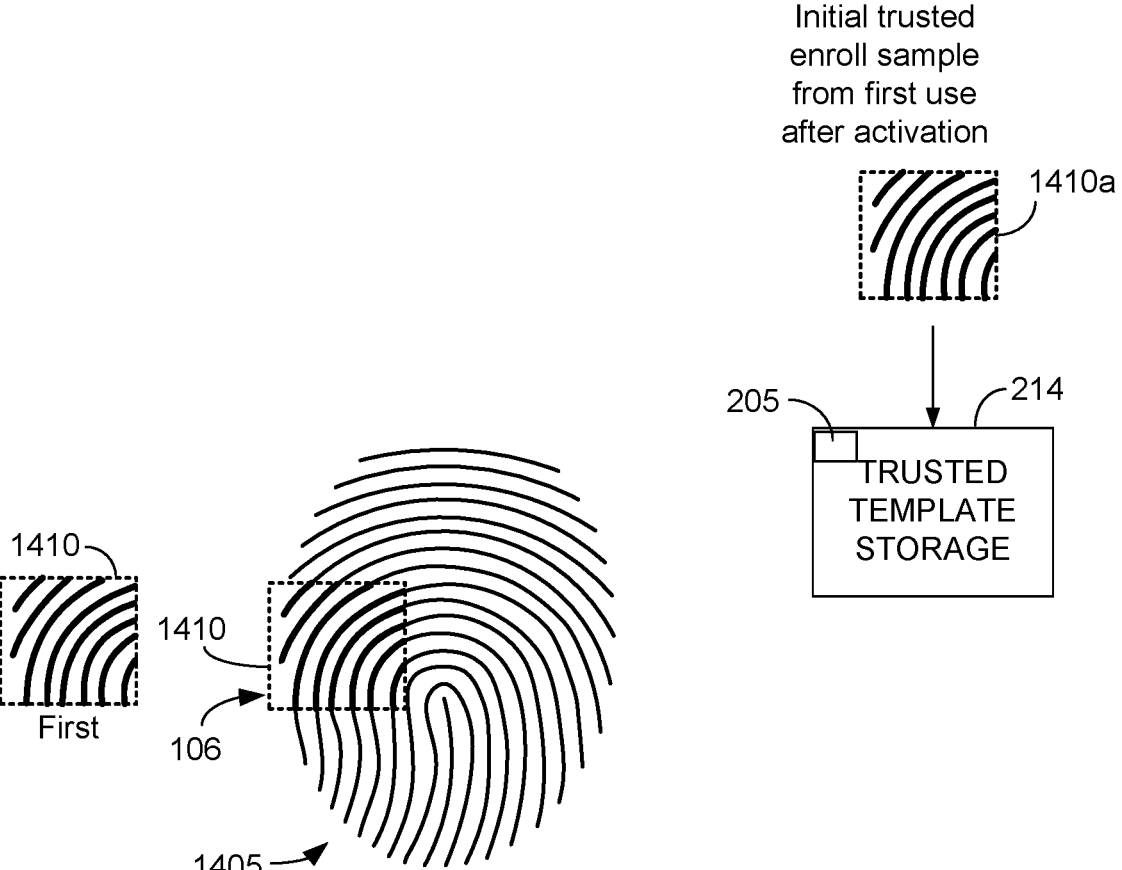
FIGS. 14A, 14B and 14C are a series of drawings illustrating an exemplary embodiment of associating biometric samples for secure biometric enrollment.
Figure 14B:
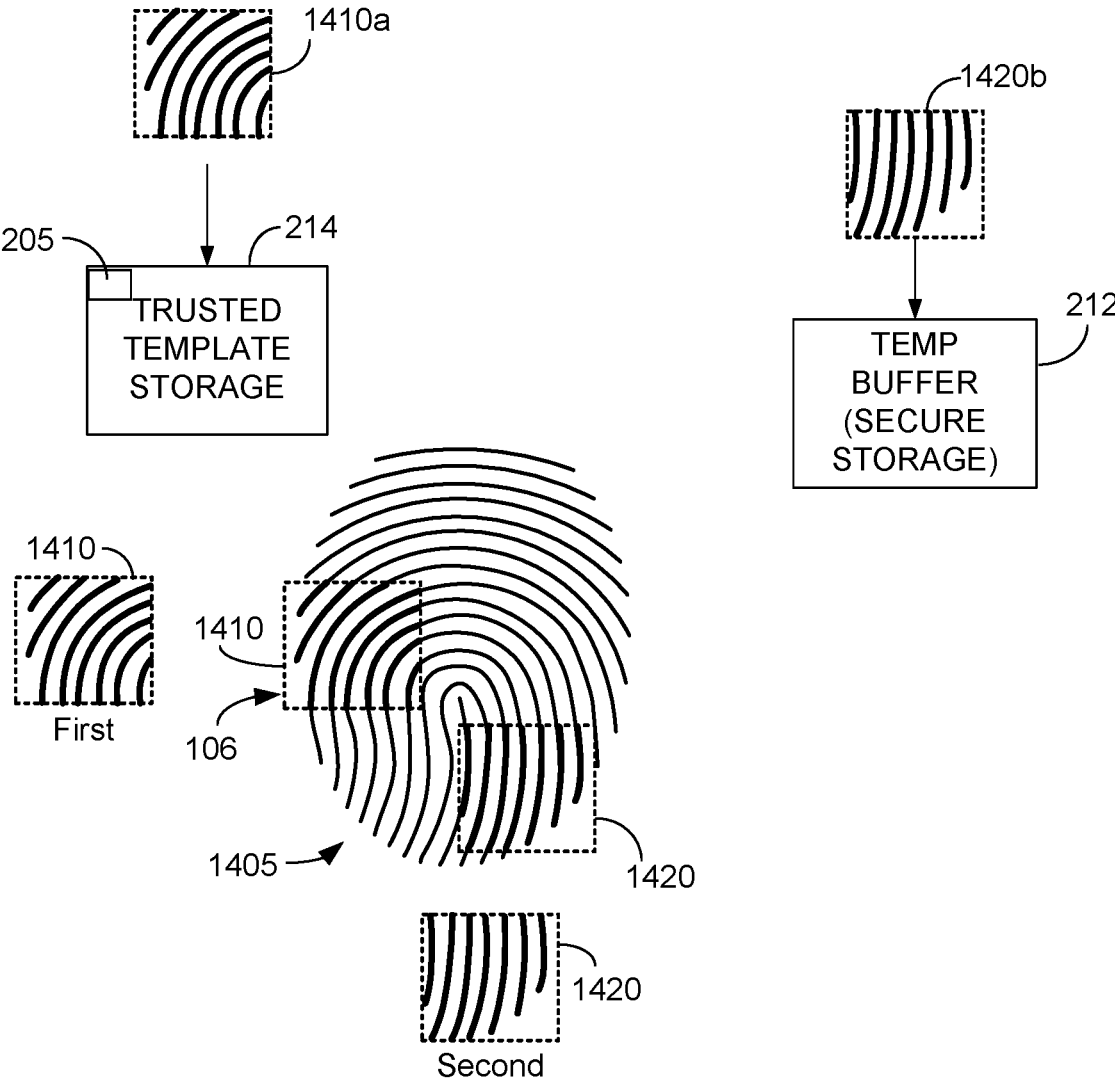
Figure 14C:
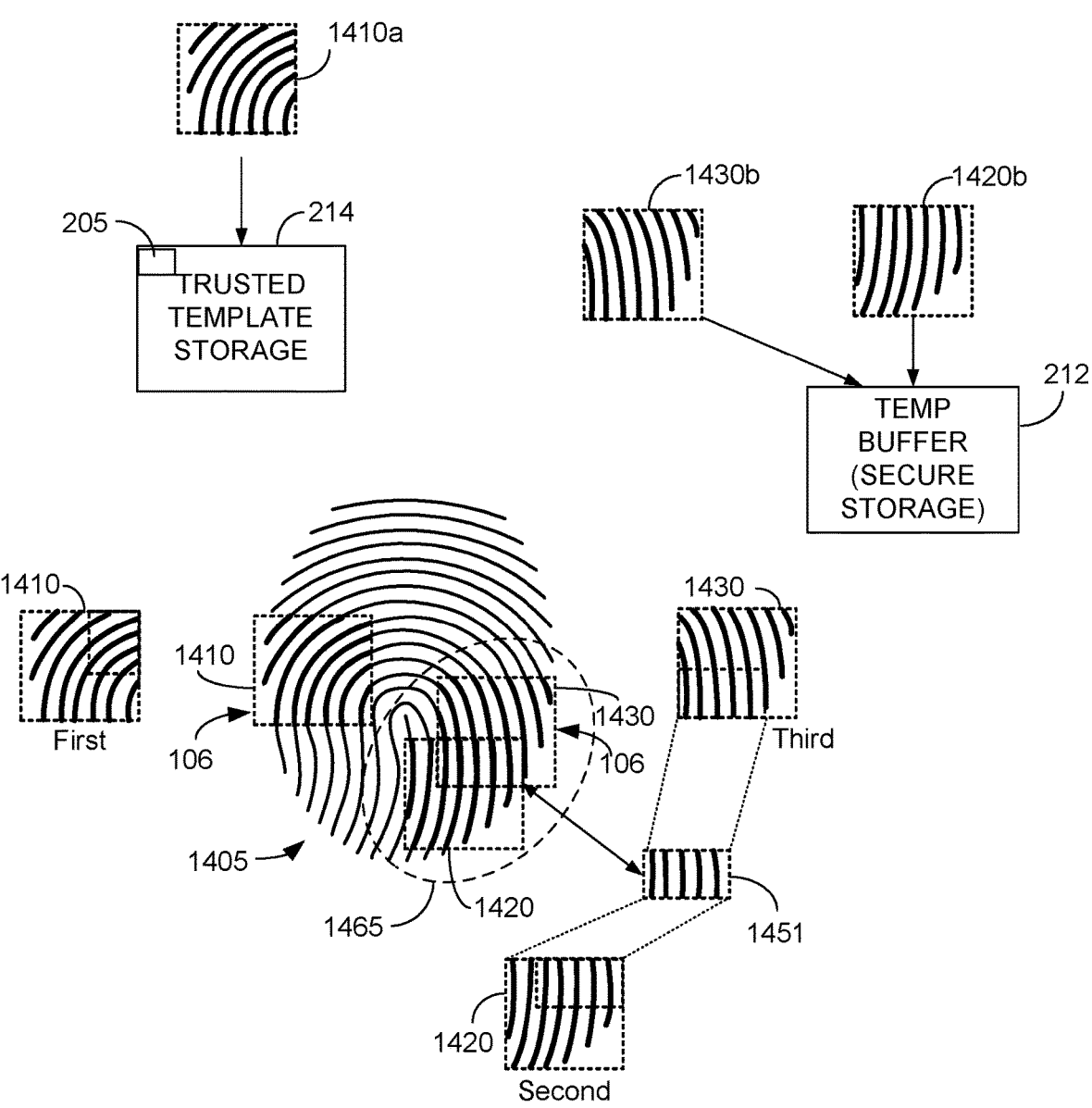

FIGS. 14A, 14B and 14C are a series of drawings illustrating an exemplary embodiment of associating biometric samples for secure biometric enrollment.

FIG. 14A shows a finger print image 1405, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a portion of a fingerprint as an initial biometric sample 1410 and store it as an initial trusted biometric sample 1410*a* in the trusted template 205 in the trusted template storage 214. In an exemplary embodiment, the initial trusted biometric sample 1410*a* may be an electronic representation of a first biometric sample, (for example, the initial biometric sample 1410), captured subsequent to externally activating a user device on which the biometric sensor 102 may be located. In an exemplary embodiment, the initial trusted biometric sample 1410*a* may be an entry in the trusted template 205. In an exemplary embodiment, the user device may be a smart card, such as the smart card 104 (FIG. 1) and the initial trusted biometric sample 1410*a* may be a representation of an image of a portion of the finger of an authorized user of the user device. In an exemplary embodiment, the initial trusted biometric sample 1410*a* may also be referred to as an initial trusted enroll sample.

FIG. 14B shows the finger print image 1405, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a subsequent biometric sample 1420. In an exemplary embodiment, the subsequent biometric sample 1420 may be a biometric sample obtained by the biometric sensor 102 after the capture of the initial biometric sample 1410 described above. In an exemplary embodiment, the subsequent biometric sample 1420 may comprise an image of a portion of the fingerprint 1405 of the user in an area of the fingerprint 1405 that does not overlap with the area of the fingerprint 1405 from which the initial biometric sample 1410 was captured.

In an exemplary embodiment, the matcher 222 (FIG. 2A), or matcher 292 (FIG. 2B) compares the subsequent biometric sample 1420 as it is obtained with the initial trusted biometric sample 1410*a* in the trusted template 205 to determine if a match exists between the initial trusted biometric sample 1410*a* and the subsequent biometric sample 1420.

In an exemplary embodiment, if the subsequent biometric sample 1420 does not match the initial trusted biometric sample 1410*a* in the trusted template 205, then the non-matching subsequent biometric sample 1420 is stored as a non-matching subsequent biometric sample 1420*b*, or as an electronic representation of the non-matching subsequent biometric sample 1420*b*, in the temporary buffer 212. However, if the subsequent biometric sample 1420 does match the initial trusted biometric sample 1410*a* in the trusted template 205, then the matching subsequent biometric sample would be stored as a subsequent trusted biometric sample 1420*a* in the trusted template 205 in the trusted template storage 214.

FIG. 14C shows the finger print image 1405, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 1430, i.e., a second subsequent biometric sample. In an exemplary embodiment, the subsequent biometric sample 1430 may be a biometric sample obtained by the biometric sensor 102 after the capture of the initial biometric sample 1410 and the subsequent biometric sample 1420 described above. In an exemplary embodiment, the subsequent biometric sample 1430 may comprise an image of a portion of the fingerprint 1405 of the user in an area of the fingerprint 1405 that does not at least partially overlap with the area of the fingerprint 1405 from which the initial biometric sample 1410 was captured, but that does at least partially overlap with the area of the fingerprint 1405 from which the subsequent biometric sample 1420 was captured.

In an exemplary embodiment, the matcher 222 (FIG. 2A), or matcher 292 (FIG. 2B) compares the subsequent biometric sample 1430 as it is obtained with the initial trusted biometric sample 1410*a* in the trusted template 205 and with the non-matching subsequent biometric sample 1420*b* in the temporary buffer 212 to determine if a match exists between the subsequent biometric sample 1430 and the initial trusted biometric sample 1410*a*, and between the subsequent biometric sample 1430 and the non-matching subsequent biometric sample 1420*b*.

In this exemplary embodiment, the subsequent biometric sample 1430 does not match the initial trusted biometric sample 1410*a* in the trusted template 205, but does match the subsequent biometric sample 1420*b* in the temporary buffer 212, as shown by the overlap area 1451. In this example, the non-matching subsequent biometric sample 1430 is stored as a non-matching subsequent biometric sample 1430*b*, or as an electronic representation of the non-matching subsequent biometric sample 1430*b*, in the temporary buffer 212.

In an exemplary embodiment, the overlap area 1451 associates the subsequent biometric sample 1430 and the subsequent biometric sample 1420 together such that a grouping may be formed that includes the subsequent biometric sample 1430 and the subsequent biometric sample 1420 in the temporary buffer 212. In an exemplary embodiment, the subsequent biometric sample 1420 and the subsequent biometric sample 1430 may be stored in the temporary buffer 212 in a group 1465 as respective non-matching biometric samples 1420*b* and 1430*b*. In an exemplary embodiment, any biometric sample in a group, such as in the group 1465, can associate a new subsequent biometric sample to a trusted biometric sample, as described herein, in the trusted template, thereby extending explicit trust of association with the user to any biometric sample in the group 1465.

Figure 15:
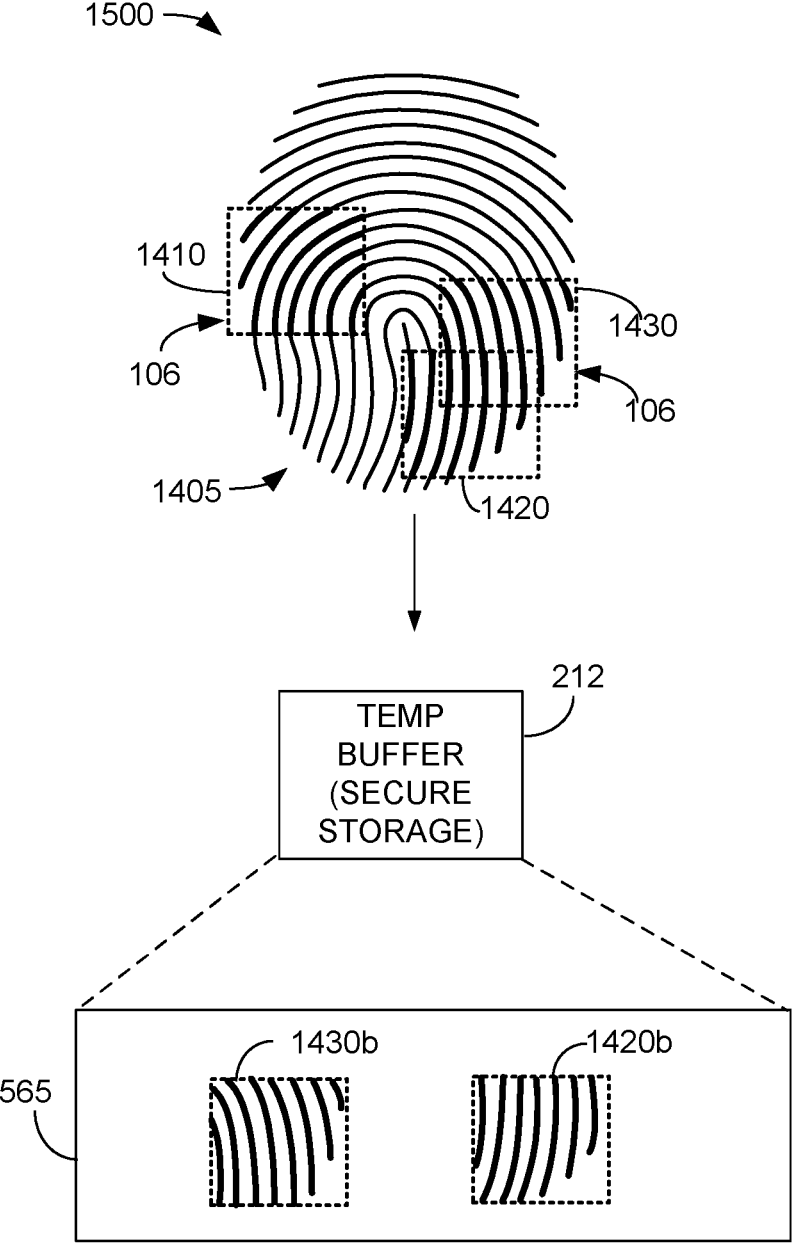
FIG. 15 is a diagram showing the finger print and biometric samples that remain in the temporary buffer.

FIG. 15 is a diagram 1500 showing the finger print 1405 and biometric samples that remain in the temporary buffer 212. In this example, the non-matching biometric samples 1420*b* and 1430*b* remain in the temporary buffer 212. In an exemplary embodiment, the non-matching biometric samples 1420*b* and 1430*b* may form a group 1565 in which the non-matching biometric samples 1420*b* and 1430*b* are associated.

FIG. 16A and FIG. 16B collectively are a flow chart describing an example of the operation of a method 1600 for secure biometric enrollment. The blocks in the method 1600 can be performed in or out of the order shown, and in some embodiments, can be performed at least in part in parallel.

In block 1601, a user device is externally activated. An example of external activation of a user device may be an initial activation of a smart card by a user. For example, a user may receive a smart card in the mail and then call a telephone number, or visit a website, to initially activate the smart card.

In block 1602, after external activation of the smart card, an initial biometric sample may be obtained. For example, as user of a smart card may apply a finger to the biometric sensor on the smart card and capture a fingerprint image. This initial biometric sample may be saved in the trusted template 205 in the trusted template storage 214 as an initial trusted biometric sample 1410*a*. In an exemplary embodiment, the initial trusted biometric sample 1410*a* may be an initial biometric sample that begins the building of a trusted template. In other words, the trusted template may be seeded with the initial trusted biometric sample 1410*a* and then continually updated or expanded with subsequent trusted biometric samples that match the initial trusted biometric sample 1410*a*, or that match another trusted biometric sample in the trusted template, and that corresponds to the same user.

In block 1604, the initial trusted biometric sample 1410*a* is stored in the trusted template 205 in the trusted template storage 214.

In block 1606, at least one subsequent biometric sample is obtained. In an exemplary embodiment, the sensing area 106 may capture a subsequent biometric sample 1420. In an exemplary embodiment, the at least one subsequent biometric sample 1420 may be a biometric sample obtained by the biometric sensor 102 after the capture of the initial biometric sample 1410 described above.

In block 1608, it is determined whether the at least one subsequent biometric sample 1420 obtained in block 1606 matches the initial trusted biometric sample 1410*a* or matches any other trusted biometric sample in the trusted template 205.

If it is determined in block 1608 that the at least one subsequent biometric sample 1420 obtained in block 1606 does not match the initial trusted biometric sample 1410*a* in the trusted template 205, then in block 1612 the at least one subsequent biometric sample 1420 is not authenticated and in block 1616, the at least one subsequent biometric sample 1420 is stored in the temporary buffer 212 as non-matching subsequent biometric sample 1420*b*. In an exemplary embodiment, any number of subsequent biometric samples may be stored in the temporary buffer 212.

If it is determined in block 1608 that the at least one subsequent biometric sample 1420 obtained in block 1606 does match the initial trusted biometric sample 1410*a* in the trusted template 205, then in block 1610 the at least one subsequent biometric sample 1420 is authenticated and in block 1614, and the at least one subsequent biometric sample 1420 is stored in the trusted template 205 as a matching subsequent biometric sample 1420*a*.

In bock 1618, an additional subsequent biometric sample is obtained. In an exemplary embodiment, the sensing area 106 may capture an additional subsequent biometric sample 1430. In an exemplary embodiment, the additional subsequent biometric sample 1430 may be a biometric sample obtained by the biometric sensor 102 after the capture of the initial biometric sample 1410 and the subsequent biometric sample 1420 described above.

In block 1620, it is determined whether the additional subsequent biometric sample 1430 obtained in block 1618 matches the initial trusted biometric sample 1410*a* in the trusted template 205.

If it is determined in block 1620 that the additional subsequent biometric sample 1430 obtained in block 1618 does not match the initial trusted biometric sample 1410*a* in the trusted template 205, then in block 1622, the additional subsequent biometric sample 1430 is not authenticated and in block 1624, the additional subsequent biometric sample 1430 is stored in the temporary buffer 212 as non-matching subsequent biometric sample 1430*b*.

If it is determined in block 1620 that the additional subsequent biometric sample 1430 obtained in block 1618 does match the initial trusted biometric sample 1410*a* in the trusted template 205, then in block 1626, the additional subsequent biometric sample 1430 is authenticated and in block 1628, the additional subsequent biometric sample 1430 is stored in the trusted template 205 as a matching subsequent biometric sample 1430*a*.

In block 1629, it is determined whether the additional subsequent biometric sample obtained in block 1618 matches the subsequent biometric sample 1430*b* (or any other subsequent biometric sample) in the temporary buffer 212.

If it is determined in block 1629 that the additional subsequent biometric sample 1430 obtained in block 1618 does not match the subsequent biometric sample 1430*b* (or any other subsequent biometric sample) in the temporary buffer 212, then the process returns to block 1618 in FIG. 16A.

If it is determined in block 1629 that the additional subsequent biometric sample 1430 obtained in block 1618 does match the subsequent biometric sample 1430*b* (or any other subsequent biometric sample) in the temporary buffer 212, then in block 1630 the additional subsequent biometric sample 1430*b* is associated with the subsequent biometric sample 1420*b* in the temporary buffer.

In block 1636, the additional subsequent biometric sample 1430*b* and the at least one subsequent biometric sample 1420*b* remain in the temporary buffer 212 as being associated together in a group.

FIGS. 17A, 17B, 17C, and 17D are a series of drawings illustrating an exemplary embodiment of secure biometric enrollment.

FIG. 17A shows a second finger print image 1705, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a portion of a second fingerprint (second feature) as a second initial biometric sample 1710 and store it as a second initial trusted biometric sample 1710*a* in a second trusted template 1760 in the trusted template storage 214. In an exemplary embodiment, the second initial trusted biometric sample 1710*a* may be an electronic representation of a first biometric sample, (for example, the initial biometric sample 1710), of a second finger captured subsequent to externally activating a user device on which the biometric sensor 102 may be located. In an exemplary embodiment, the second initial trusted biometric sample 1710*a* may be an entry in the second trusted template 1760. In an exemplary embodiment, the user device may be a smart card, such as the smart card 104 (FIG. 1) and the second initial trusted biometric sample 1710*a* may be a representation of an image of a portion of a second finger of an authorized user of the user device. As used herein, the term "externally activating" may refer to a user receiving a smart card and initially activating the card prior to first use.

In an exemplary embodiment, the second initial biometric sample 1710 may be captured on the second instance of use of the biometric smart card. In another exemplary embodiment, the second initial biometric sample 1710 may be captured on the first use of the biometric smart card which does not match any of the samples in the first trusted template 205 in the trusted template storage 214. In another exemplary embodiment, the capture of second initial biometric sample 1710 may be initiated when a second external activating event is used to place the smart card into a second initial enrollment state. In another exemplary embodiment, as part of the activation event the user may be instructed or prompted to enroll more than one finger in a sequential manner. In one embodiment, a first finger would be captured and enrolled during a first POS transaction and stored securely on the card as the initial seed to the first trusted template 205 followed by a second finger enrollment during a subsequent POS transaction and stored securely on the smart card as the initial seed to the second trusted template 1760. This sequential multi-template enrollment process may in one exemplary embodiment be use-prompted by software or firmware running on a POS terminal to which the smart card is connected. In an exemplary embodiment, the second initial trusted biometric sample 1710*a* may also be referred to as a second initial trusted enroll sample. In an exemplary embodiment, the second initial biometric sample 1710 and the second initial trusted biometric sample 1710*a* contain the same biometric information. The second initial biometric sample 1710 and the second initial trusted biometric sample 1710*a* (and all biometric samples mentioned herein) are referred to using the nomenclature "NNN", "NNNa" and "NNNb" to indicate the same biometric information in different locations and in different states of trust. For example, a biometric sample NNN may be a biometric sample captured by a biometric sensor. A biometric sample NNNa may be a biometric sample captured by a biometric sensor and determined to be a trusted biometric sample. A biometric sample NNNb may be a biometric sample captured by a biometric sensor and not determined to be a trusted biometric sample. A biometric sample NNNa may be placed in a trusted template and a biometric sample NNNb may be placed in a temporary buffer.

While a single second initial trusted biometric sample 1710*a* may be described as initiating the formation of a single second trusted template 1760, in other embodiments more than one initial trusted sample may be implemented in a single second trusted template 1760, or more than one second initial trusted sample may be implemented in more than one second trusted template 1760.

FIG. 17B shows the finger print image 1705, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture a subsequent biometric sample 1715. In an exemplary embodiment, the subsequent biometric sample 1715 may be a biometric sample obtained by the biometric sensor 102 after the capture of the second initial biometric sample 1710 described above. In an exemplary embodiment, the subsequent biometric sample 1715 may comprise an image of a portion of the fingerprint 1705 of the user in an area of the fingerprint 1705 that does not overlap with the area of the fingerprint 1705 from which the second initial biometric sample 1710 was captured.

In an exemplary embodiment, the matcher 222 (FIG. 2A), or matcher 292 (FIG. 2B) compares the subsequent biometric sample 1715 as it is obtained with the second initial trusted biometric sample 1710*a* in the second trusted template 1760 and with the trusted samples in the first trusted template 205 to determine if a match exists between the second initial trusted biometric sample 1710*a* and the subsequent biometric sample 1715 or any of the trusted samples in the first trusted template 205.

In an exemplary embodiment, if the subsequent biometric sample 1715 does not match the second initial trusted biometric sample 1710*a* in the second trusted template 1760 or does not match any trusted sample in the first trusted template 205, then the non-matching subsequent biometric sample 1715 is stored as a non-matching subsequent biometric sample 1715*b*, or as an electronic representation of the non-matching subsequent biometric sample 1715*b*, in the temporary buffer 212. However, if the subsequent biometric sample 1715 does match the second initial trusted biometric sample 1710*a* in the second trusted template 1760 or does match any trusted sample in the first trusted template 205, then the matching subsequent biometric sample would be stored as a subsequent trusted biometric sample 1715*a* in the second trusted template 1760 in the trusted template storage 214, as will be described below.

FIG. 17C shows the finger print image 1705, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 1725. In an exemplary embodiment, the subsequent biometric sample 1725 may be a biometric sample obtained by the biometric sensor 102 after the capture of the second initial biometric sample 1710 described above, i.e., a second subsequent biometric sample. In an exemplary embodiment, the subsequent biometric sample 1725 may comprise an image of a portion of the fingerprint 1705 of the user in an area of the fingerprint 1705 that does not overlap with the area of the fingerprint 1705 from which the second initial biometric sample 1710 was captured.

In an exemplary embodiment, the matcher 222 (FIG. 2A), or matcher 292 (FIG. 2B) compares the subsequent biometric sample 1725 as it is obtained with the second initial trusted biometric sample 1710*a* in the second trusted template 1760 and with the trusted samples in the first trusted template 205 to determine if a match exists between the second initial trusted biometric sample 1710*a* or any of the samples in the first trusted template 205, and the subsequent biometric sample 1725.

In an exemplary embodiment, if the subsequent biometric sample 1725 does not match the initial trusted biometric sample 1710*a* in the trusted template 1760 or does not match any trusted sample in the first trusted template 205 then the non-matching subsequent biometric sample 1725 is stored as a non-matching subsequent biometric sample 1725*b*, or as an electronic representation of the non-matching subsequent biometric sample 1725*b*, in the temporary buffer 212. However, if the subsequent biometric sample 1725 does match the initial trusted biometric sample 1710*a* in the trusted template 1760 or does match any trusted sample in the first trusted template 205, then the matching subsequent biometric sample would be stored as a subsequent trusted biometric sample 1725*a* in the second trusted template 1760 in the trusted template storage 214, as will be described below.

FIG. 17D shows the finger print image 1705, at least a portion of which may be captured by a sensing area 106 (FIG. 1) of a biometric sensor 102 (FIG. 1, or 228 of FIG. 2A or 290 of FIG. 2B). In an exemplary embodiment, the sensing area 106 may capture another subsequent biometric sample 1735. In an exemplary embodiment, the subsequent biometric sample 1735 may be a biometric sample obtained by the biometric sensor 102 after the capture of the second initial biometric sample 1710 described above, i.e., a third subsequent biometric sample. In an exemplary embodiment, the subsequent biometric sample 1735 may comprise an image of a portion of the fingerprint 1705 of the user in an area of the fingerprint 1705 that does not overlap with the area of the fingerprint 1705 from which the second initial biometric sample 1710 was captured.

In an exemplary embodiment, the matcher 222 (FIG. 2A), or matcher 292 (FIG. 2B) compares the subsequent biometric sample 1735 as it is obtained with the second initial trusted biometric sample 1710*a* in the second trusted template 1760 or any of the trusted samples in the first trusted template 205 to determine if a match exists between the second initial trusted biometric sample 1710*a* or any of the samples in the first trusted template 205 and the subsequent biometric sample 1735.

In an exemplary embodiment, if the subsequent biometric sample 1735 does not match the second initial trusted biometric sample 1710*a* in the second trusted template 1760 or does not match any trusted sample in the first trusted template 205, then the non-matching subsequent biometric sample 1735 is stored as a non-matching subsequent biometric sample 1735*b*, or as an electronic representation of the non-matching subsequent biometric sample 1735*b*, in the temporary buffer 212. However, if the subsequent biometric sample 1735 does match the second initial trusted biometric sample 1710*a* in the second trusted template 1760 or does match any trusted sample in the first trusted template 205, then the matching subsequent biometric sample would be stored as a subsequent trusted biometric sample 1735*a* in the second trusted template 1760 in the trusted template storage 214, as will be described below.

FIG. 18 is a diagram 1800 showing a series of biometric samples in a temporary buffer and in a trusted template in a trusted template storage. In FIG. 18, the finger print image 1705, at least a portion of which may be captured by a sensing area 106 (FIG. 1) of a biometric sensor 102 (FIG. 1, or 228 of FIG. 2A or 290 of FIG. 2B) is shown along with a number of biometric samples. In an exemplary embodiment, the sensing area 106 may capture another subsequent biometric sample 1750, i.e., a fourth subsequent biometric sample. In an exemplary embodiment, the subsequent biometric sample 1750 may be a biometric sample obtained by the biometric sensor 102 after the capture of the second initial biometric sample 1710 described above. In an exemplary embodiment, the subsequent biometric sample 1750 may comprise an image of a portion of the fingerprint 1705 of the user in an area of the fingerprint 1705 that does overlap with the area of the fingerprint 1705 from which the second initial biometric sample 1710 was captured.

In an exemplary embodiment, the matcher 222 (FIG. 2A), or matcher 292 (FIG. 2B) compares the subsequent biometric sample 1750 as it is obtained with the second initial trusted biometric sample 1710*a* in the second trusted template 1760 and with the trusted samples in the first trusted template 205 to determine if a match exists between the second initial trusted biometric sample 1710*a* or any of the samples in the first trusted template 205 and the subsequent biometric sample 1750.

In an exemplary embodiment, the subsequent biometric sample 1750 does match the second initial trusted biometric sample 1710*a* in the second trusted template 1760 or any of the trusted biometric samples in the first trusted template 205, such that the matching subsequent biometric sample 1750 is stored as a subsequent trusted biometric sample 1750*a* in the second trusted template 1760 in the trusted template storage 214.

In an exemplary embodiment, matching the additional subsequent biometric sample 1750 with the second initial trusted biometric sample 1710*a* or any of the trusted samples in the first trusted template 205 also retroactively extends trust of association with the user to the non-matching biometric samples 1715*b*, 1725*b* and 1735*b* in the temporary buffer 212, thus incorporating the non-matching biometric samples 1715*b*, 1725*b* and 1735*b* in the temporary buffer 212 into the second trusted template 1760 in the trusted template storage 214, where they are stored as matching biometric samples 1715*a*, 1725*a* and 1735*a*. In this manner the non-matching biometric samples 1715*b*, 1725*b* and 1735*b* in the temporary buffer 212 become subsequent trusted biometric samples and become part of the second trusted template 1760. In an exemplary embodiment, the second trusted template 1760 in the trusted template storage

214 may be iteratively and continually expanded and updated with additional subsequent trusted biometric samples.

Although the description of FIGS. 17A, 17B, 17 and 17D use an example of three non-matching biometric samples 1715*b*, 1725*b* and 17335*b* being captured after the second biometric sample 1710 is stored as a second initial trusted biometric sample 1710*a* in the second trusted template 1760 in the trusted template storage 214, more or fewer subsequent biometric samples may be captured and compared against the second initial trusted biometric sample 1710*a* in the trusted template storage 214. Further, although the description of FIGS. 17A, 17B, 17C, 3D, and FIG. 18 refers to the second trusted template 1760 and the trusted template storage 214 of FIG. 2A, the description is equally applicable to other trusted templates described herein.

FIG. 19 is a diagram 1900 showing a series of biometric samples being compared to trusted samples in a biometric template. A fingerprint image 1905 shows the first initial trusted biometric sample 310 (stored as 310*a* in a trusted template 1951) and a fingerprint image 1906 shows the second initial trusted biometric sample 1710 (stored as 1710*a* in the trusted template 1951). In this exemplary embodiment, the first initial trusted biometric sample 310*a* corresponds to a first finger of a user and the second initial trusted biometric sample 1710*a* corresponds to a second finger of a user.

A subsequent biometric sample 1955 represents a touch on an unknown finger (shown arbitrarily on the fingerprint image 1906). In an exemplary embodiment, the subsequent biometric sample 1955 is compared against both the first initial trusted biometric sample 310*a* and the second initial trusted biometric sample 1710*a* in the trusted template 1951. In this example, the subsequent biometric sample 1955 does not match (or overlap) with either the first initial trusted biometric sample 310*a* or the second initial trusted biometric sample 1710*a* and is stored in the temporary buffer 212 as a non-matching biometric sample 1955*b*.

Another subsequent biometric sample 1965 represents a second touch on an unknown finger (shown arbitrarily on the fingerprint image 1905). In an exemplary embodiment, the subsequent biometric sample 1965 is also compared against both the first initial trusted biometric sample 310*a* and the second initial trusted biometric sample 1710*a* in the trusted template 1951. In this example, the subsequent biometric sample 1965 does not match (or overlap) with either the first initial trusted biometric sample 310*a* or the second initial trusted biometric sample 1710*a* and is stored in the temporary buffer 212 as a non-matching biometric sample 1965*b*.

Another subsequent biometric sample 1975 represents a third touch on an unknown finger (shown arbitrarily on fingerprint image 1905). In an exemplary embodiment, the subsequent biometric sample 1975 is also compared against both the first initial trusted biometric sample 310*a* and the second initial trusted biometric sample 1710*a* in the trusted template 1951. In this example, the subsequent biometric sample 1975 matches (or at least partially overlaps the first initial trusted biometric sample 310*a*. Because the subsequent biometric sample 1975 matches or partially overlaps at least one of the first initial trusted biometric sample 310*a* or the second initial trusted biometric sample 1710*a* (in this example, first initial trusted sample 310*a*), the subsequent biometric sample 1975 is stored in the trusted template 1951 as a trusted biometric sample 1975*a*.

In an exemplary embodiment, matching the additional subsequent biometric sample 1975 with one of the first initial trusted biometric sample 310*a* or the second initial trusted biometric sample 1710*a* also retroactively extends trust of association with the user to the non-matching biometric samples 1955*b* and 1965*b* in the temporary buffer 212, thus incorporating the non-matching biometric samples 1955*b* and 1965*b* in the temporary buffer 212 into the trusted template 1951 in the trusted template storage 214, where they are stored as matching biometric samples 1955*a* and 1965*a*. In this manner the non-matching biometric samples 1955*b* and 1965*b* in the temporary buffer 212 become subsequent trusted biometric samples and become part of the trusted template 1951. In an exemplary embodiment, the trusted template 1951 in the trusted template storage 214 may be iteratively and continually expanded and updated with additional subsequent trusted biometric samples.

Implementation examples are described in the following numbered clauses:

1. A method for secure biometric enrollment, comprising: externally activating a user device, the user device having biometric capability; obtaining an initial biometric sample of a user subsequent to externally activating the user device; storing the initial biometric sample as a trusted sample in a trusted template; obtaining at least one subsequent biometric sample; comparing the at least one subsequent biometric sample as it is obtained to the trusted template; and based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into the trusted template and retroactively extending trust of association with the user to the non-matching at least one subsequent biometric sample in the temporary buffer, thus incorporating the non-matching at least one subsequent biometric sample in the temporary buffer into the trusted template.

2. The method of clause 1, wherein the user device is a smart card and the initial biometric sample, at least one subsequent biometric sample, and the at least one additional subsequent biometric sample are obtained using a biometric sensor on the smart card and the user maintains custody of the smart card from the external activation through the incorporating of the non-matching at least one subsequent biometric sample (and the non-matching at least one additional subsequent biometric sample) into the trusted template.

3. The method of any of clauses 1 through 2, wherein the initial biometric sample, at least one subsequent biometric sample, and the at least one additional subsequent biometric sample are fingerprint images.

4. The method of any of clauses 1 through 3, wherein the initial biometric sample, at least one subsequent biometric sample, and the at least one additional subsequent biometric sample are fingerprint images of the same finger.

5. The method of any of clauses 1 through 4, wherein initial biometric sample comprises a biometric sample of a first feature (first finger) and the method further comprises: obtaining a second initial biometric sample of a second feature (second finger); and storing the second initial biometric sample as a second trusted sample in a second trusted template.

6. The method of clause 5, further comprising: subsequent biometric sample(s) of the second feature; comparing the subsequent biometric sample(s) of the second feature as they are obtained to the second trusted template; based on the comparing, if the subsequent biometric sample(s) of the second feature do not match the second initial biometric sample in the second trusted template, storing the subsequent biometric sample(s) of the second feature into a temporary buffer until trust of association with the user in the subsequent biometric sample(s) of the second feature is extended by obtaining an additional subsequent biometric sample of the second feature that does match the second trusted template; and upon extending trust of association with the user in the subsequent biometric sample(s) of the second feature by obtaining the additional subsequent biometric sample of the second feature that matches the second trusted template, incorporating the subsequent biometric sample(s) of the second feature into the second trusted template.

7. The method of any of clauses 1 through 6, wherein the step of externally activating the user device establishes an initial trusted state during which trust of association with the user is established in the user device.

8. The method of clause 7, wherein the initial trusted state comprises a time period.

9. The method of clause 7, wherein the initial trusted state comprises a time period beginning with the step of externally activating the user device and extending for a predetermined amount of time.

10. The method of clause 7, wherein the initial trusted state comprises a time period beginning with the step of externally activating the user device and extending for a predetermined number of transactions or extending for a predetermined number of biometric sample collections.

11. The method of any of clauses 1 through 10, further comprising: obtaining additional non-matching subsequent biometric samples; storing the additional non-matching subsequent biometric samples in the temporary buffer; and upon retroactively extending trust of association with the user to the additional non-matching subsequent biometric samples, transferring the additional non-matching subsequent biometric samples into the trusted template.

12. The method of clause 11, wherein transferring the additional non-matching subsequent biometric samples into the trusted template generates an iterative trusted template.

13. A system for secure biometric enrollment, comprising: a user device having a processor operatively coupled to a memory, the memory having at least a temporary buffer and a trusted template storage, the user device having biometric capability; the user device configured to obtain an initial biometric sample of a user subsequent to externally activating the user device; the memory configured to store the initial biometric sample as a trusted sample in the trusted template storage; the user device configured to obtain at least one subsequent biometric sample; the processor configured to compare the at least one subsequent biometric sample as it is obtained to the trusted template; and based on the comparing, when the at least one subsequent biometric sample does not match the initial biometric sample in the trusted template, the memory configured to store the at least one non-matching subsequent biometric sample into the temporary buffer until an additional subsequent biometric sample is obtained and does match the initial biometric sample in the trusted template storage, the processor configured to place the matching additional subsequent biometric sample into the trusted template storage and retroactively extend trust of association with the user to the non-matching at least one subsequent biometric sample in the temporary buffer, the processor configured to incorporate the non-matching at least one subsequent biometric sample in the temporary buffer into the trusted template storage.

14. The system of clause 13, wherein the user device is a smart card and the initial biometric sample, at least one subsequent biometric sample, and the at least one additional subsequent biometric sample are obtained using a biometric sensor on the smart card and the user maintains custody of the smart card from the external activation through the incorporating of the non-matching at least one subsequent biometric sample (and the non-matching at least one additional subsequent biometric sample) into the trusted template.

15. The system of any of clauses 13 through 14, wherein the initial biometric sample, at least one subsequent biometric sample, and the at least one additional subsequent biometric sample are fingerprint images.

16. The system of any of clauses 13 through 15, wherein the initial biometric sample, at least one subsequent biometric sample, and the at least one additional subsequent biometric sample are fingerprint images of the same finger.

17. The system of any of clauses 13 through 16, wherein the initial biometric sample comprises a biometric sample of a first feature (first finger) and the system further comprises: the user device configured to obtain a second initial biometric sample of a second feature (second finger); and the memory configured to store the second initial biometric sample as a second trusted sample in a second trusted template.

18. The system of clause 17, further comprising: the user device configured to obtain subsequent biometric sample(s) of the second feature; the processor configured to compare the subsequent biometric sample(s) of the second feature as they are obtained to the second trusted template; based on the comparing, if the subsequent biometric sample(s) of the second feature do not match the second initial biometric sample in the second trusted template, storing the subsequent biometric sample(s) of the second feature into a temporary buffer until trust of association with the user in the subsequent biometric sample(s) of the second feature is extended by obtaining an additional subsequent biometric sample of the second feature that does match the second trusted template; and upon extending trust of association with the user in the subsequent biometric sample(s) of the second feature by obtaining the additional subsequent biometric sample of the second feature that matches the second trusted template, incorporating the subsequent biometric sample(s) of the second feature into the second trusted template.

19. The system of any of clauses 13 through 18, wherein externally activating the user device establishes an initial trusted state during which trust of association with the user is established in the user device.

20. The system of clause 19, wherein the initial trusted state comprises a time period.

21. The system of clause 19, wherein the initial trusted state comprises a time period beginning with externally activating the user device and extending for a predetermined amount of time.

22. The system of clause 19, wherein the initial trusted state comprises a time period beginning with externally activating the user device and extending for a predetermined number of transactions or extending for a predetermined number of biometric sample collections.

23. The system of any of clauses 13 through 22, further comprising: the user device configured to obtain additional non-matching subsequent biometric samples; the memory configured to store the additional non-matching subsequent biometric samples in the temporary buffer; and upon the processor retroactively extending trust of association with the user to the additional non-matching subsequent biometric samples, the processor configured to transfer the additional non-matching subsequent biometric samples into the trusted template.

24. The system of any of clauses 13 through 23, wherein transferring the additional non-matching subsequent biometric samples into the trusted template generates an iterative trusted template.

25. A method for secure biometric enrollment, comprising: externally activating a user device, the user device having biometric capability; obtaining an initial biometric sample of a user subsequent to externally activating the user device; storing the initial biometric sample as a trusted sample in a trusted template; obtaining at least one subsequent biometric sample; comparing the at least one subsequent biometric sample as it is obtained to the trusted template; based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into the trusted template creating an expanded trusted template; and retroactively comparing the non-matching at least one subsequent biometric sample in the temporary buffer to the expanded trusted template, and when the non-matching at least one subsequent biometric sample matches the expanded trusted template, incorporating the non-matching at least one subsequent biometric sample in the temporary buffer into the expanded trusted template.

One or more illustrative or exemplary embodiments of the invention have been described above. However, it is to be understood that the invention is defined by the appended claims and is not limited to the specific embodiments described.

What is claimed is:

1. A method for secure biometric enrollment, comprising:
externally activating a user device, the user device having biometric capability;
obtaining an initial biometric sample of a user subsequent to externally activating the user device;
storing the initial biometric sample as a trusted sample in a trusted template;
obtaining at least one subsequent biometric sample;
comparing the at least one subsequent biometric sample as it is obtained to the trusted template; and
based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into the trusted template and retroactively extending trust of association with the user to the non-matching at least one subsequent biometric sample in the temporary buffer, thus incorporating the non-matching at least one subsequent biometric sample in the temporary buffer into the trusted template.

2. The method of claim 1, wherein the user device is a smart card and the initial biometric sample, at least one subsequent biometric sample, and the at least one additional subsequent biometric sample are obtained using a biometric sensor on the smart card and the user maintains custody of the smart card from the external activation through the incorporating of the non-matching at least one subsequent biometric sample (and the non-matching at least one additional subsequent biometric sample) into the trusted template.

3. The method of claim 1, wherein the initial biometric sample, at least one subsequent biometric sample, and the at least one additional subsequent biometric sample are fingerprint images.

4. The method of claim 1, wherein the initial biometric sample, at least one subsequent biometric sample, and the at least one additional subsequent biometric sample are fingerprint images of the same finger.

5. The method of claim 1, wherein the initial biometric sample comprises a biometric sample of a first feature (first finger) and the method further comprises:

obtaining a second initial biometric sample of a second feature (second finger); and storing the second initial biometric sample as a second trusted sample in a second trusted template.

6. The method of claim 5, further comprising:

obtaining subsequent biometric sample(s) of the second feature;

comparing the subsequent biometric sample(s) of the second feature as they are obtained to the second trusted template;

based on the comparing, if the subsequent biometric sample(s) of the second feature do not match the second initial biometric sample in the second trusted template, storing the subsequent biometric sample(s) of the second feature into a temporary buffer until trust of association with the user in the subsequent biometric sample(s) of the second feature is extended by obtaining an additional subsequent biometric sample of the second feature that does match the second trusted template; and upon extending trust of association with the user in the subsequent biometric sample(s) of the second feature by obtaining the additional subsequent biometric sample of the second feature that matches the second trusted template, incorporating the subsequent biometric sample(s) of the second feature into the second trusted template.

7. The method of claim 1, wherein the step of externally activating the user device establishes an initial trusted state during which trust of association with the user is established in the user device.

8. The method of claim 7, wherein the initial trusted state comprises a time period.

9. The method of claim 7, wherein the initial trusted state comprises a time period beginning with the step of externally activating the user device and extending for a predetermined amount of time.

10. The method of claim 7, wherein the initial trusted state comprises a time period beginning with the step of externally activating the user device and extending for a predetermined number of transactions or extending for a predetermined number of biometric sample collections.

11. The method of claim 1, further comprising:

obtaining additional non-matching subsequent biometric samples;

storing the additional non-matching subsequent biometric samples in the temporary buffer; and upon retroactively extending trust of association with the user to the additional non-matching subsequent biometric samples, transferring the additional non-matching subsequent biometric samples into the trusted template.

12. The method of claim 11, wherein transferring the additional non-matching subsequent biometric samples into the trusted template generates an iterative trusted template.

13. A system for secure biometric enrollment, comprising:

a user device having a processor operatively coupled to a memory, the memory having at least a temporary buffer and a trusted template storage, the user device having biometric capability;

the user device configured to obtain an initial biometric sample of a user subsequent to externally activating the user device;

the memory configured to store the initial biometric sample as a trusted sample in the trusted template storage;

the user device configured to obtain at least one subsequent biometric sample;

the processor configured to compare the at least one subsequent biometric sample as it is obtained to the trusted template; and based on the comparing, when the at least one subsequent biometric sample does not match the initial biometric sample in the trusted template, the memory configured to store the at least one non-matching subsequent biometric sample into the temporary buffer until an additional subsequent biometric sample is obtained and does match the initial biometric sample in the trusted template storage, the processor configured to place the matching additional subsequent biometric sample into the trusted template storage and retroactively extend trust of association with the user to the non-matching at least one subsequent biometric sample in the temporary buffer, the processor configured to incorporate the non-matching at least one subsequent biometric sample in the temporary buffer into the trusted template storage.

14. The system of claim 13, wherein the user device is a smart card and the initial biometric sample, at least one subsequent biometric sample, and the at least one additional subsequent biometric sample are obtained using a biometric sensor on the smart card and the user maintains custody of the smart card from the external activation through the incorporating of the non-matching at least one subsequent biometric sample (and the non-matching at least one additional subsequent biometric sample) into the trusted template.

15. The system of claim 13, wherein the initial biometric sample, at least one subsequent biometric sample, and the at least one additional subsequent biometric sample are fingerprint images.

16. The system of claim 13, wherein the initial biometric sample, at least one subsequent biometric sample, and the at least one additional subsequent biometric sample are fingerprint images of the same finger.

17. The system of claim 13, wherein the initial biometric sample comprises a biometric sample of a first feature (first finger) and the system further comprises:

the user device configured to obtain a second initial biometric sample of a second feature (second finger); and the memory configured to store the second initial biometric sample as a second trusted sample in a second trusted template.

18. The system of claim 17, further comprising:

the user device configured to obtain subsequent biometric sample(s) of the second feature;

the processor configured to compare the subsequent biometric sample(s) of the second feature as they are obtained to the second trusted template;

based on the comparing, if the subsequent biometric sample(s) of the second feature do not match the second initial biometric sample in the second trusted template, storing the subsequent biometric sample(s) of the second feature into a temporary buffer until trust of association with the user in the subsequent biometric sample(s) of the second feature is extended by obtaining an additional subsequent biometric sample of the second feature that does match the second trusted template; and upon extending trust of association with the user in the subsequent biometric sample(s) of the second feature by obtaining the additional subsequent biometric sample of the second feature that matches the second trusted template, incorporating the subsequent biometric sample(s) of the second feature into the second trusted template.

19. The system of claim 13, wherein externally activating the user device establishes an initial trusted state during which trust of association with the user is established in the user device.

20. The system of claim 19, wherein the initial trusted state comprises a time period.

21. The system of claim 19, wherein the initial trusted state comprises a time period beginning with externally activating the user device and extending for a predetermined amount of time.

22. The system of claim 19, wherein the initial trusted state comprises a time period beginning with externally activating the user device and extending for a predetermined number of transactions or extending for a predetermined number of biometric sample collections.

23. The system of claim 13, further comprising:

the user device configured to obtain additional non-matching subsequent biometric samples;

52 the memory configured to store the additional non-matching subsequent biometric samples in the temporary buffer; and upon the processor retroactively extending trust of association with the user to the additional non-matching subsequent biometric samples, the processor configured to transfer the additional non-matching subsequent biometric samples into the trusted template.

24. The system of claim 13, wherein transferring the additional non-matching subsequent biometric samples into the trusted template generates an iterative trusted template.

25. A method for secure biometric enrollment, comprising:

externally activating a user device, the user device having biometric capability;

obtaining an initial biometric sample of a user subsequent to externally activating the user device;

storing the initial biometric sample as a trusted sample in a trusted template;

obtaining at least one subsequent biometric sample;

comparing the at least one subsequent biometric sample as it is obtained to the trusted template;

based on the comparing, when the at least one subsequent biometric sample does not match the initial biometric sample in the trusted template, storing the at least one non-matching subsequent biometric sample into a temporary buffer until an additional subsequent biometric sample is obtained and does match the initial biometric sample in the trusted template, placing the matching additional subsequent biometric sample into the trusted template creating an expanded trusted template; and retroactively comparing the non-matching at least one subsequent biometric sample in the temporary buffer to the expanded trusted template, and when the non-matching at least one subsequent biometric sample matches the expanded trusted template, incorporating the non-matching at least one subsequent biometric sample in the temporary buffer into the expanded trusted template.

* * * * *